US006909801B2

(12) United States Patent
Wenzel et al.

(10) Patent No.: US 6,909,801 B2
(45) Date of Patent: Jun. 21, 2005

(54) SYSTEM AND METHOD FOR GENERATING A LOW DISCREPANCY CURVE ON AN ABSTRACT SURFACE

(75) Inventors: Lothar Wenzel, Round Rock, TX (US); Ram Rajagopal, Austin, TX (US); Dinesh Nair, Austin, TX (US)

(73) Assignee: National Instruments Corporation, Austin, TX (US)

( * ) Notice: Subject to any disclaimer, the term of this patent is extended or adjusted under 35 U.S.C. 154(b) by 651 days.

(21) Appl. No.: 09/876,982

(22) Filed: Jun. 8, 2001

(65) Prior Publication Data

US 2002/0135578 A1 Sep. 26, 2002

Related U.S. Application Data

(60) Provisional application No. 60/266,658, filed on Feb. 5, 2001.

(51) Int. Cl.[7] ................................................ G06R 9/00
(52) U.S. Cl. ........................ 382/152; 382/203; 382/285; 345/421; 345/442
(58) Field of Search ................................ 382/285, 152, 382/154, 203; 702/19, 22, 27, 30; 700/182, 118, 169, 187, 98, 163, 97; 703/2, 5, 8; 345/419, 442, 423, 471, 473, 582, 420, 421, 427, 428, 619, 675

(56) References Cited

U.S. PATENT DOCUMENTS

| 4,740,079 A | | 4/1988 | Koizumi et al. |
|---|---|---|---|
| 5,268,998 A | * | 12/1993 | Simpson ...................... 345/427 |
| 5,378,915 A | | 1/1995 | Hines et al. |

(Continued)

OTHER PUBLICATIONS

"Numerical Recipes in Fortran 77: The Art of Scientific Computing" (ISBN 0–521–436064–X) pp. 299–306, Copyright 1986–1992.

Davies, T.J.G. and R.R. Martin, "Low–discrepancy sequences for volume properties in solid modeling," CSG'98, 1998.

*Primary Examiner*—Bhavesh M. Mehta
*Assistant Examiner*—Sheela Chawan
(74) *Attorney, Agent, or Firm*—Meyertons Hood Kivlin Kowert & Goetzel, P.C.; Jeffrey C. Hood; Mark S. Williams

(57) ABSTRACT

A system and method for generating a curve, such as a Low Discrepancy Curve, on a surface, such as an abstract surface with a Riemannian metric. The system may comprise a computer which includes a CPU and a memory medium which is operable to store one or more programs executable by the CPU to perform the method. The method may: 1) parameterize the surface; 2) select a curve, such as a Low Discrepancy Curve, in a parameter space, for example, a simple space such as a unit square; 3) re-parameterize the surface, for example, re-parameterize the surface such that a ratio of line and area elements of the surface based on a Riemannian metric is constant; and 4) map the curve onto the surface using the re-parameterization. The method may also generate output comprising information regarding the mapped curve, for example, displaying the mapped curve on a display device.

35 Claims, 31 Drawing Sheets

U.S. PATENT DOCUMENTS

| | | | |
|---|---|---|---|
| 5,559,901 A | | 9/1996 | Lobregt |
| 5,722,405 A | | 3/1998 | Goldberg |
| 5,754,180 A | | 5/1998 | Kivolowitz et al. |
| 5,790,442 A | | 8/1998 | Ninomiya et al. ......... 708/444 |
| 5,797,396 A | | 8/1998 | Geiser et al. |
| 5,805,783 A | * | 9/1998 | Ellson et al. ............... 345/468 |
| 5,815,596 A | | 9/1998 | Ahuja et al. |
| 5,903,458 A | * | 5/1999 | Stewart et al. ................ 700/98 |
| 6,023,680 A | | 2/2000 | Wooster et al. |
| 6,031,932 A | | 2/2000 | Bronstein et al. |
| 6,100,893 A | | 8/2000 | Ensz et al. |
| 6,124,858 A | * | 9/2000 | Ge et al. .................... 345/619 |
| 6,175,644 B1 | | 1/2001 | Scola et al. |
| 6,175,652 B1 | | 1/2001 | Jacobson et al. |
| 6,192,293 B1 | * | 2/2001 | Yamada et al. ............. 700/182 |
| 6,229,921 B1 | | 5/2001 | Wenzel et al. ............... 382/209 |
| 6,271,856 B1 | * | 8/2001 | Krishnamurthy ............ 345/581 |
| 6,370,270 B1 | | 4/2002 | Nair et al. |
| 6,510,244 B2 | | 1/2003 | Proesmans et al. |
| 6,514,082 B2 | | 2/2003 | Kaufman et al. |
| 6,529,193 B1 | | 3/2003 | Herken et al. |
| 6,563,906 B2 | | 5/2003 | Hussein et al. |
| 6,639,597 B1 | * | 10/2003 | Zwicker et al. ............. 345/427 |
| 6,639,685 B1 | | 10/2003 | Gu et al. |
| 6,643,533 B2 | | 11/2003 | Knoplioch et al. |
| 6,690,474 B1 | | 2/2004 | Shirley |
| 6,697,497 B1 | | 2/2004 | Jensen et al. |
| 6,724,930 B1 | | 4/2004 | Kosaka et al. |
| 2002/0141645 A1 | | 10/2002 | Rajagopal et al. .......... 702/183 |

* cited by examiner

Approximated Peano Curve. The space-filling process has not been completed.

Boustrophedon Path

Archimedes Spiral defined by equally distributed points

Spiral-like line-based scanning

The situation of Lemma 1

Case (A)

Case (B)

Smooth transition between two circles of different radii.

Smooth transition between two circles of same radius.

Transition between two unit circles of radius 1. The distance between the circles is sqrt(3)

Beginning (left) and completion (right) of a scanning scheme where the curvature is below a certain value Construction of s2 and the subsequent part of the curve Conformal Spiral.

The first 1000 Halton points (left) and randomly chosen points (right)

Original solution (left) and splined version (right).

Definition of $I_1$, $I_2$, and $I_3$

Beginning of a Low Discrepancy Curve based on a specific Halton Sequency in 2d

Splined Low Discrepancy Curve coarse search

Comparison of Conformal Spiral and Low Discrepancy Searching

Comparison of Travel Distance for Low Discrepancy Search and
Conformal Spiral Search Low-discrepancy curve in a ring Tiling of the plane and relation to the surface of the unit cube Low-discrepancy curve filling the surface of a torus Low Discrepancy Preserving Mapping Function Low-discrepancy curve on a sphere
(left) and projections (right)

Surfaces can be scanned efficiently when the term low discrepancy sequence/ curve can be generalized, e.g. based on metrics on the surface.

Splined Low Discrepancy Curve coarse search with refined final approach

Beam intensity distribution in search area

Location of the Peak

Initial Final Approach Move

Error distribution of the estimated peak X coordinate error (left) and Y coordinate error (right)

SYSTEM AND METHOD FOR GENERATING A LOW DISCREPANCY CURVE ON AN ABSTRACT SURFACE

PRIORITY CLAIM

This application claims benefit of priority of U.S. provisional application Ser. No. 60/266,658 titled "System and Method for Scanning a Region" filed Feb. 5, 2001, whose inventors were Lothar Wenzel, Ram Rajagopal, Dinesh Nair, Joseph Ting and Sundeep Chandhoke.

FIELD OF THE INVENTION

The present invention relates to the field of data acquisition, and more particularly to scanning a region.

DESCRIPTION OF THE RELATED ART

Many scientific and engineering tasks involve scanning a region, such as an image or object, to acquire data characterizing the region. Examples of such tasks include parts inspection for automated manufacturing systems, alignment tasks for automated assembly systems, and recognition and location tasks in machine vision and motion control systems, among others.

In a typical scanning system a computer system is coupled to a camera which is operable to acquire optical or image information from a target object. The computer system may take any of various forms. The system may also include hardware and corresponding software which is operable to move one or both of the camera and the target object to perform the scan.

In robotics and motion planning an understanding of the underlying geometry of space is important. Various techniques have been developed to scan regions under various constraints or toward specific goals. In many cases the geometry is known in advance and a specific goal is desired. Examples of such goals include:

(a) Travel in the shortest time from a given point A of a space to another point B of the space.

(b) Travel the shortest path from a given point A of a space to another point B of the space.

(c) Travel a path through a space such that any point in the space is within a specified distance of the path. In other words, the space or geometry must be scanned completely or almost completely.

(d) Same as (c) but the path or trajectory may go outside of the originally given space.

(e) All the above cases but with curvature constraints added.

A more complicated situation may occur when the underlying geometry of the space is unknown and a scanning strategy must be applied to explore the structure of the space.

The tasks (a) and (b) are well-understood and classical design tools (optimal control) are available. Tasks (c) and (d) belong to a class of coverage path planning problems where a path must be determined guaranteeing that an agent will pass over every point in a given environment. Typical applications include, but are not limited to: mine-countermeasure missions, continental shelf oceanographic mapping, contamination cleanup, floor scrubbing, crop plowing, non-destructive testing, and bridge inspections, among others. Most coverage planners are still based on heuristics and the smoothness of the developed trajectories is rarely an issue.

Choset and Pignon (See Howie Choset, Philippe Pignon, Coverage Path Planning: The Boustrophedon Cellular Decomposition) have developed a boustrophedon decomposition that generalizes the concept of exact cellular decomposition and which results in a union of non-intersecting regions composing the target geometry. The coverage path planning problem is solved in elementary cells and the derived sub-paths are concatenated appropriately. The resulting schemes are essentially based on combinations of back-and-forth motions, i.e., lines are the building blocks of these strategies.

There are many other coverage algorithms, as well. In almost all cases the goal is to guide a robot or sensor to explore or to act within an environment. See, for example, J. Colgrave, A. Branch, "A Case Study of Autonomous Household Vacuum Cleaner", AIAA/NASA CIRFFSS, 1994. See also M. Ollis, A. Stentz, "First Results in Vision-Based Crop Line Tracking", IEEE International Conference on Robotics and Automation, 1996.

One promising method in motion planning is based on Morse functions. These procedures look at the critical points of a Morse function to denote the topological changes in a given space. See, for example, Howie Choset, Ercan Acar, Alfred A. Rizzi, Jonathan Luntz, "Exact Cellular Decompositions in Terms of Critical Points of Morse Functions". See also Ercan U. Acar, Howie Choset, "Critical Point Sensing in Unknown Environments". However, Morse functions find their primary use with regard to the scanning of un-smooth surfaces, and so are not generally useful for many applications.

FIGS. 1A–D—Prior Art Scanning Paths

FIGS. 1A–D illustrate various scanning paths, according to the prior art. It should be noted that the physical characteristics of a scanning apparatus may place restrictions on what scanning paths may be suitable for a given application. As described below, various prior art scanning schemes may be appropriate for particular applications, but may not be generally applicable due to high curvatures and/or severe start/stop requirements.

FIG. 1A—Peano Curve Space-filling Path

Scanning given geometric objects in two- or higher-dimensional spaces is a well-studied topic in the mathematical literature. Space-filling curves or umbrella surfaces have often been regarded as pathological objects. Indeed, such structures are generally inappropriate for real scanning scenarios. Although space-filling is achieved in a very mathematical sense, the curves themselves are unrealizable from a motion control standpoint as they are extremely irregular. FIG. 1A illustrates a space-filling path known as a Peano Curve. As may be seen, although the Peano Curve fills the space, the complexity and extreme curvature of the path make it a poor solution for motion control applications.

Moreover, accurate space-filling is often neither attainable nor desirable in motion planning. What is needed are trajectories that pass within a specified distance of any point of the region of interest at any given time.

FIG. 1B—Boustrophedon Scanning Path

One widely used scanning strategy is referred to as the boustrophedon path or "way of the ox". An example of this approach is presented in FIG. 1B. The chief advantages of the boustrophedon path are the simplicity of the definition and the possibility to fill gaps in further loops. However, there are significant drawbacks to this scheme. In particular, the scanning cannot be done continuously because of curvature problems. For example, at each end of a long scan line, two 90 degree turns must be made. Such abrupt changes in motion are problematic for most motion control systems.

Theoretically, the average arrival time is much worse than the strategies of the present invention, described below. The drawbacks of the boustrophedon approach are even more dramatic when searching for small objects of unknown size.

FIG. 1C—Archimedes Spiral Scanning Path

The other widely used scanning strategy in practical applications is based on an Archimedes spiral. FIG. 1C illustrates one example of an Archimedes Spiral-based scanning path. As FIG. 1C demonstrates, the curvature is unbalanced, with high curvature near the center of the spiral, and low curvature near the outer edges. Additionally, this approach clearly lends itself to scanning circular regions, and is therefore unsuitable for non-circular scan regions. Other drawbacks similar to those of boustrophedon paths also apply to the Archimedes Spiral scheme, such as fixed scanning resolution or path width, which may not be suitable when scanning for small objects. Moreover, as may be seen in FIG. 1C, much time is spent scanning regions away from the center of the region.

FIG. 1D—Rectangular Spiral Scanning Path

FIG. 1D illustrates a scanning scheme which utilizes features of both the boustrophedon and the spiral path approach. As FIG. 1D shows, the path comprises concentric straight-line path segments which spiral outward from the center of the region. This scheme, however, suffers from some of the shortcomings of its predecessors. For example, similar to the boustrophedon approach, there are discontinuities in the path at each corner, leading to sudden accelerations of the scanning apparatus. Furthermore, the path resolution is fixed, as with the Archimedes Spiral, and may therefore be unsuitable for objects of various or unknown sizes.

In almost all practically relevant cases, scanning schemes for more complicated geometries are based on boustrophedon paths or on other combinations of lines. This is particularly true when obstacles are part of the environment. Such obstacles may be described as holes in given regions. Topologically complex geometries, such as open sets (as opposed to simply connected objects) may also be scanned. The standard procedure is to go back-and-forth between boundaries of the resulting regions. As FIG. 1B demonstrates, such an approach is neither optimal nor acceptable from a motion control standpoint, for at least the reasons given above.

Therefore, improved systems and methods for scanning a region are desired. More specifically, scanning methods are needed which efficiently and thoroughly scan a region, possibly subject to specific curvature constraints.

SUMMARY OF THE INVENTION

The present invention comprises various embodiments of a system, method, and memory medium for scanning for an object within a region, or for locating a point within a region. Embodiments of the invention include a method for scanning for an object within a region using a conformal scanning scheme, a method for scanning for an object within a region using a Low Discrepancy Sequence scanning scheme, a method for scanning for an object within a region using a Low Discrepancy Curve scanning scheme, and a method for locating a point of interest in a region.

Conformal Mapping Embodiment

One embodiment of the invention comprises a method for scanning for an object within a region using a conformal scanning scheme. The region may have a dimensionality of one of one, two, or three, or may have a dimensionality greater than three. This method may first involve determining the characteristic geometry of the region. The method may then generate a conformal scanning curve based on the characteristic geometry of the region. Generation of the conformal scanning curve may comprise performing a conformal mapping between the characteristic geometry and a first scanning curve to generate the conformal scanning curve. The first scanning curve may be designed to minimize angle deviations and/or may be an optimum scanning curve for a first geometry, e.g., different from the characteristic geometry. The resulting conformal scanning curve may have a maximum curvature below a specified curvature value.

The method may then scan the region using a conformal scanning scheme based on the conformal scanning curve, i.e., may measure the region at a plurality of points along the conformal scanning curve. These measurements of the region produce data indicative of one or more characteristics of the object. The method may then examine the resulting data generated from the scan to determine one or more characteristics of the object and generate output indicating the one or more characteristics of the object.

Low Discrepancy Sequence Scanning

One embodiment of the invention comprises a method for scanning for an object within a region using a Low Discrepancy Sequence scanning scheme.

The method may first involve calculating a Low Discrepancy Sequence of points in the region. The region may have a dimensionality of one or two, or the region may have a dimensionality greater than two. Calculation of the Low Discrepancy Sequence of points in the region may comprise determining a plurality of points, wherein any location in the region is within a specified distance of at least one of the Low Discrepancy Sequence of points. The method may then generate a motion control trajectory from the Low Discrepancy Sequence of points.

Generation of the motion control trajectory may comprise generating a Traveling Salesman Path (TSP) from the Low Discrepancy Sequence of points, wherein the TSP includes each point of the Low Discrepancy Sequence of points, and then re-sampling the TSP to produce a sequence of motion control points comprising the motion control trajectory. Generation of the Traveling Salesman Path may comprise applying Lin's Nearest Neighbor algorithm to the Low Discrepancy Sequence of points to generate the Traveling Salesman Path. The TSP may comprise a first sequence of points, wherein the first sequence of points defines a first trajectory having a first maximum curvature. Re-sampling the TSP may comprise manipulating the first sequence of points, which may involve adjusting point locations, discarding points, and/or generating new points, to produce the sequence of motion control points. The sequence of motion control points may define a second trajectory having a second maximum curvature which is less than the first maximum curvature. In one embodiment, the sequence of motion control points is a superset of the first sequence of points. Alternatively, the sequence of motion control points may comprise a subset of the first sequence of points and one or more additional points.

The method may then scan the region along the motion control trajectory, e.g., may measure the region at a plurality of points along the motion control trajectory. The method may then determine one or more characteristics of the object in response to the scan, and the method may generate output indicating the one or more characteristics of the object.

Low Discrepancy Curve Scanning

One embodiment of the invention comprises a method for scanning for an object within a region using a Low Discrepancy Curve scanning scheme.

The method may first involve generating a Low Discrepancy Sequence of points in the region. Generation of the Low Discrepancy Sequence of points in the region may comprise generating a plurality of points, wherein any location in the region is within a specified distance of at least one of the Low Discrepancy Sequence of points. The method may then involve calculating a Low Discrepancy Curve in the region based on the Low Discrepancy Sequence of points. In one embodiment, generation of the Low Discrepancy Sequence of points in the region and calculation of the Low Discrepancy Curve in the region based on the Low Discrepancy Sequence of points are performed offline in a preprocessing phase of the method.

After the Low Discrepancy Curve has been generated, the method may scan the region using the Low Discrepancy Curve. The scanning may be performed after the object is present in or enters the region. The scanning may comprise measuring the region at a plurality of points along the Low Discrepancy Curve. The scanning may be performed to determine one or more characteristics of the object. The method may then generate output indicating the one or more characteristics of the object resulting from the scan. Scanning or measuring the region along the Low Discrepancy Curve, as well as determining one or more characteristics of the object and generating output, may be performed in a real time phase of the method.

Generation of the Low Discrepancy Curve may be performed in various ways. In one embodiment, for each successive pair of the Low Discrepancy Sequence of points, the method may: 1) determine one or more orthogonal line segments which connect the pair of points; and 2) re-sample the one or more orthogonal line segments to generate a Low Discrepancy Curve segment. The Low Discrepancy Curve may comprise a contiguous sequence of the Low Discrepancy Curve segments from the successive pairs of the Low Discrepancy Sequence of points. In other words, the Low Discrepancy Curve segments corresponding to the successive pairs of the Low Discrepancy Sequence of points may be sequentially connected to form the Low Discrepancy Curve.

In one embodiment, the one or more orthogonal line segments may comprise a first sequence of points, wherein the first sequence of points defines a first trajectory having a first maximum curvature. In this embodiment, re-sampling the one or more orthogonal line segments may comprise manipulating the first sequence of points, which may involve adjusting point locations, discarding points, and/or generating new points, to generate the Low Discrepancy Curve segment. The resulting Low Discrepancy Curve segment may define a second trajectory having a second maximum curvature which is less than the first maximum curvature.

The re-sampling performed on the one or more orthogonal line segments may also comprise fitting a curve to a plurality of points comprised in the plurality of orthogonal line segments subject to one or more constraints, and then generating a second plurality of points along the fit curve, wherein the second plurality of points define the Low Discrepancy Curve segment.

Calculation of the Low Discrepancy Curve in the region may be performed in various ways, depending on the dimensionality of the region. In one embodiment, the region may be defined by a coordinate space having a plurality of orthogonal axes, wherein each of the plurality of orthogonal axes corresponds respectively to a dimension of the region. Each of the pair of points may have a plurality of coordinates corresponding respectively to the plurality of orthogonal axes. Also, each of the plurality of line segments may be parallel to a respective one of the orthogonal axes. Thus, each of the plurality of line segments may have a first endpoint and a second endpoint, wherein the first endpoint has a first plurality of coordinates, the second endpoint has a second plurality of coordinates, and wherein said first plurality of coordinates and said second plurality of coordinates differ only in value of a coordinate corresponding to a respective one of the plurality of orthogonal axes.

In one implementation, the one or more orthogonal line segments which connect the pair of points may comprise a contiguous sequence of the line segments corresponding to a specified order of the plurality of orthogonal axes. In this implementation, re-sampling the one or more orthogonal line segments to generate the Low Discrepancy Curve segment may comprise re-sampling the contiguous sequence of the line segments in the specified order to generate the Low Discrepancy Curve segment.

In an embodiment wherein the region is a 2-dimensional space, the plurality of orthogonal axes comprises an x axis and a y axis, and the plurality of line segments may comprise two orthogonal line segments, e.g., a first line segment and a second line segment. For example, a first of the pair of points may have two coordinates, $(x0, y0)$, corresponding respectively to the x and y axes, and a second of the pair of points may have two coordinates, $(x1, y1)$, corresponding respectively to the x and y axes. Each of the line segments may have a first endpoint and a second endpoint, wherein the second endpoint of the first line segment is equal to the first endpoint of the second line segment. The two orthogonal line segments which connect the pair of points may comprise a contiguous sequence of the line segments, preferably in the specified order. Also, re-sampling the two orthogonal line segments to generate a Low Discrepancy Curve segment may comprise re-sampling the contiguous sequence of the line segments in the specified order to generate the Low Discrepancy Curve segment. Where the specified order of the plurality of orthogonal axes is $(x, y)$, the first endpoint of a first of the two line segments has coordinates $(x0, y0)$, the second endpoint of the first of the two line segments has coordinates $(x1, y0)$, the first endpoint of a second of the two line segments has coordinates $(x1, y0)$, and the second endpoint of the second of the two line segments has coordinates $(x1, y1)$. Where the specified order of the plurality of orthogonal axes is $(y, x)$, the first endpoint of a first of the two line segments has coordinates $(x0, y0)$, the second endpoint of the first of the two line segments has coordinates $(x0, y1)$, the first endpoint of a second of the two line segments has coordinates $(x0, y1)$, and the second endpoint of the second of the two line segments has coordinates $(x1, y1)$;

In an embodiment wherein the region is a 3-dimensional space, the plurality of orthogonal axes comprises an x axis, a y axis, and a z axis, and the plurality of line segments may comprise three orthogonal line segments, e.g., a first line segment, a second line segment, and a third line segment. For example, a first of the pair of points may have three coordinates, $(x0, y0, z0)$, corresponding respectively to the x, y, and z axes, and a second of the pair of points may have three coordinates, $(x1, y1, z1)$, corresponding respectively to the x, y, and z axes. Each of the line segments may have a first endpoint and a second endpoint, wherein the second endpoint of the first line segment is equal to the first endpoint of the second line segment, and wherein the second endpoint of the second line segment is equal to the first endpoint of the third line segment. The three orthogonal line segments which connect the pair of points may comprise a contiguous sequence of the line segments, preferably in the specified order. Also, re-sampling the three orthogonal line segments to generate a Low Discrepancy Curve segment may comprise re-sampling the contiguous sequence of said line segments in the specified order to generate the Low Discrepancy Curve segment.

In one embodiment, the method is operable to dynamically generate new Low Discrepancy Curve segments during the scan and scan the region along these new Low Discrepancy Curve segments until desired characteristics of the object are identified. In this embodiment, the method may be operable to first generate an initial Low Discrepancy Sequence of points in the region and calculate an initial Low Discrepancy Curve segment in the region based on the first Low Discrepancy Sequence of points. These steps may be performed in a pre-processing phase. The method may then scan a portion of the region along the first Low Discrepancy Curve segment to attempt to identify a desired characteristic of the object. If the characteristic of the object is not identified, then the method may dynamically generate and add one or more new Low Discrepancy Sequence points in the region based on previous Low Discrepancy Sequence points, calculate one or more new Low Discrepancy Curve segments in the region based on the one or more new Low Discrepancy Sequence of points, and scan a portion of the region along the one or more new Low Discrepancy Curve segments to attempt to identify the characteristic of the object. The method may be operable to dynamically generate new Low Discrepancy Sequence points, calculate a new Low Discrepancy Curve segment, and scan the region along this new Low Discrepancy Curve segment one or more times in an iterative fashion until the desired characteristics in the region are identified, or until an iteration threshold has been reached.

Generating a Low Discrepancy Curve

One embodiment of the invention comprises a method for generating a Low Discrepancy Sequence curve in a region, such as a 2D rectangle, or the unit square. The method may be performed by a computer comprising a CPU and a memory medium. The memory medium may be operable to store one or more computer programs which are executable by the CPU to perform various embodiments of the method.

In one embodiment, the method may include generating an unbounded Low Discrepancy Point. As used herein, the term unbounded Low Discrepancy Point refers to a generated Low Discrepancy Point which may or may not fall within the bounds of the region. One or more boundary conditions may then be applied to the unbounded Low Discrepancy Point to generate a bounded Low Discrepancy Point, wherein the bounded Low Discrepancy Point is located within the region. In one embodiment, the generating an unbounded Low Discrepancy Point and the applying one or more boundary conditions may be repeated one or more times to generate a Low Discrepancy Sequence in the region. The generated Low Discrepancy Sequence may then be stored, and output generated, comprising the Low Discrepancy Sequence, wherein the Low Discrepancy Sequence defines the curve in the region. In one embodiment, each bounded Low Discrepancy Point of the Low Discrepancy Sequence may be store as it is generated. In one embodiment, the curve is a Low Discrepancy Curve. The method may further include scanning the region according to the curve defined by the Low Discrepancy Sequence.

In one embodiment, generating the unbounded Low Discrepancy Point may include selecting two or more irrational numbers, a step size epsilon ($\epsilon$), and a starting position, initializing a current position to the starting position, and incrementing one or more terms of the current position based on a factor of $\epsilon$ and one of the irrational numbers, where the incremented position is the unbounded Low Discrepancy Point. In one embodiment, the starting position may be a randomly selected point in the region. As described above, because the unbounded Low Discrepancy Point may fall outside the region, the one or more boundary conditions may be applied, generating the bounded Low Discrepancy Point, and the current position may be set to the bounded Low Discrepancy Point. It should be noted that in the iteration described above, the initializations or selections are only performed once at the beginning, i.e., the repeating said generating and said applying boundary conditions one or more times preferably comprises repeating said incrementing, said applying one or more boundary conditions, and said setting the current position, one or more times.

In one embodiment, the method may also include selecting a maximum length L of the curve in the region and initializing a current length to zero prior to said repeating. At each iteration, the current length may be updated to include a distance from the current position to the generated bounded Low Discrepancy Point. In the preferred embodiment, said repeating one or more times comprises repeating until the current length meets or exceeds the maximum length L.

In one embodiment, applying one or more boundary conditions may comprise checking if the unbounded Low Discrepancy Point is outside of the region, and if so, applying one of a reflecting boundary condition or a toroidal boundary condition at each border of the region.

Note that although the above describes an embodiment wherein the region comprises a 2-dimensional rectangular region, the two or more irrational numbers comprise two irrational numbers, and the curve in the region comprises one or more line segments, it is also contemplated that more complex curves may be generated, and that higher dimensional regions, such as unit hyper-cubes, may be used by various embodiments of the method.

Generating a Curve on a Surface

One embodiment of the comprises a method for generating a curve, such as a Low Discrepancy Curve, on a surface. In the preferred embodiment, the surface may be an abstract surface with a Riemannian metric. In one embodiment, the curve may be generated in a simple space, then mapped to the surface.

A parameterization of the surface may be selected. In the preferred embodiment, the parameter space for the parameterization is the unit square or a rectangle. Other suitable geometries for the parameter space are also contemplated, including higher dimensional unit cubes and rectangles, among others. A first curve in the parameter space may be selected, e.g., a Low Discrepancy Curve. Then, a re-parameterization of the surface may be determined or generated. For example in a preferred embodiment, a re-parameterization of the surface may be determined such that a ratio of line and area elements of the surface based on a Riemannian metric is constant.

The generated curve may be mapped onto the surface using the re-parameterization. For example, in one embodiment, the generated Low Discrepancy Curve in the unit square may be mapped onto the surface.

Finally, output may be generated comprising the mapped curve, e.g., the mapped Low Discrepancy Curve. In one embodiment, generating the output may comprise storing the curve for later use. In another embodiment, generating the output may comprise displaying the curve on a display device.

Thus, by using the above-described method, a curve, such as a Low Discrepancy Curve, generated on a unit square (or other suitable geometry) may be mapped to an abstract surface. It should be noted that any sequence, e.g., LDS, or curve, e.g., LDC generated on the unit square (or other suitable geometry) may be mapped in this way. In other words, it is not required that the sequence or curve be generated in any particular manner.

Precise Location of a Point of Interest

One embodiment of the invention comprises a method for determining a precise location of a point of interest in a region. In one embodiment, an approximate model of the region is known, and the method utilizes knowledge of this model. The region of interest may comprise a data distribution, and the point of interest may comprise an extremum of the data distribution. For example, the data distribution may comprise a Gaussian distribution, and the point of interest may comprise a Gaussian peak of the Gaussian distribution.

In one embodiment, the method may first determine or locate a region of interest in the region. Location of the region of interest may be performed in various ways, and one method is described below. The method may then determine one or more characteristics of the region of interest within the region, wherein the region of interest includes the point of interest. The one or more characteristics of the region of interest may comprise a radius of the region of interest. The one or more characteristics of the region of interest may also or instead comprise an approximate location of the point of interest, e.g., a center of the region of interest.

The method may then determine a continuous trajectory based on the one or more characteristics of the region of interest, wherein the continuous trajectory allows measurement of the region of interest. The method may then measure the region of interest at a plurality of points along the continuous trajectory to generate a sample data set. The method may then perform a surface fit of the sample data set using the approximate model to generate a parameterized surface. The method may then calculate a location of the point of interest based on the parameterized surface. The method may optionally measure the region of interest at the point of interest to confirm correctness of the calculated location. Finally, the method may generate output indicating the calculated location of the point of interest, or the calculated location of the point of interest may be provided to another program for use.

Locating the region of interest in the region may be performed in various ways. For example, the method may scan the region to locate two or more points of the region of interest, wherein each of the two or more points has associated measured data. The method may then determine a local point of interest in the region of interest proximate to the two or more points of the region of interest.

The two or more points of the region of interest may comprise an entry point and an exit point of the region of interest. In this case, the method may scan along a first scan line between the entry point and the exit point to determine the local point of interest, calculate a second scan line, wherein the second scan line passes through the local point of interest and is orthogonal to the first scan line, and measure the region along the second scan line to generate second scan line associated measured data. The method may then determine a second local point of interest along the second scan line based upon the second scan line associated measured data, determine a center of the region of interest based upon one or more of the second local point of interest and the first local point of interest, and provide a radius, wherein the region of interest comprises an area of the region within the radius of the determined center.

A system may implement any of the above methods for scanning for an object within a region, for locating a point of interest in a region, or for generating curves in a region. The system may comprise a computer system coupled to a sensor. The computer system may comprise a CPU and a memory medium, or programmable logic, which is operable to store a scanning program that implements one of the above methods. An embodiment of each of the above invention(s) may also be a software program or programs stored on a memory medium.

BRIEF DESCRIPTION OF THE DRAWINGS

A better understanding of the present invention can be obtained when the following detailed description of the preferred embodiment is considered in conjunction with the following drawings, in which.

Figure 1A:
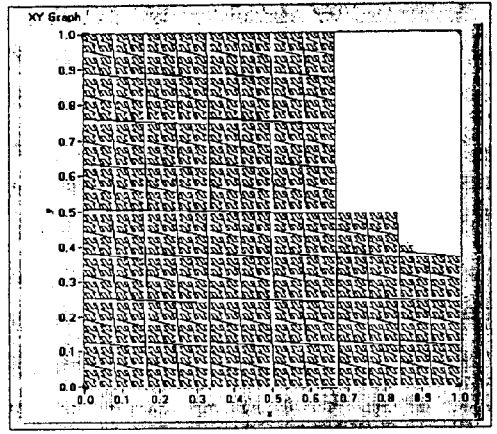
FIGS. 1A–D illustrate various scanning paths, according to the prior art.
Figure 1B:
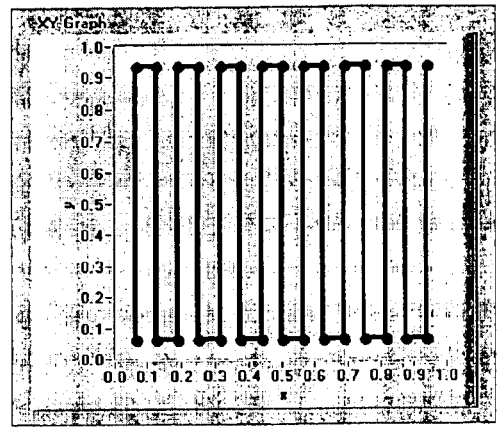
Figure 1C:
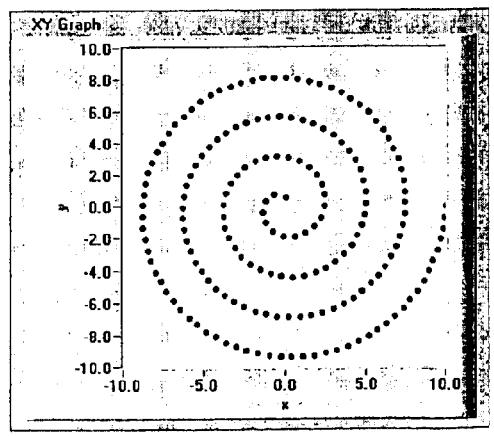
Figure 1D:
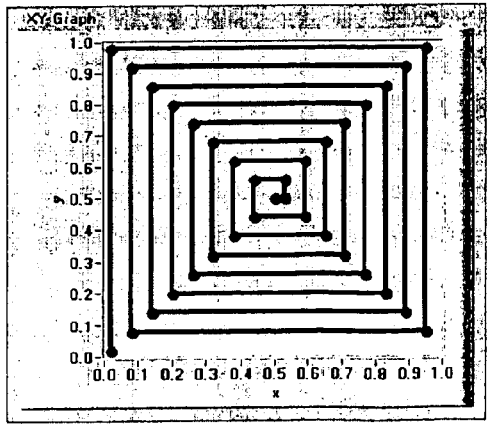

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Figure 2A:
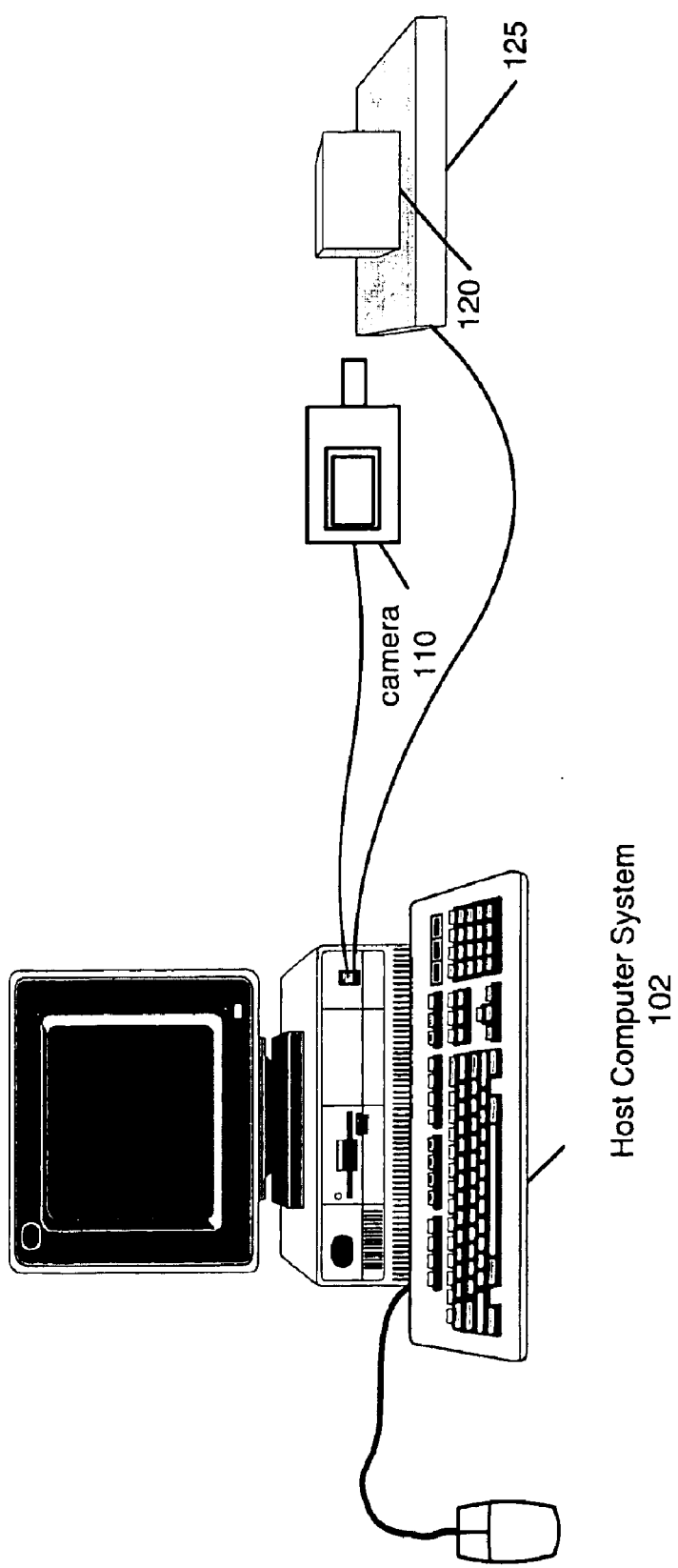
FIG. 2A illustrates a scanning system, according to one embodiment of the present invention.

FIG. 2A—A Scanning System

FIG. 2A illustrates a scanning system according to one embodiment of the present invention. As FIG. 2A shows, a computer system 102 may be coupled to a camera or sensor 110 which is operable to acquire optical or image information from an object 120. In one embodiment, the scanning system may also include a motion control component 125, such as a motion control stage, which may be operable couple to the computer system 102. The motion control state may receive control signals from the computer system 102 and may move the object 120 with respect to the camera/sensor 110 for scanning purposes. In another embodiment, the motion control component may move the camera/sensor 110 instead of the object 120 to scan the object 120.

The sensor 110 may also be referred to as a remote scanning device. The sensor 110 may be a camera or image acquisition device, which may be adapted to receive one or more portions of the electromagnetic (EM) spectrum, e.g., visible light, infrared, or ultraviolet (UV) light. The sensor 110 may also be an ultrasonic device for detecting sound waves. Thus the sensor 100 may use any of various techniques to scan and produce the image data, including visible light, infrared, ultrasonic, light interferometer, and other non-contact and contact methods.

In one embodiment, the computer system 102 may operate to "scan" previously acquired data, e.g., scan stored data in a data mining application. In this instance, the system may not require sensor 110 for scanning a physical object or region, as the data being analyzed has been previously acquired and stored.

The computer system 102 may include a display device, such as a monitor, as well as a chassis and one or more I/O devices, such as a keyboard and/or mouse. However, the computer system 102 may take any of various forms, such as a personal computer, or any type of device which includes a processor that executes instructions from a memory medium, or which includes programmable logic that has been configured to perform the methods of the present invention. Exemplary computer systems include a personal computer, mainframe computer, a personal computing device (PDA), television, embedded device, and other systems. Thus, as used herein, the term computer system is intended to encompass any of various devices which include a processor that can execute instructions from a memory medium and/or may include a programmable logic device that can be configured to execute a scanning method or algorithm.

Thus, the method of the present invention may be implemented in any of various types of devices and any of various types of applications. Example applications where the method described herein may be used include phased array systems, industrial automation or manufacturing, robotics, machine vision systems, and any other application where it is desirable scan an object to acquire data characterizing the object.

In this example, one sensor 110 (a camera in this example) scanning one object 120 is shown, but in other embodiments any number of sensors 110 or cameras may be used to scan any number of objects 120. The camera 110 may comprise any type of camera or device operable to acquire images of the object 120. The objects 120 may be stationary, or may be conveyed into and out of the field of view of the one or more cameras 110.

The camera 110 may be operable to output a video stream to computer system 102, e.g., to an image acquisition (IMAQ) device comprised in the computer system 102. The computer system 102 may then analyze the images captured by the image acquisition board. Alternatively, the image acquisition board may include an on-board processor and memory for performing a portion or all of the image analysis.

The computer system 102 may use or store scanning software which analyzes the image data received from the camera 110, and controls the scanning operation, i.e., determines the scan path over the object. The system may also comprise one or more motion systems for moving the camera, the object, or both, in order to implement the scanning scheme. The motion system may be a motion control system, such as is available from National Instruments Corporation.

Figure 2B:
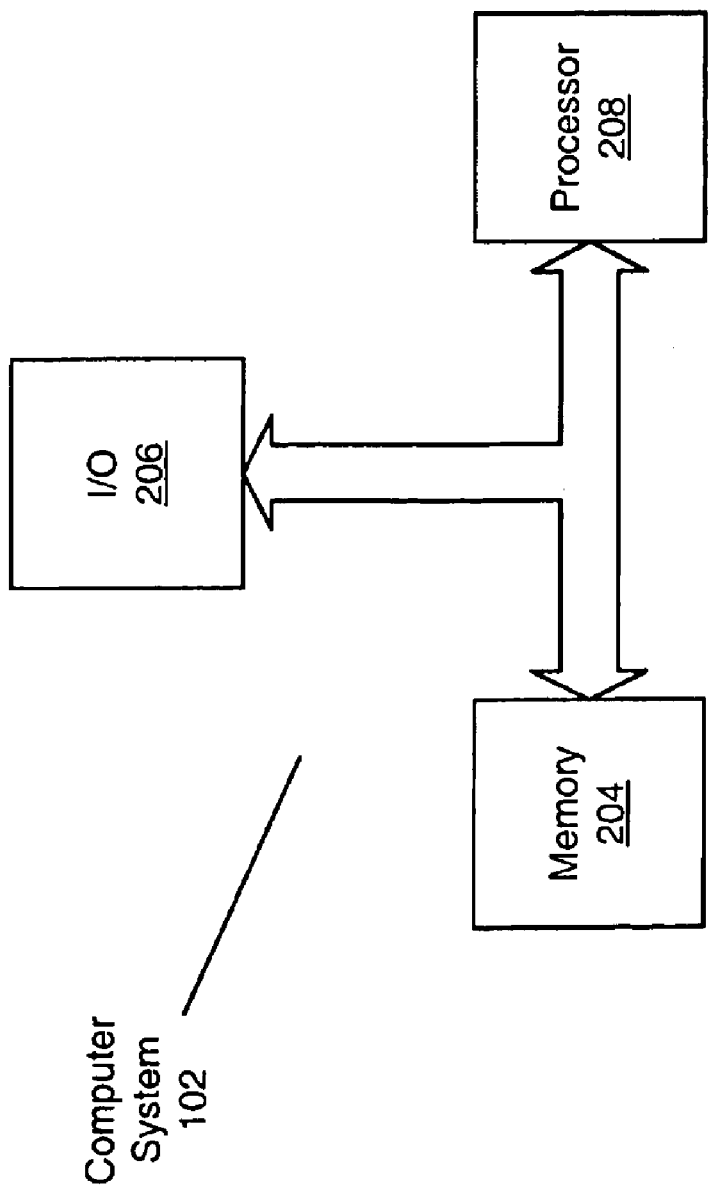
FIG. 2B is a block diagram of the computer system of FIG. 2A, suitable for implementing various embodiments of the invention.

FIG. 2B—Computer System Block Diagram

FIG. 2B is a block diagram of a computer system 102 which may be used to implement various embodiments of the scanning schemes described above. As FIG. 2B shows, the computer system 102 may include a memory 204 which is operable to store one or more software programs for implementing the scanning methodologies described above. The computer system 102 may also include an Input/Output (I/O) interface 206 for communication with external systems, and a CPU 208 which may be operable to execute the one or more software programs for implementing the scanning methodologies. Thus, the computer system 102 may store and/or execute one or more software programs which perform the methods described above with reference to FIGS. 4–23.

In one embodiment, the computer system 102 may include a display device, such as a monitor, as well as a chassis and one or more I/O devices, such as a keyboard and/or mouse. However, the computer system may take any of various forms, such as a personal computer, or any type of device which includes a processor that executes instructions from a memory medium, or which includes programmable logic that has been configured to perform the methods described in FIGS. 4–23. Exemplary computer systems include a personal computer, mainframe computer, a personal computing device (PDA), television, embedded device, and other systems. Thus, as used herein, the term computer system is intended to encompass any of various devices which include a processor that can execute instructions from a memory medium and/or may include a programmable logic device that can be configured to execute a method or algorithm, such as that described in FIGS. 4–23.

Thus, the method of the present invention may be implemented in any of various types of devices and any of various types of applications. Example applications where the method described herein may be used include inspection systems, industrial automation or motion control systems, measurement systems, machine vision systems and any other application where it is desirable to scan an object or space. More specific applications wherein the method of the present invention may be used include robotics, and phased array control systems, as well as scanning related to image data, measurement data, acoustic data, seismic data, financial data, stock data, futures data, business data, scientific data, medical data, and biometric data, among others.

FIGS. 3A–D—Example Applications of the Scanning System

FIGS. 3A–D illustrate various exemplary applications where various embodiments of the present invention may be used. However, it is noted that the invention is not limited to these applications, but rather may be used in any of various applications.

Figure 3A:
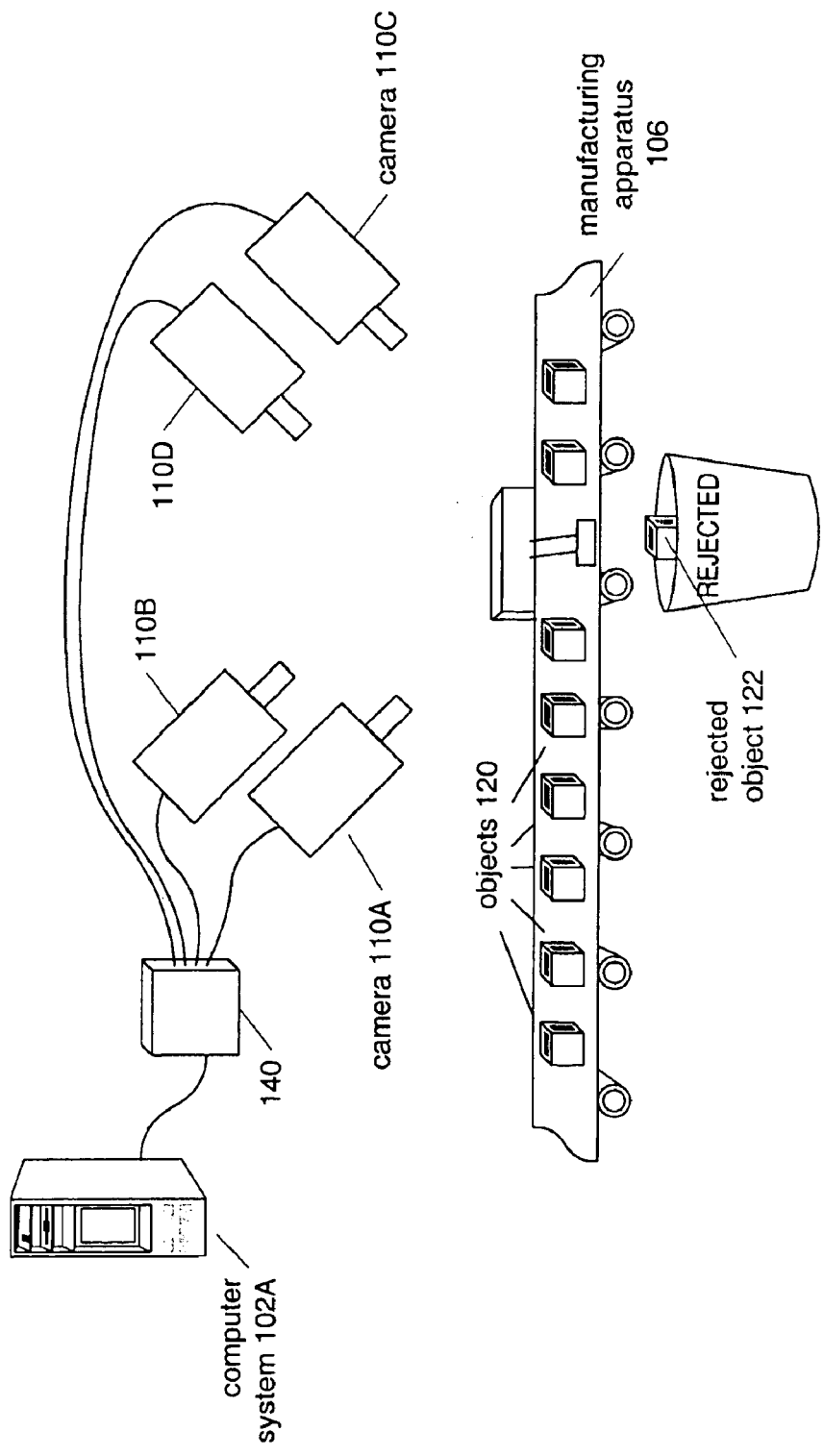
FIG. 3A illustrates a machine vision application of a scanning system, according to one embodiment of the present invention.

FIG. 3A—Machine Vision Application of the Present Invention

In a machine vision or automated inspection application of the present invention, shown in FIG. 3A, a system similar to that shown in FIG. 2 may implement the present scanning methodology in software and/or hardware for quality control in a manufacturing process. As FIG. 3A shows, one or more cameras 110A–D may be coupled to computer system 102A for scanning objects from several points of view. In this example, objects 120 are carried past the one or more cameras 110 by manufacturing apparatus 106. The system may operate to scan each object 120, and the images received from each camera 110 may be analyzed using image processing software executing on the computer system 102A. The analyses of the images may be used to detect defects or other characteristics of the object 120. For example, in various applications the analyses may be designed to detect one or more of: physical surface defects (scratches, etc.); one or more components located correctly on the object; a correct label on the object; a correct marking on the object; correct color information on the object, etc. Thus, in a machine vision manufacturing application, the results of the image analyses may be used to determine whether an object meets desired production standards. This determination may be performed in any of various ways, as desired for a particular application. If the object does not meet the desired production standards, the object may be rejected, as shown in the case of object 122.

Figure 3B:
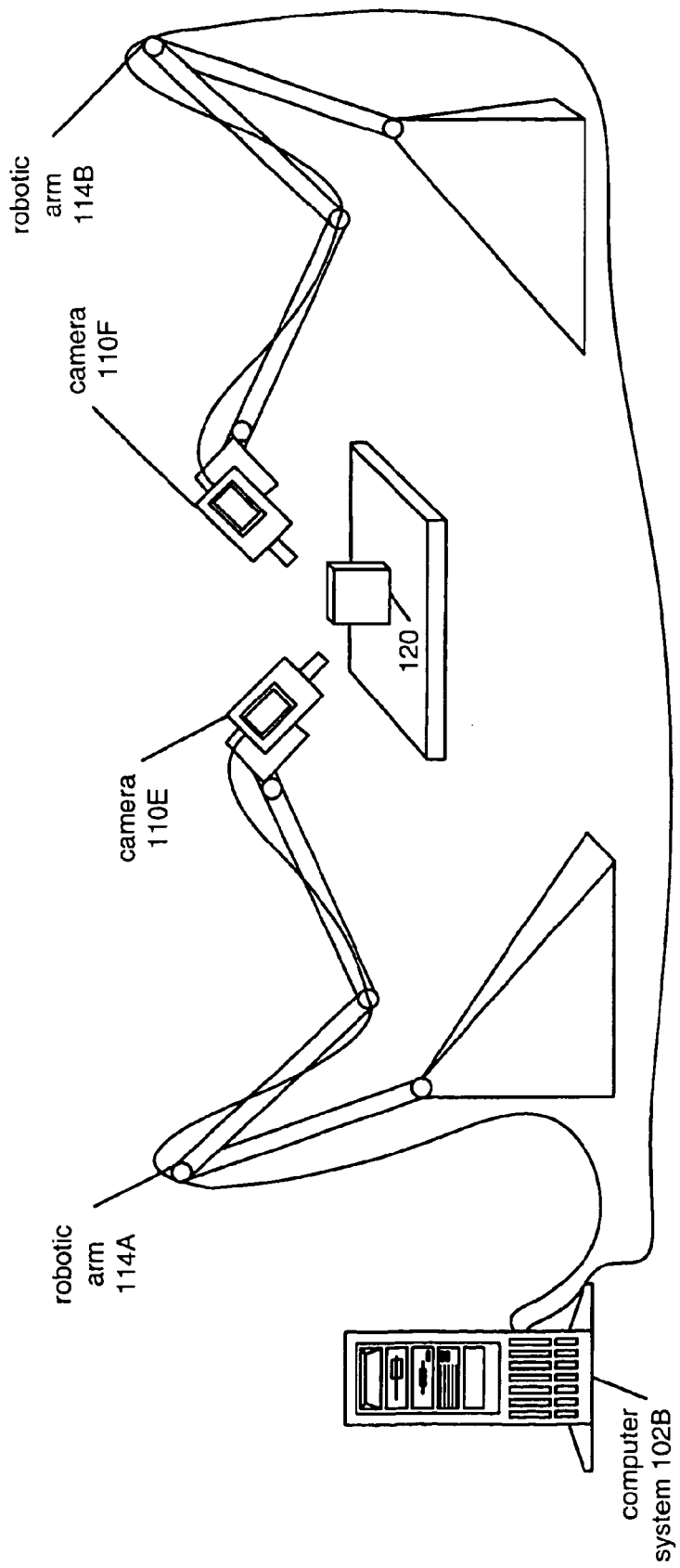
FIG. 3B illustrates a robotics application of a scanning system, according to one embodiment of the present invention.

FIG. 3B—Robotics Application of the Present Invention

FIG. 3B illustrates an example application of the present invention in the field of robotics. As FIG. 3B shows, a computer system 102B may be operable to control one or more robotic arms 114, each comprising a camera 110, to scan an object 120. The computer system 102B may be operable to store and execute software implementing a scanning scheme according to the present invention. More specifically, the computer system 102B may be operable to store and execute one or more software programs to calculate one or more scanning paths based upon user input and/or sensor data. In one embodiment, the path calculations may be performed offline in a preprocessing phase. In another embodiment, part or all of the path calculations may be performed in real time. The computer system 102B may be further operable to store and execute software programs to maneuver the one or more robotic arms 114 and respective cameras 110 to implement the calculated scanning scheme.

In one embodiment of the system shown in FIG. 3B, multiple robotic arms may be used in tandem. In this case, a cooperative scanning strategy may be required which coordinates the movement of each arm 114 to collectively scan the object 120.

Figure 3C:
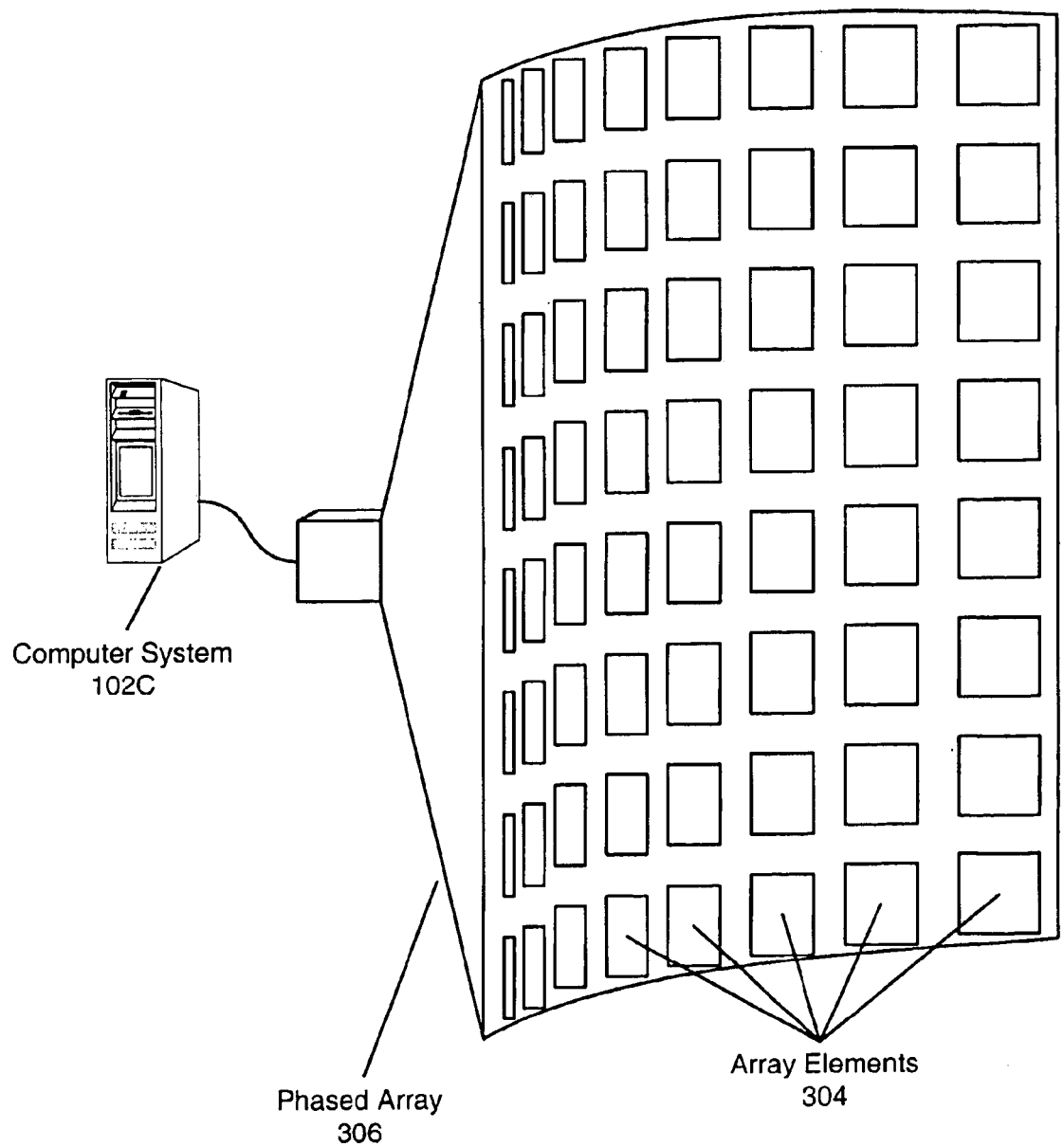
FIG. 3C illustrates a phased array control application of a scanning system, according to one embodiment of the present invention.

FIG. 3C—Phased Array Application of the Present Invention

FIG. 3C illustrates an example application of the present invention in the area of phased array control. A phased array typically refers to a group of antennas in which the relative phases of the respective signals feeding the antennas are varied in such a way that the effective radiation pattern of the array is reinforced in a desired direction and suppressed in undesired directions. As FIG. 3C shows, computer system 102C may couple to a phased array 302. The phased array 302 may comprise a plurality of array elements 304 which may each be controlled independently or in concert with the other array elements 304. The computer system 102C may store and execute software which is operable to control the phased array elements to accomplish a specific task. Other examples of controlled phased arrays include telescope farms and micro-mirror assemblies on fiber optic transfer chips.

Figure 3D:
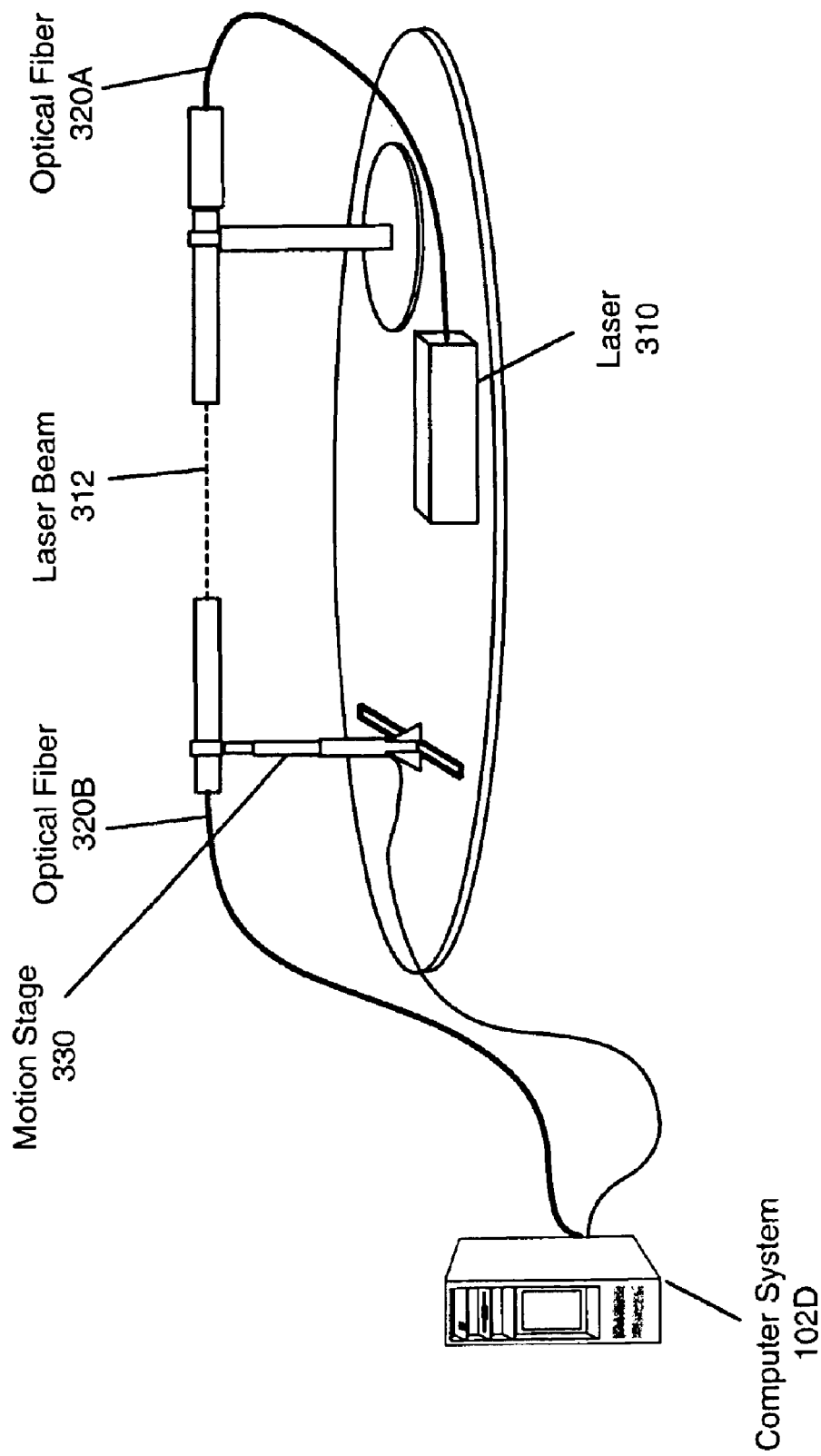
FIG. 3D illustrates an optical fiber alignment system, according to one embodiment of the present invention.

FIG. 3D—Optical Fiber Alignment Application of the Present Invention

FIG. 3D illustrates an example machine motion application where the goal is a fast procedure for precise alignment of two optical fibers. In this example application, a laser source 310 generates a beam 312 which is routed into a first fiber 320A and checked or measured through a second fiber 320B, where the intensity of the laser beam 312 is constantly measured and used to align the two fibers 320. Further details of this procedure are presented below with reference to FIG. 14, as well as under the section titled "Applications and Test Results".

Theory

Figure 4A:
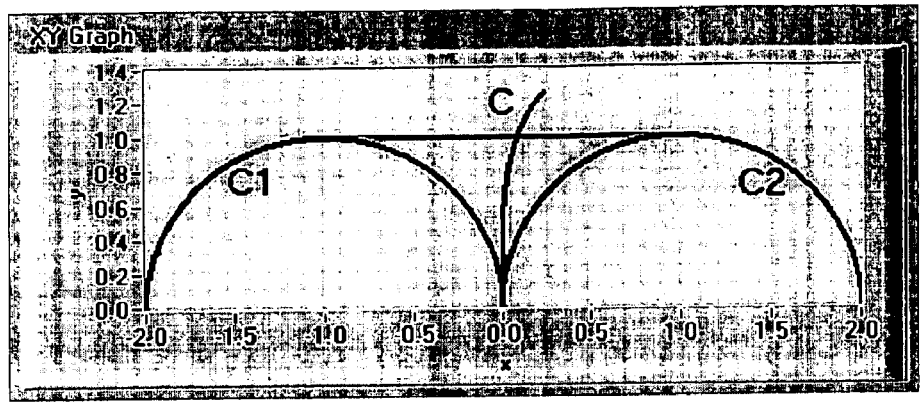
FIGS. 4A–C illustrate limitations of scanning schemes with curvature constraints.
Figure 4B:
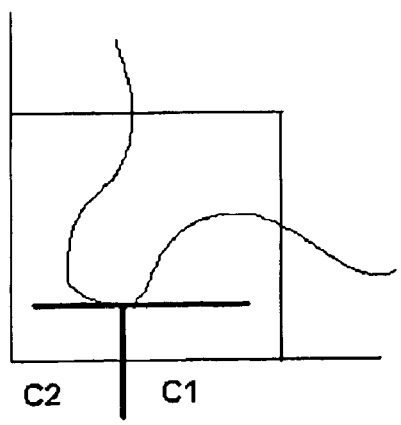
Figure 4C:
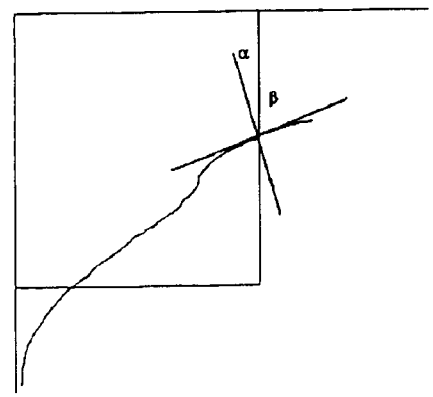

FIGS. 4A–C—Scanning Under Curvature Constraints

FIGS. 4A, 4B, and 4C illustrate various scanning schemes with curvature constraints, as presented in the following Theorems and Lemmas.

Motion control stages act in real environments and the laws of physics forbid many theoretically interesting trajectories. For example, if the movement apparatus is very massive, the inertia of the system may restrict allowable acceleration values. In other words, parameters specifying start/stop events and path curvature may be constrained to particular ranges for a given system. Such constraints may enable stages to realize smooth movement where the travel velocity is constant or almost constant. This property is desirable in that it allows a connected data acquisition unit to take measurements on the fly, thereby reducing the complexity of the overall scanning procedure. If the trajectory is allowed to leave the region of interest, possibly different (and better) curves may be considered in a search for an optimal curvature constrained solution, resulting in a new class of scanning strategies.

In many motion planning routines smooth trajectories are a necessity. If an object must travel with constant or almost constant velocity the laws of physics require continuous curvatures. The question arises whether or not a specific geometry can be scanned under the condition that the absolute value of the curvature of the trajectory is continuous and always in a given interval $[1,u]$ where the upper value $u$ is finite. Before dealing with this problem in detail the concept of scanning a geometric object must be defined more accurately.

Definition:

Let $G$ be an open and connected region in $R^2$. A sufficiently smooth curve $C: R^+ \rightarrow G$ in natural parameterization scans $G$ completely if for all points $g$ of $G$ and for all $\epsilon>0$ there is a point $g(\epsilon)$ on $C$ that the distance between $g$ and $g(\epsilon)$ is less than $\epsilon$. In other words, $C$ is an almost G-filling curve. Classical examples such as Peano or Hilbert curves lack the smoothness condition.

This section deals with curves that scan certain open sets $G$ completely where the absolute value of the curvature of the underlying smooth curve is limited. Clearly, not all open regions $G$ will allow such a smooth scanning scheme, e.g. a square can not be scanned completely without violating the curvature constraint, or leaving the boundaries of the space. A proof of this limitation follows:

Lemma 1:

Let $C: [0,S] \rightarrow R^2$ be a smooth unit speed curve $(x(s), y(s))$ in $R^2$ starting at $(0,0)$ where the normalized tangent at this point is $(0,1)$. The curvature $k(s)$ of $C$ satisfies the inequality $-1 \leq k(s) \leq 1$ for all $s$.

Let $s_0$ be a first positive value with $y(s_0)=1$. Then the curve $C/_{[0,s_0]}$ and the two circles $C_1$ and $C_2$ (see FIG. 4A) have no point in common.

Let $s_1$ be the first positive value with $\cos(\tau_s(s))=0$. Then $|x(s_1)| \geq 1/k^*$.

Proof:

Using the celebrated Fundamental Theorem of Plane curves:

$$x(s) = \int_0^s ds \sin(\tau(s)) + x_0 \text{ and } y(s) = \int_0^s ds \cos(\tau(s)) + y_0$$

where $$\tau(s) = \int_0^s ds k(s) + \vartheta_0$$

The three constants $x_0, y_0, \tau_0$ are equal to zero because of the given constraints. The function $y(s)$ is monotonic in $[0,s_0]$. This follows directly from the fact that $-s \leq \tau(s) \leq s$ and $\cos(\tau(s)) \geq \cos(s) \geq 0$ implies $y(s) \geq \sin(s)$, in particular $s_0 \leq \pi/2$. Furthermore, $|x(s)| \leq 1-\cos(s)$ in $[0,s_0]$. It follows that for $s$ in $[0,s_0]$ the point $(x(s), y(s))$ is outside of $C_1$ and $C_2$. This proves the first part of Lemma 1.

Given the first positive $s_1$, with $\cos(\tau(s_1))=0$, it follows that $|\tau(s_1)|=\pi/2$ and $$x(s_1) = \int_0^{s_1} ds \sin(\tau(s)) = \int_0^{\tau(s_1)} du \frac{\sin(u)}{k(s)} = \int_0^{\pi/2} du \frac{\sin(u)}{k(s)}$$

thus $x(s_1) < 1/k^*$.

q.e.d.

Theorem 1:

A square can not be scanned by a smooth curve $C: R^+ \rightarrow R^2$ completely under a given curvature constraint $|k(s)| \leq k^*$ for all nonnegative $s$.

Proof:

Let $\epsilon$ be a sufficiently small positive number and $S_\epsilon$ a corner of size $\epsilon \times \epsilon$ of the given square where the smooth unit speed curve $C$ neither starts nor ends. Such a corner does exist. $C$ scans the square completely. So there is a sub-curve $C_\epsilon$ of $C$ that enters and leaves $S_\epsilon$ (see FIG. 4B). If $(x(s), y(s))$ for $s$ in $[a,b]$ describes this sub-curve then two cases must be distinguished.

(A) At least one function $x(s)$ or $y(s)$ has a local extremum in $[a, b]$.

(B) Both functions $x(s)$ and $y(s)$ are monotonic in $[a, b]$.

In case (A) assume there is a local minimum of $y(s)$ in $[a, b]$ in the lower left corner of the given square. According to FIG. 4B and to Lemma 1 (where curvature of 1 is replaced by $k^*$ appropriately) the curve $C$ must reach at least a y-value of $\epsilon-k^*$. This means $C$ leaves the given square, which is a contradiction of the assumption.

In case (B) assume the situation depicted in FIG. 4C. Then one of the angles $\alpha$ or $\beta$ is at least $\pi/4$. Choosing the smaller angle in conjunction with Lemma 1 guarantees that the curve $C$ reaches an x-position less than $\epsilon-k^*/\text{sqrt}(2)$ and leaves the square which contradicts the assumption.

q.e.d.

Figure 4D:
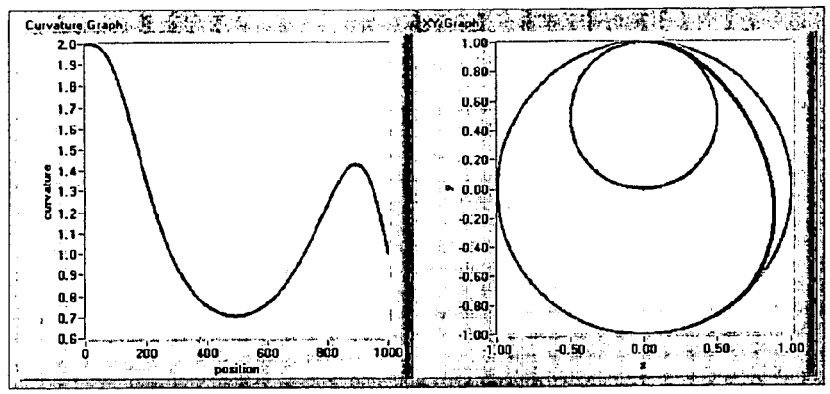
FIG. 4D illustrates a smooth transition between two circular scan curves of differing radii, according to one embodiment.
Figure 4E:
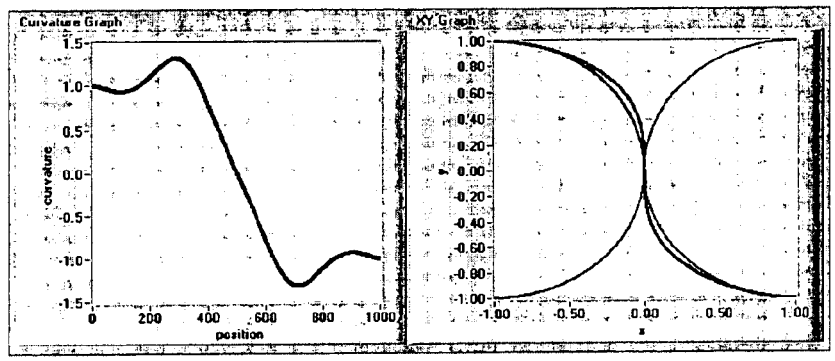
FIG. 4E illustrates a smooth transition between two semi-circular scan curves of equal radius, according to one embodiment.

On the other hand, many other relevant regions can be scanned completely under the curvature constraint. The key to many of these scanning strategies is to build curves based on smooth transitions between circles. FIGS. 4D and 4E demonstrate these transitions for two typical cases.

Such smooth transitions from a curve A to a curve B can be produced by the following generic structure. Let A and B be described by A: $(x_1(t), y_1(t))$ for $0 \leq t \leq 1$ and B: $(x_2(t), y_2(t))$ for $0 \leq t \leq 1$, respectively.

The transition function is $f(t)=-6t^5+15t^4-10t^3+1$ for $0 \leq t \leq 1$. $f(t)$ can be extended by $f(t)=1$ for $t<0$ and $f(t)=0$ for $t>1$. The extension is twice continuously differentiable. The curve $f(t)A+(1-f(t))B$ realizes the smooth transitions as shown in FIGS. 4D and 4E, described below.

FIG. 4D—Smooth Transition Between Circles of Different Radii

FIG. 4D illustrates a smooth transition between two circular scan curves of different radii. As FIG. 4D shows, a first circle of radius 0.5 is located interior to a second circle of radius 1. A smooth transition curve intersects each of the two circles tangentially, such that a scan path may include both circles (via the transition curve) without discontinuities.

As also shown in FIG. 4D, the curvature of the transition curve is bounded between 0.7 and 2.0, and has no discontinuities. It should be noted that the particular location and relative sizes of the circles have been chosen for illustration purposes only, and that smooth transitions in the manner described may be applied not only to other circle pairs of varying radii and positions, but to pairs of non-circular curves, as well.

FIG. 4E—Smooth Transition Between Circles of Equal Radii

FIG. 4E illustrates a smooth transition between two circular scan curves of equal radii. As FIG. 4E shows, two semi-circular curves of radius 1 intersect at an external tangent point. A smooth transition curve is shown which transitions from the left semi-circular curve to the right semi-circular curve (or vice versa) at the tangent point, and which is also tangent to each of the semi-circular curves at the tangent point. In this example, the transition occurs at the transition curve's inflection point, i.e., when the transition curve switches from convex to concave.

As also shown in FIG. 4E, the curvature of the transition curve is bounded between −1.3 and +1.3, and has no discontinuities. It should be noted that the particular location and sizes of the semi-circular curves have been chosen for illustration purposes only, and that smooth transitions in the manner described may be applied not only to other semi-circular curve pairs of varying radii and positions, but to pairs of non-circular curves, as well.

Theorem 2:

The whole plane can be scanned completely if the underlying smooth curve's maximum curvature is less than an arbitrarily chosen but fixed positive number.

Figure 4F:
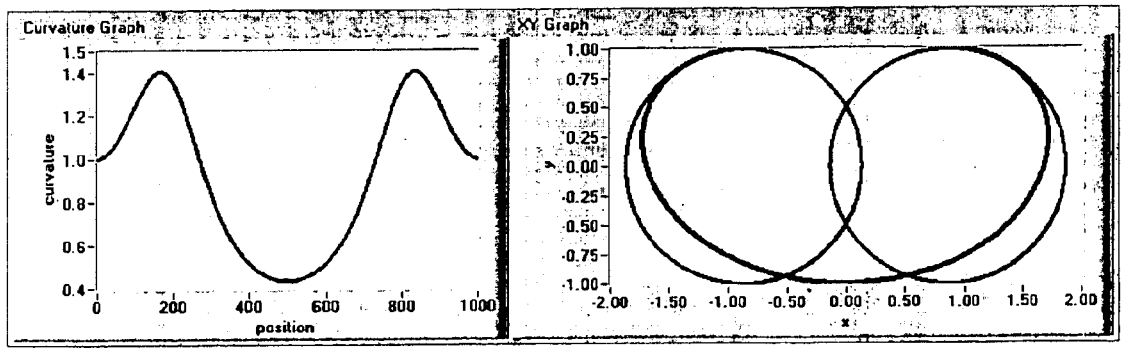
FIG. 4F illustrates a smooth transition between two unit circles, according to one embodiment.

Proof:

Assume a standard honeycomb tiling of the whole plane with diameter 2. Then the set of all circles covering each hexagon contains all points of the plane. As FIG. 4F shows, a smooth transition between two neighbors of this set of circles is possible where the curvature is always less than a certain value (this value can be brought arbitrarily close to 1, but this fact is not essential here). A valid complete scanning scheme visits any circle infinitely often and comes closer than ½" to any point of the given circle where the number n stands for the $n^{th}$ visit of this circle.

More interesting is the case of a circle of radius r, for which the following Theorem holds true.

Theorem 3:

A unit circle can be scanned completely with a smooth curve whose curvature can be arbitrarily close to 2. There is no complete scanning scheme based on curvatures less than 2. This strategy is optimal in the sense that the curvature constraint is minimal (See FIG. 5, described below).

Proof:

It may be proved first that the aforementioned scanning schemes do exist. To this end it is shown that a smooth transition from the inner to the outer circle in FIG. 4D is possible where the curvature of the transition curve is always less than 2 (the curvature of the inner circle). It can also be shown that the length of the transition curve can be made arbitrarily small without going beyond a curvature of 2. Based on this, one can concatenate two arbitrarily chosen inner circles where the curvature stays below 2. A valid scanning scheme chooses a dense set of these inner circles and visits them one after another (See FIG. 5A below).

Now assume there is a scanning scheme of the unit circle where the curvature is always less than 2, say $|k(s)| \leq k^* < 2$. C must come arbitrarily close to $(0, 0)$ infinitely many times. Let $\epsilon$ be a small number and $(x_\epsilon, y_\epsilon)$ a point of C that is in an $\epsilon$-neighborhood of $(0, 0)$. The curve C is oriented in such a way that the normalized tangent of C in $(x_\epsilon, y_\epsilon)$ is $(0,1)$. At least one of the branches of C going through $(x_\epsilon, y_\epsilon)$ goes also through a local maximum of $y(s)$. Let $s_2$ be the nearest of these maximums (see FIG. 5B below).

According to the second part of Lemma 1 the absolute x-component of this point is greater than $1/k^* - \epsilon$. This point satisfies the assumptions of Lemma 1 and according to the first part of Lemma 1 the curve C reaches an absolute x-component value beyond $(1/k^* - \epsilon) + 1/k^* > 1$ for sufficiently small $\epsilon$. This means C leaves the unit circle, which contradicts the assumption that C scans the unit circle completely. q.e.d.

Figure 5A:
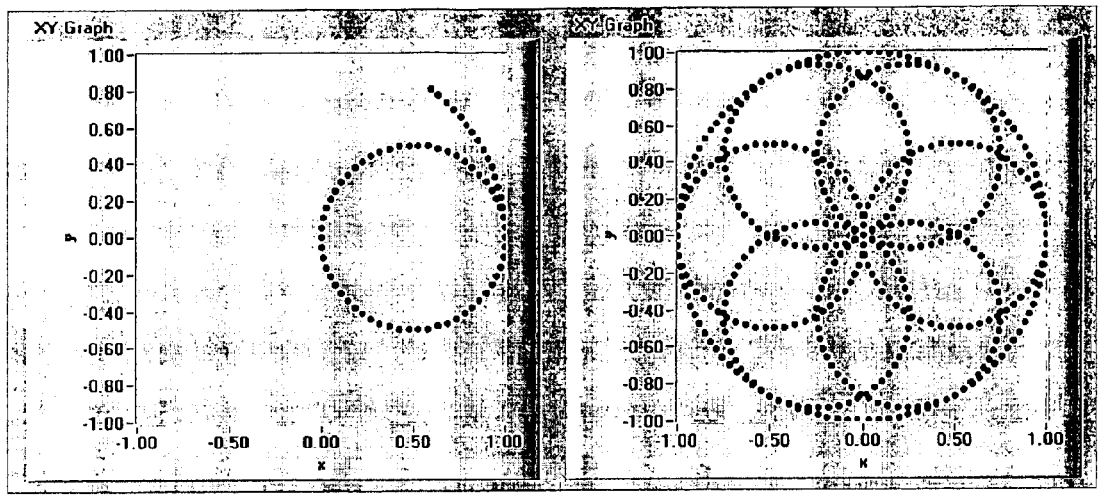
FIG. 5A illustrates a continuous scan curve with bounded curvature, according to one embodiment.

FIGS. 5A and B—Scanning With Minimal Curvature Constraints

FIGS. 5A and B illustrate a scanning scheme based on the above Theorem 3 and proof.

FIG. 5A illustrates a scanning scheme based on multiple circular scan path segments smoothly joined by transition curves. As FIG. 5A shows, the maximum curvature is that of each circle, and so is dependent only on the radius r of each circular scan path segment. Although this example shows the space (surface) covered by six circular scan path segments joined by six corresponding transition curves, the resolution of the coverage may be increased by including more circular scan path segments, with corresponding transition curves. As FIG. 5A shows, this approach is particularly suitable for circular scan regions of radius 2r.

This scheme is utilized in one embodiment of the present invention as a final approach performed after an initial coarse search, described below with reference to FIG. 19.

Figure 5B:
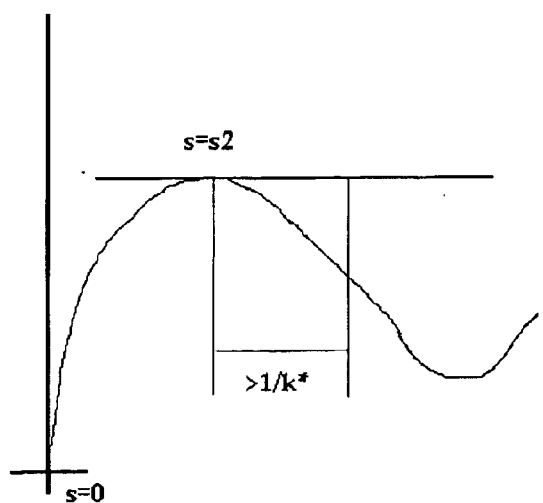
FIG. 5B illustrates a limitation of a scan curve with bounded curvature, according to one embodiment.

FIG. 5B illustrates the construction of $s_2$ and the subsequent part of the curve, as described above in the proof of Theorem 3.

Thus, it is possible to characterize 2d regions that can be scanned completely. Moreover, a sharp bound for the minimal absolute upper curvature allowing such a scanning scheme can be calculated. It is furthermore possible to show that numerous cross-free complete scanning schemes of given regions do exist but the upper absolute curvature value always tends to infinity. Further results deal with synchronous scanning schemes of regions where the different paths do not have any points in common.

Scanning Without Curvature Constraints

The motivation for developing scanning schemes without curvature constraints is manifold. First of all, piecewise linear trajectories are very common in motion control applications. The curvature discontinuities at the end points of the lines are often tolerable, especially for light payloads, e.g. in the form of a start-acceleration-constant velocity-deceleration-stop loop. Secondly, motion controllers are often capable of splining separate curves together. This may reduce curvature problems significantly with slight alterations of the original path shape.

Scanning without curvature constraints is less restrictive than scanning with curvature constraints, and gives developers the opportunity to use numerous strategies. Described below are conformal mappings of given sampling strategies in specific geometries that produce new schemes in the image space. Scanning strategies based on the theory of Low Discrepancy Sequences and the novel approach of Low Discrepancy Curves are also described.

Figure 6:
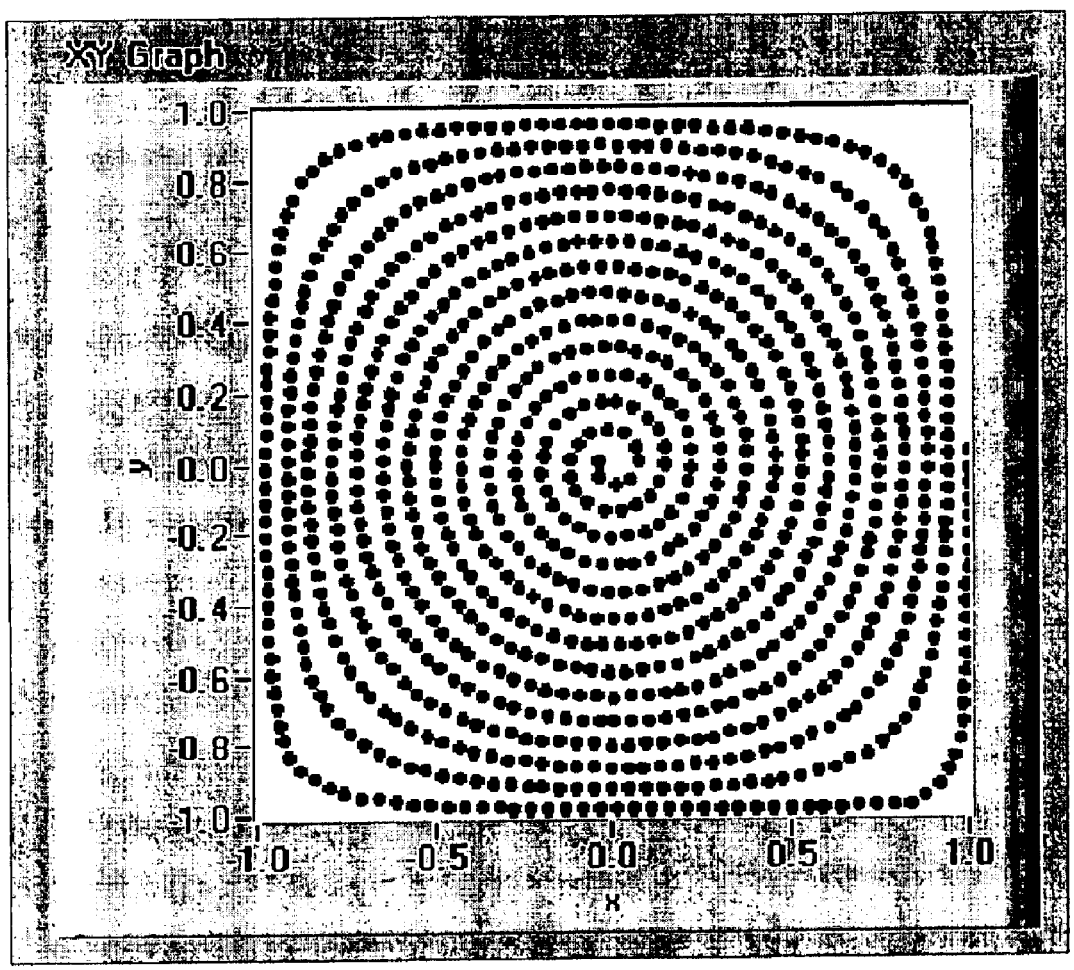
FIG. 6 illustrates a conformal spiral scan curve, according to one embodiment.

FIG. 6—Conformal Spirals

Grid-like scanning schemes are not ideal from a motion control standpoint. Vertices of the curves represent discontinuous first derivatives where a smooth motion control based trajectory should have at least two continuous derivatives. A grid-like scanning scheme automatically means that a start-acceleration-constant speed-deceleration-stop cycle must be repeated many times. An equally distributed set of points lying on a curve is desirable. In this case the travel time is shorter and the data acquisition task and the coupled analysis routines are greatly simplified.

A compromise between the simplicity of a grid-like scanning scheme and the smoothness of the trajectory can be achieved when the theory of conformal mappings is applied.

A mapping w=f(z) defined on a region D that is part of the complex plane is said to be angle preserving, or conformal, at $z_0$ if it preserves angles between oriented curves in magnitude as well as in orientation. If f is a conformal mapping then orthogonal curves are mapped onto orthogonal curves. The following well known result shows in which regions a mapping defined by an analytic function is conformal.

Let f(z) be an analytic function in the domain D, and let $z_0$ be a point in D. If f'(z) <>0, then f(z) is conformal at $z_0$.

According to the Riemann mapping theorem, there exists a conformal map from the unit disk to any simply connected planar region (except the whole plane). However, finding such a map for a specific region is generally difficult. An important special case where a formula is known is when the target region is polygonal. In that case the Schwarz-Christoffel formula applies:

$$f(z) = f(0) + c \int_0^z \prod_{j=1}^n (\zeta - z_j)^{a_j - 1} d\zeta \qquad (1)$$

Here the polygon has n vertices, the interior angles at the vertices are $\pi a_1, \ldots, \pi a_n$ in counterclockwise order, and c is a complex constant. The numbers $Z_1, \ldots, z_n$ are the pre-images of the polygon's vertices, or pre-vertices, which lie in order on the unit circle. Usually, these numbers must be computed separately.

Under some specific circumstances conformal mappings have a simple structure. The conformal transform mapping a circle onto a square can be described as a geometric morph of all points in the circle into corresponding points in the square. More specifically, $$f(z) = c \int_0^z \frac{1}{\sqrt{\zeta^4 + 1}} d\zeta \qquad (2)$$

$$c = \frac{1}{\int_0^1 \frac{1}{\sqrt{s^4 + 1}} ds}$$

for all complex numbers z=a+jb with $-1 \leq a, b \leq 1$

Given that an Archimedes spiral scans a circular region in an efficient manner, the same should be true for the image of this spiral when the conformal mapping (1) is applied. Conformal mappings preserve angles and curvature is defined as the change of angle along a given curve.

FIG. 6 illustrates an Archimedes Spiral conformally mapped to a square. As FIG. 6 demonstrates, the conformal Archimedes Spiral scans a square more smoothly than the boustrophedon curve described above.

Figure 7:
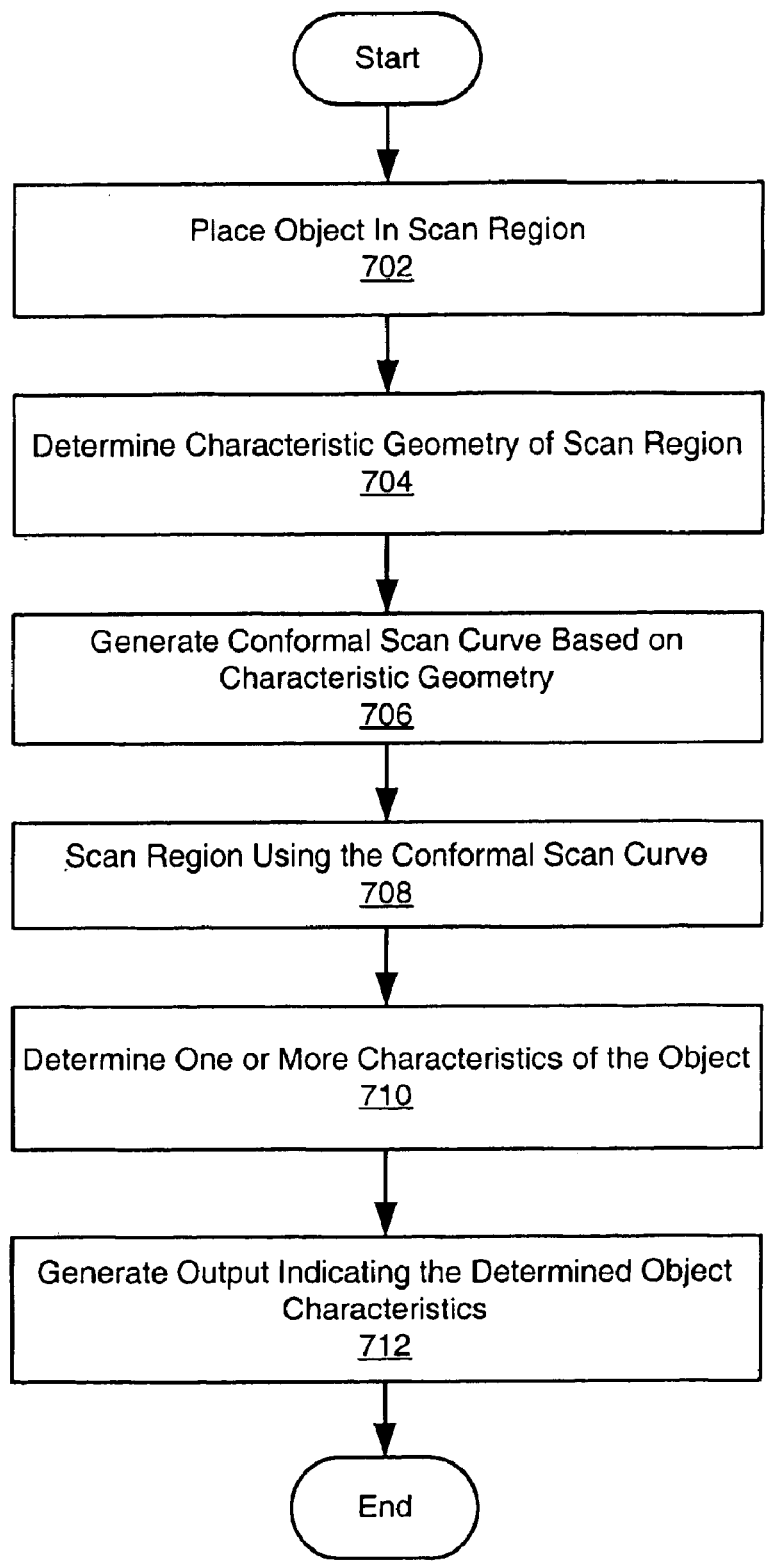
FIG. 7 is a flowchart of a conformal scanning process, according to one embodiment.

FIG. 7—Flowchart of Conformal Scanning Process

FIG. 7 is a flowchart of a conformal scanning process. An example of a conformal scan curve is described above with reference to FIG. 6. It should be noted that in some embodiments some of the steps presented below may occur in a different order than shown, or may be omitted.

As FIG. 7 shows, in 702 the object to be scanned may be placed in the scan region. In one embodiment, the object may appear in the scan region automatically, such as in an inspection system where the object is moved on a conveyor past the scanning apparatus. The object may be paused in front of the scanner, or may simply be moved past slowly enough that the scanning operation may be performed without stopping the object's motion. In one embodiment, the presence of the object in the scan region may be undetermined, i.e., the region may be scanned to determine whether the object is there.

In 704, a characteristic geometry of the scan region may be determined. For example, most scan regions tend to be basic geometrical shapes, such as circles, squares, rectangles, and so on.

In 706, a conformal scan curve may be generated based on the determined characteristic geometry. In one embodiment, the conformal scan curve may be generated by performing a conformal mapping between the determined characteristic geometry and an existing scanning curve. In the preferred embodiment, the existing scanning curve is an efficient scanning curve which has a different characteristic geometry than the determined characteristic geometry of 704, i.e., the existing scanning curve comprises a subset of points in a first geometry which is different from the characteristic geometry of the scan region. In one embodiment, the existing scanning curve may be an optimum scanning curve for the first geometry. More specifically, in a preferred embodiment, the existing curve may be one which minimized angle deviations, while covering the first geometry efficiently. In other words, the curve may be one which minimizes curvature, such as having a maximum curvature below a specified curvature value.

In one embodiment, the conformal mapping between the characteristic geometry and the first scanning curve may be performed by 1) determining a mapping function which maps each point in the first geometry to a corresponding point in the determined characteristic geometry; and 2) applying the mapping function to each point in the subset of points in the first geometry to generate a corresponding subset of points in the characteristic geometry, wherein the subset of points in the characteristic geometry comprises the conformal scanning curve.

For example, if the determined characteristic geometry of the scan region is a square, and the existing scanning curve is an Archimedes Spiral with a circular characteristic geometry, then a conformal mapping between the square and the existing curve generates a smooth 'square' spiral scan curve, as illustrated in FIG. 6. Of course, other characteristic geometries may produce different conformal curves. It should be noted that one of the primary features of conformal mappings is the preservation of angles, i.e., if a curve in a first geometry makes a forty degree angle with a feature, then the conformally mapped curve will make a forty degree angle with the conformally mapped feature.

In 708, the region may be scanned using the generated conformal scan curve. In one embodiment, the scanning is performed by measuring the region at a plurality of points along the conformal scan curve. In one embodiment, the measurements may be made at equidistant points along the conformal scan curve.

In 710, one or more characteristics of the object may be determined in response to the scanning of 708. Examples of such characteristics may include the object's precise location, shape, colors, identity, or any other detectable characteristic. In one embodiment, measuring the region at the plurality of points along the conformal scanning curve produces data which may be examined or analyzed to determine the one or more characteristics of the object.

Finally, in 712, output indicating the one or more characteristics of the object may be generated. In one embodiment, the output may be displayed on a computer display. In another embodiment, the output may be transmitted to one or more internal or external systems. In another embodiment, the output may be stored in a computer memory for later analysis or use.

It should be noted that although the example given is for a two dimensional region and object, the method described above may be applied to regions and objects of one, two, and three dimensions. In other embodiments, the method may be applied to regions and objects of dimensionality greater than three.

Figure 8A:
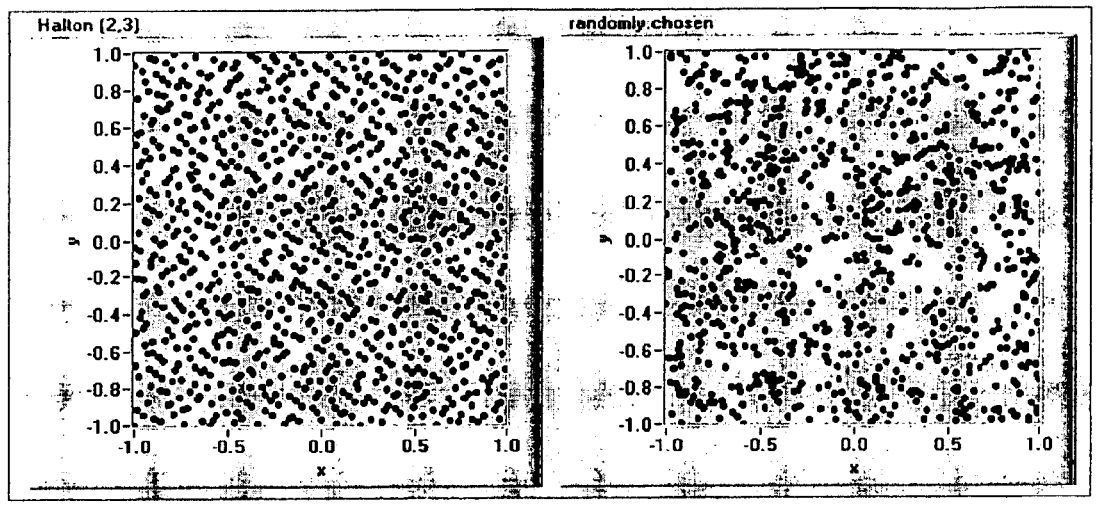
FIG. 8A illustrates a Halton Sequence and a random distribution of points.

FIG. 8A—Low Discrepancy Sequences

Pseudo-random sequences have been used as a deterministic alternative to random sequences for use in Monte Carlo methods for solving different problems. Recently, it was discovered that there is a relationship between Low Discrepancy Sets and the efficient evaluation of higher-dimensional integrals. Theory suggests that for midsize dimensional problems, algorithms based on Low Discrepancy Sets should outperform all other existing methods by an order of magnitude in terms of the number of samples required to characterize the problem.

Given a function $f(x,)$ the problem of calculating the integral $$I(f) = \int_0^1 f(x)dx \qquad (3)$$

in the most efficient manner is not a well posed problem. An approximate strategy may be based on the following procedure:

(A) Construct an infinite sequence $\{x_1, x_2, x_3, \ldots x, \ldots\}$ of real numbers in [0, 1] that does not depend on a specific function $f$ (nothing is known about $f$ in advance, except some general smoothness properties).

(B) During the $n^{th}$ step of the algorithm calculate $f(x_n)$ and the approximation to the integral in (3) as:

$$I_n(f)=(f(x_1)+ \ldots +f(x_n))/n \qquad (4)$$

If a certain criterion is satisfied stop, else repeat step (B). The stopping criterion depends strongly on objectives such as accuracy or speed.

This algorithm differs from standard methods such as the trapezoidal rule which is based on equally distributed points in [0, 1] in that there is no relationship between consecutive sets $x_1(n)=i/n$ and $x_i(n)=i/(n+1)$. In other words, if the approximation given in equation (4) fails a design goal, a complete recalculation of numerous f-values is necessary. On the other hand, it is well known that the trapezoidal rule gives a $1/n^2$ rate of convergence for a given continuous function f.

Obviously, the quality of the trapezoidal rule is based on a highly homogeneous set of points. To quantify the homogeneity of a finite set of points, the definition of a discrepancy of a given set was introduced:

$$D(X) = \sup_R |m(R) - p(R)| \qquad (5)$$

Here, R runs over all rectangles [0, r] with $0 \leq r \leq 1$, m(R) stands for the length r of the closed interval R, and p(R) is the ratio of the number of points of X in R and the number of all points of X. The definition given in equation (5) can be generalized to the case of d dimensions (d=2, 3,...), where the term interval must be interpreted as a d dimensional rectangle. The lower the discrepancy the better or more homogeneous the distribution of the set. The discrepancy of an infinite sequence $X=\{x_1, x_2, \ldots, x_n, \ldots\}$ is a new sequence of positive real numbers $D(X_n)$, where $X_n$ stands for the first n elements of X. Other definitions for the discrepancy of a set exist that avoid the worst-case scenario according to (5).

There exists a set of points of given length that realizes the lowest discrepancy. It is well known in the art that the following inequality (6) holds true for all finite sequences X of length n in the d dimensional unit cube (the Roth bound, see Weisstein [1999] or Kocis and Whiten [1997]):

$$D(X) \leq B_d \frac{(\log n)^{(d-1)/2}}{n}. \qquad (6)$$

$B_d$ depends only on d. Except for the trivial case d=1, it is not known whether the theoretical lower bound is attainable. Many schemes to build finite sequences X of length n do exist that deliver a slightly worse limit $$D(X) \leq B_d \frac{(\log n)^d}{n}. \qquad (7)$$

There are also infinite sequences X with $$D(X_n) \leq \frac{B_d (\log n)^d}{n} \qquad (8)$$

for all for all sub-sequences consisting of the first n elements. The latter result gave rise to the definition of the Low Discrepancy (infinite) Sequences X. The inequality in equation (8) must be valid for all sub-sequences of the first n elements, where $B_d$ is an appropriately chosen constant. Low Discrepancy Sequences are also known as quasi-random sequences.

Many of the well-studied low-discrepancy sequences in d-dimensional unit cubes can be constructed as combinations of 1-dimensional low-discrepancy sequences. The most popular low-discrepancy sequences are based on schemes introduced by Corput [1937], Halton [1960], Sobol' [1967], and Niederreiter [1992].

The relationship between integrals, approximations, and an infinite sequence $X=\{x_1, X_2, \ldots\}$ in n dimensions is given by the Koksma-Hlawka inequality.

$$|I(f) - I_n(f)| \leq V(f) \cdot D(X_n) \qquad (9)$$

$$I(f) = \int_0^1 dx f(x)$$

$$I_n(f) = \frac{1}{n}\sum_{i=1}^{n} x_n$$

where V(f) is the variation of f in the sense of Hardy and Krause. For more information regarding Low Discrepancy Sequences, the book "Random Number Generation and Quasi-Monte Carlo Methods", by H. Niederreiter, CBMS-NSF Regional Conference Series in Applied Math., No.63, SLAM, 1992 gives a comprehensive introduction into the implementation of Low Discrepancy Sequences (Halton and Sobol'). The Halton method is described in detail below. All of the test results presented are based on Halton sequences.

Halton sequences in 1-d start with the choice of a natural number greater than 1. Though not absolutely necessary, prime numbers p=2, 3, 5,... are typically chosen. If p is a given prime number and $x_n$ the $n^{th}$ element of the Halton sequence, the following algorithm determines $x_n$.

(A) write n down in the p-ary system $$n = n_q \ldots n_0, \; n = n_0 + n_1 p + \ldots + n_q p^q$$

(B) Reverse the order of the digits and add the p-ary point $$0.n_0 n_1, \ldots n_q$$

(C) It is $$x_n = n_0 \cdot p^{-1} + n_1 p^{-2} + K + n_q p^{-(q+1)}$$

The $n^{th}$ element of the Halton sequence can be calculated independently of all other elements. As mentioned above, in d dimensions one has to interpret different 1-dimensional Halton sequences as coordinates of points in d dimensions. It is very common to start with the first d prime numbers.

FIG. 8A shows the first 1000 elements of a Halton sequence (left) in the unit square for a valid choice of starting prime numbers, namely (2, 3). The graph on the right hand side is constructed with the aid of uniformly distributed random numbers. The differences are pronounced, as may be seen.

Halton sequences in 1-D are Low Discrepancy Sets in the sense of equation (8). More precisely, for all n and for all Halton sequences X that are based on a prime number p:

$$D(X) \leq C_p \frac{\log n}{n} \quad \text{with} \tag{10}$$

$$C_p = \begin{cases} \frac{p^2}{4(p+1)\log p} & \text{when } p \text{ is even} \\ \frac{p-1}{4\log p} & \text{when } p \text{ is odd} \end{cases}$$

A similar result holds true for Halton sequences in d dimensional unit squares. In a 2-dimensional unit square for the (p,q) Halton sequence with prime numbers p and q the discrepancy is $$D(X) \leq \frac{2}{n} + \frac{(\log n)^2}{n}\left[\left(\frac{p-1}{2\log p} + \frac{p+1}{2\log n}\right)\left(\frac{q-1}{2\log q} + \frac{q+1}{2\log n}\right)\right] \tag{11}$$

Scanning Methods Based on Low Discrepancy Sequences in Conjunction with TSP

Assume an open convex region O in 2d. Furthermore, assume a Low Discrepancy Sequence in this region O. If it is known that any point of a small object in O is in the neighborhood of at least one of the first N Low Discrepancy points of the given sequence and if the size of this neighborhood is reasonably small, the following algorithm can be used to implement an efficient scanning scheme for this situation.

A) Fix one of the points as the starting point.

B) Construct a good approximation of the TSP (Traveling Salesman Path), e.g. Lin's nearest neighbor algorithm.

C) If necessary try to increase the efficiency of the solution by manual inspection.

Figure 8B:
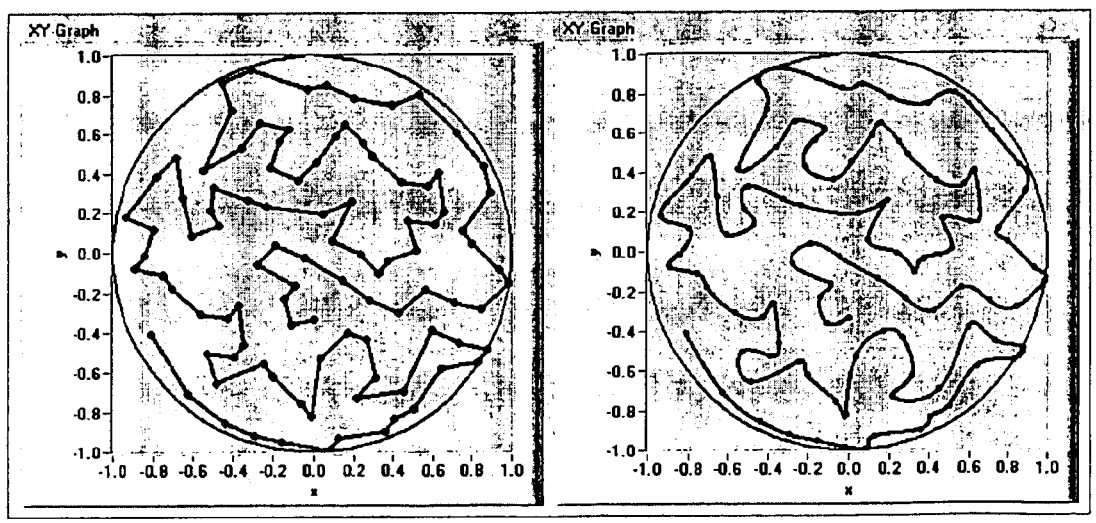
FIG. 8B illustrates a Low Discrepancy Sequence Path and a Splined Low Discrepancy Sequence Path, according to one embodiment.

FIG. 8B—Splining Low Discrepancy Sequence Path Segments

In some cases there may be good reasons to fix the starting point based on additional information, e.g. probability distribution of the location of the small object. Furthermore, the constructed path lies entirely in O, i.e. it cannot leave the convex region O. Usually, the point (C) is of minor concern. Because of distribution properties of the given Low Discrepancy Sequence in S, it is likely that neighborhoods are not exhausted during an early phase of the execution of the algorithm. It is also possible to spline the resulting piecewise linear trajectory to guarantee better curvature behavior or to modify Lin's algorithm in such a manner that the newly chosen line and the old one produce "curvatures" below a desired value (or at least smoother transitions). Naturally, this will in almost all cases increase the length of the computed trajectory.

FIG. 8B depicts the result of such an optimization routine. The right graph is simply a splined version of the left one.

Figure 9:
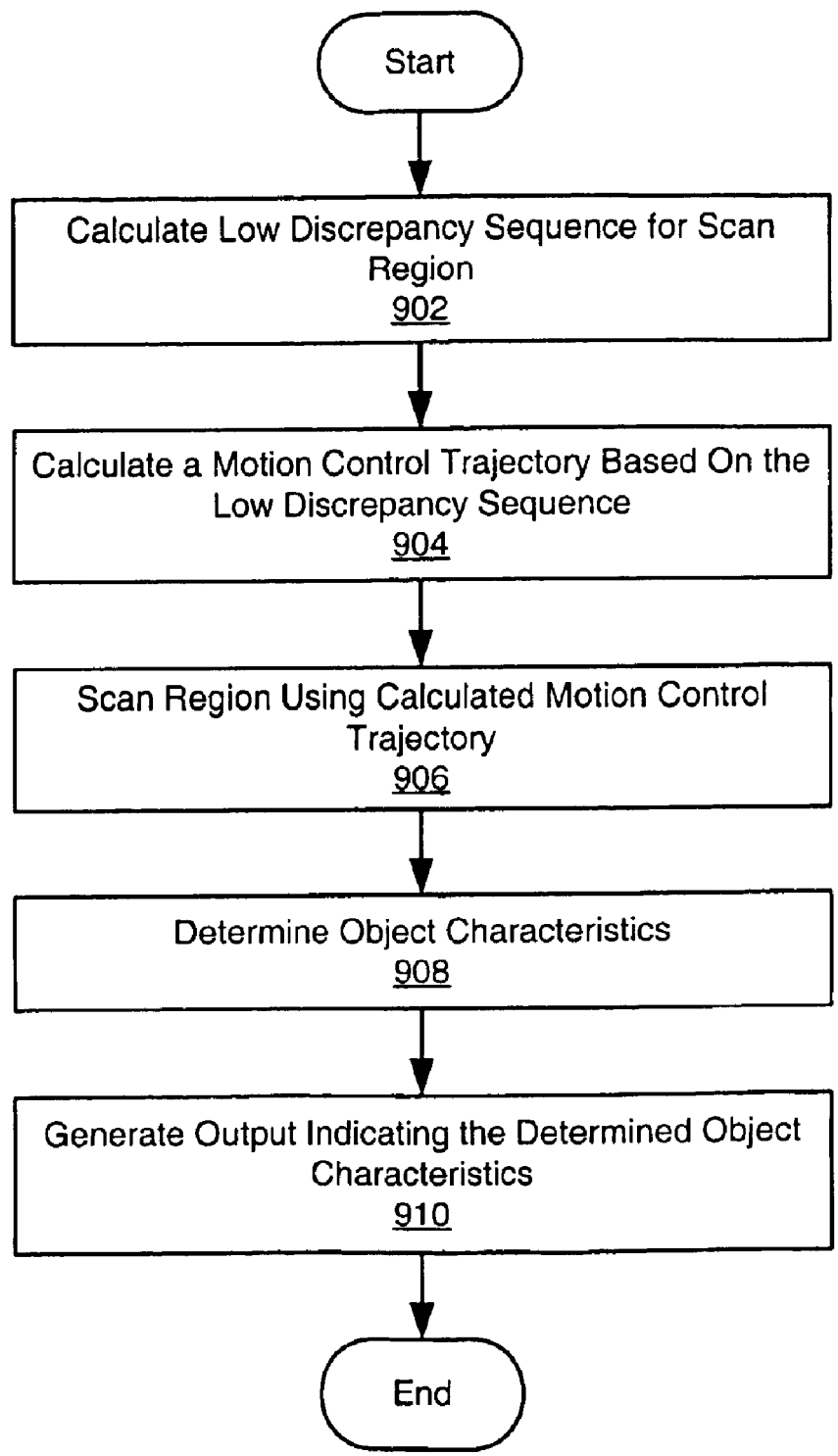
FIG. 9 is a flowchart of a Low Discrepancy Sequence scanning process, according to one embodiment.
Figure 10:
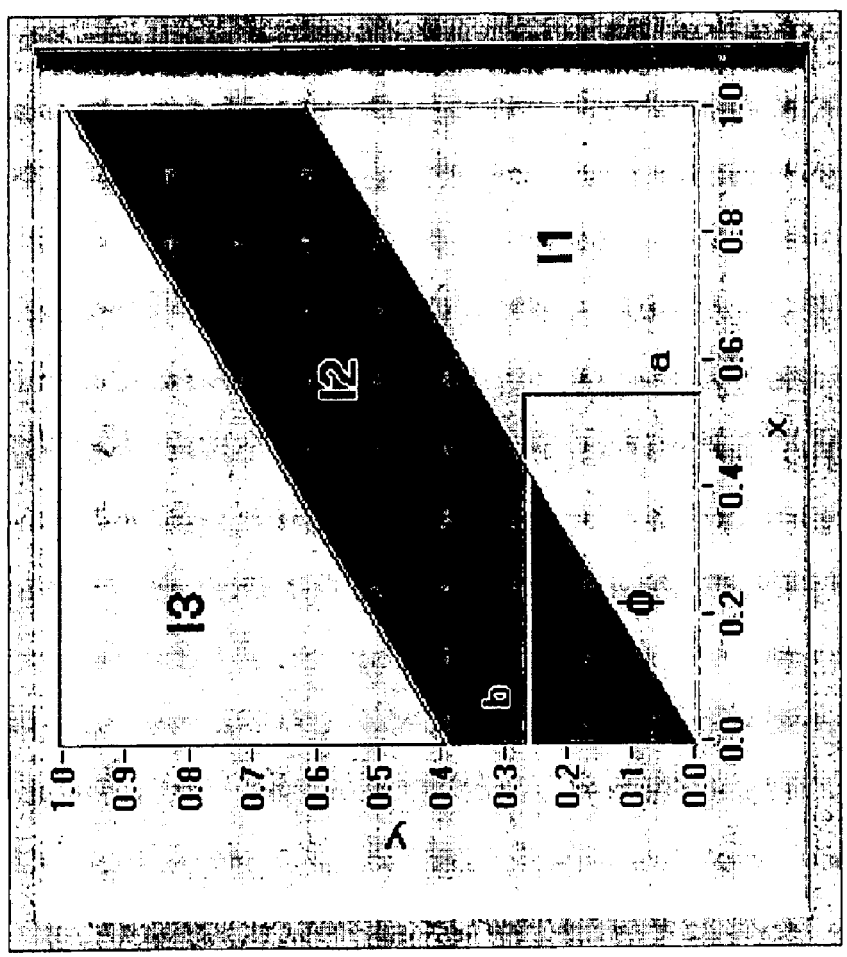
FIG. 10 illustrates component regions used to define a Low Discrepancy Sequence, according to one embodiment.

FIG. 9—Flowchart of Low Discrepancy Sequence Scanning Process

FIG. 9 is a flowchart of a Low Discrepancy Sequence scanning process. Low Discrepancy Sequences are described above with reference to FIGS. 8A and 8B. It should be noted that in some embodiments some of the steps presented below may occur in a different order than shown, or may be omitted.

As FIG. 9 shows, in 902, a Low Discrepancy Sequence may be calculated for the scan region. In one embodiment, the calculation of the Low Discrepancy Sequence may be performed in a preprocessing phase before an object is placed in the scan region. In one embodiment, calculating the Low Discrepancy Sequence of points in the region may comprise determining a plurality of points, wherein any location in the region is within a specified distance of at least one of the Low Discrepancy Sequence of points.

In 904, a motion control trajectory may be generated based on the calculated Low Discrepancy Sequence of 902. In one embodiment, generating the motion control trajectory may be performed by generating a Traveling Salesman Path (TSP) from the Low Discrepancy Sequence of points, where the TSP includes each point of the Low Discrepancy Sequence of points, and re-sampling the TSP to produce a sequence of motion control points comprising the motion control trajectory.

In one embodiment, generating the Traveling Salesman Path is performed by applying Lin's Nearest Neighbor algorithm to the Low Discrepancy Sequence of points to generate the Traveling Salesman Path.

In one embodiment, the generated TSP comprises a first sequence of points which defines a first trajectory having a first maximum curvature. Re-sampling the TSP comprises manipulating the first sequence of points to produce the sequence of motion control points defining a second trajectory having a second maximum curvature which is less than the first maximum curvature. Thus, the TSP sequence of points may be used to generate a scan curve with a lower maximum curvature than the first trajectory. In one embodiment, the sequence of motion control points may be a superset of the first sequence of points. In another embodiment, the sequence of motion control points may comprise a subset of the first sequence of points and one or more additional points.

In 906, the region may be scanned using the generated motion control trajectory. In one embodiment, scanning the region using the generated motion control trajectory may comprise scanning the region along the motion control trajectory, i.e., measuring the region at a plurality of points along the generated motion control trajectory.

In one embodiment the object to be scanned may be placed in the scan region prior to said scanning. In one embodiment, the object may appear in the scan region automatically, such as in an inspection system where the object is moved on a conveyor past the scanning apparatus. The object may be paused in front of the scanner, or may simply be moved past slowly enough that the scanning operation may be performed without stopping the object's motion. In one embodiment, the presence of the object in the scan region may be undetermined, i.e., the region may be scanned to determine whether the object is there.

It should be noted that although the example given was for a two dimensional region and object, the method described above may be applied to regions and objects of one or two dimensions. In other embodiments, the method may be applied to regions and objects of dimensionality greater than two.

In 908, one or more characteristics of the object may be determined in response to the scanning of 906. Examples of such characteristics may include the object's precise location, shape, colors, identity, or any other detectable characteristic. In one embodiment, measuring the region at the plurality of points along the conformal scanning curve produces data which may be examined or analyzed to determine the one or more characteristics of the object.

Finally, in 910, output indicating the one or more characteristics of the object may be generated. In one embodiment, the output may be displayed on a computer display. In another embodiment, the output may be transmitted to one or more internal or external systems. In another embodiment, the output may be stored in a computer memory for later analysis or use.

Low Discrepancy Curves in the Unit Square

The following theorem is a result in ergodic dynamics. Let $x_n = \{n\alpha\}$ and $X_n = \{x_1, \ldots, x_n\}$, where $\alpha = (\alpha_1, \ldots, \alpha_d)$ is irrational and $\alpha_1, \ldots, \alpha_d$ are linearly independent over the rationals. Then for almost all $\alpha$ in $R^d$ (i.e. with exception of a set of points that has measure 0):

$$D(X_n) = O\left(\frac{\log^{d+1+\varepsilon} n}{n}\right) \quad (12)$$

Given a piecewise smooth and finite curve C in the unit square S, let R be an arbitrary aligned rectangle in S with lower left corner in (0,0). Furthermore, let L be the length of the given curve in S and l be the length of the sub-curve of C that lies in R. In the case of well-distributed curves, the ratio l/L should represent the area A(R) of R. This gives rise to the following definition of discrepancy of a given finite piecewise smooth curve in S:

$$D(C) = \sup_R \left|\frac{l}{L} - A(R)\right| \quad (13)$$

It would be desirable to construct curves C with the property that the discrepancy is always small. More precisely, an infinite and piecewise sufficiently smooth curve C: $R^+ \to S$ in natural parameterization may be termed a low-discrepancy curve if for all positive arc lengths L the curves $C_L = C/_{[0,L]}$ satisfies the inequality (the function F must be defined appropriately):

$$D(C_L) \leq F(L) \quad (14)$$

A piecewise smooth curve in natural parameterization generates sequences $\{x_1, x_2, \ldots, x_n, \ldots\}$ by $X_n = C(n\Delta)$ where $\Delta$ is a fixed number.

The inequality (14) implies a similar formula for the derived sequence $\{x_1, x_2, \ldots, x_n, \ldots\}$. In other words, a low-discrepancy curve generates many sequences that show low-discrepancy like behavior from the sequence standpoint. Because of (12), a realistic goal is $$F(L) = O\left(\frac{\log^{2+\varepsilon} L}{L}\right) \text{ with } d = 2 \quad (15)$$

which may be shown to be attainable.

Figures 11A, 11B, 11C:
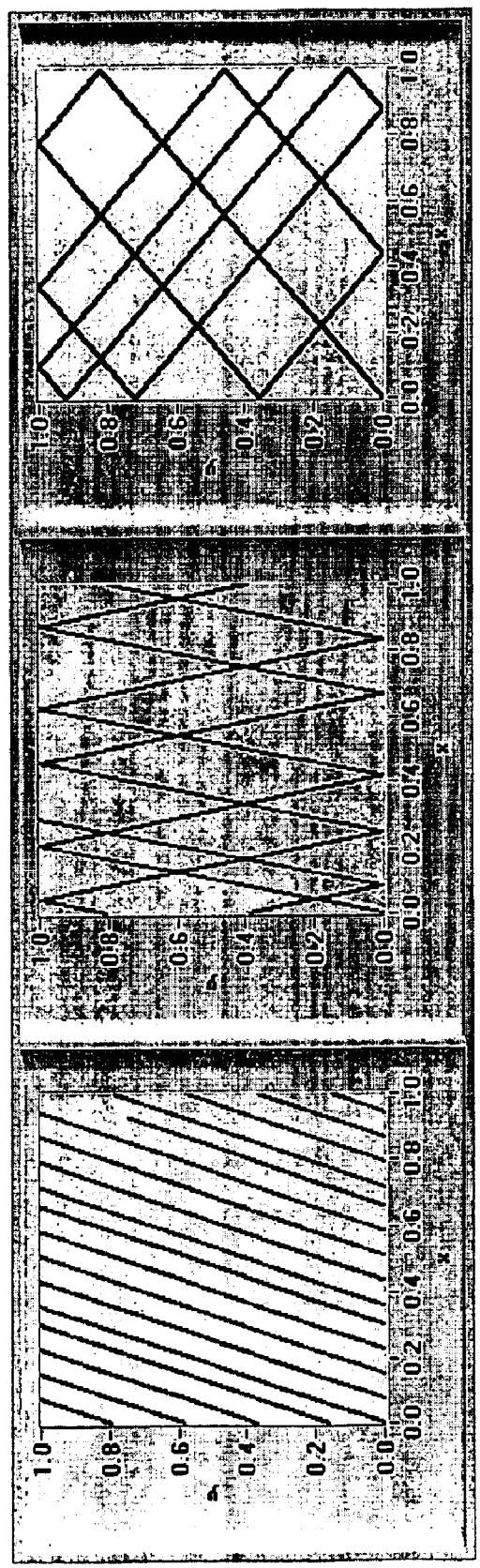
FIGS. 11A–11C illustrate various straight line paths forming an LDC on a unit square.

To this end, let for $\alpha = (\alpha_1, \alpha_2)$ $C_\alpha(\alpha)$ be the piecewise linear curve $(t\alpha_1 \bmod 1, t\alpha_2 \bmod 1) = (\{n\alpha_1\}, \{n\alpha_2\})$ where t is in $R^+$ (see FIG. 11A).

Theorem 4:

For almost all numbers $\alpha$ in $R^2$ $C_\alpha(\alpha)$ is a low-discrepancy curve in the sense of (14) and (15).

Proof:

Without loss of generality, it is assumed that $\alpha_1, \alpha_2 > 0$. $C_\alpha(\alpha)$ has common points with axes x=0 and y=0 for $\{n\alpha_2/\alpha_1\}$ and $\{n\alpha_1/\alpha_2\}$, respectively. n is an arbitrary natural number. For almost all $\alpha_1$ and $\alpha_2$ all three numbers $(\alpha_1, \alpha_2), \alpha_1/\alpha_2$, and $\alpha_2/\alpha_1$ generate low-discrepancy sequences in the sense of (12) in $R^2$, $R^1$, and $R^1$, respectively.

Let $\tan(\phi) = \alpha_2/\alpha_1$. Let $[0,a] \times [0,b]$ be a rectangle with 0<a, b<1. Without loss of generality, b/a<tan($\phi$) may be assumed. See FIG. 10 for further details and for illustrative definitions of $I_1$, $I_2$, and $I_3$. Mathematically, they may be defined as:

$$I_1 = \frac{a^2}{2\cos(\phi)} \quad (16)$$

$$I_2 = \frac{a(b - a\tan(\phi))}{\cos(\phi)}$$

$$I_3 = \frac{a^2 \sin(\phi)}{2\cos^2(\phi)}$$

$$I_1 \sin(\phi) + (I_2 + I_3)\cos(\phi) = ab$$

The latter term stands for the percentage that an average line in $[0,1] \times [0,1]$ with slope tan($\phi$) has in common with the rectangle $[0,a] \times [0,b]$. It is exactly the area of this rectangle.

The Koskma-Hlawka inequality (4) can be applied to approximate integrals $I_1$, $I_2$, $I_3$. In case of $I_1$ define:

$$l_1(x) = \frac{a-x}{\cos(\phi)} \text{ for } 0 \le x \le a \text{ and } l_1(x) = 0 \text{ for } a \le x \le 1$$

It follows that $$\left|I_1 - \sum l_1(x_n)\right| = O\left(\frac{\log^{2+\varepsilon} n}{n}\right) \text{ where } x_n = \{n\alpha_1/\alpha_2\} \qquad (17)$$

where the sum stands for the length of that part of the given curve that lies in $[0,a]\times[0,b]$. $I_2$ and $I_3$ can be treated similarity. (16) and (17) combined guarantee that $C_a(\alpha)$ is low-discrepancy.
q.e.d.

FIGS. 11A–11C—Low Discrepancy (Straight Line) Scan Paths on the Unit Square

In the following, two variations of Theorem 4 are needed. As FIGS. 11A–11C demonstrate, these two new variations (11B) and (11C) are based on total reflections of $(t\alpha_1, t\alpha_2)$ at the upper and lower edges of the unit square and at all four edges of the unit square, respectively. The resulting curves are referred to as $C_b(\alpha)$ and $C_c(\alpha)$. The latter curve is continuous.

Theorem 5:

For almost all numbers $\alpha$ in $R^2$ $C_b(\alpha)$ and $C_c(\alpha)$ are low-discrepancy curves in the sense of (14) and (15).

Proof:

One can show that Theorem 4 is still valid when in the definition of low-discrepancy curves a much broader class of rectangles R is considered. More precisely, one can replace rectangles $R=[0,a]\times[0,b]$ with the more generic family $R=[c,a]\times[d,b]$.

Curves of Type (b):

Such a curve can be translated into an equivalent version acting in $[0,1]\times[0,2]$. To this end, reflections at the upper edge (see FIG. 11B) are ignored. What results is an equivalent scheme of type (a) in $[0,1]\times[0,2]$. For almost all choices of $\alpha$ the resulting curve in $[0,1]\times[0,2]$ is low-discrepancy. The relation between the original space and the new one is straightforward. The original curve goes through a rectangle $R=[0,a]\times[0,b]$ if and only if the derived curve in $[0,1]\times[0,2]$ goes through $[0,a]\times[0,b]$ or through $[0,a]\times[2-b,2]$ (see the remark at the beginning of this proof). The latter means that $C_b(\alpha)$ satisfies (14) and (15).

Curves of Type (c):

Essentially the arguments for type (b) are valid, for almost all $\alpha$ curves of type (b) in $[0,2]\times[0,1]$ are low-discrepancy. Such curves (see FIG. 11C) can be generated when reflections at the right edge are ignored. The mirrored version of this curve goes through a rectangle $R=[0,a]\times[0,b]$ if and only if the original curve in $[0,2]\times[0,1]$ goes through $[0,a]\times[0,b]$ or $[2-a,2]\times[0,b]$ (see the remark at the beginning of this proof). The latter means that $C_c(\alpha)$ satisfies (14) and (15).
q.e.d.

Curves $C_c(\alpha)$ can be regarded as first examples of continuous trajectories in a unit square that offer low-discrepancy behavior. In real scanning scenarios they are highly efficient compared to other techniques.

The following results are also relevant. The proofs are similar to those of Theorem 4 and Theorem 5.

Theorem 6:

For almost all numbers $\alpha$ in $R^d$ $C_a(\alpha)$, $C_b(\alpha)$ and $C_c(\alpha)$ are low-discrepancy curves in the sense of (14) and (15) in d-dimensional unit cubes.

Figure 12A:
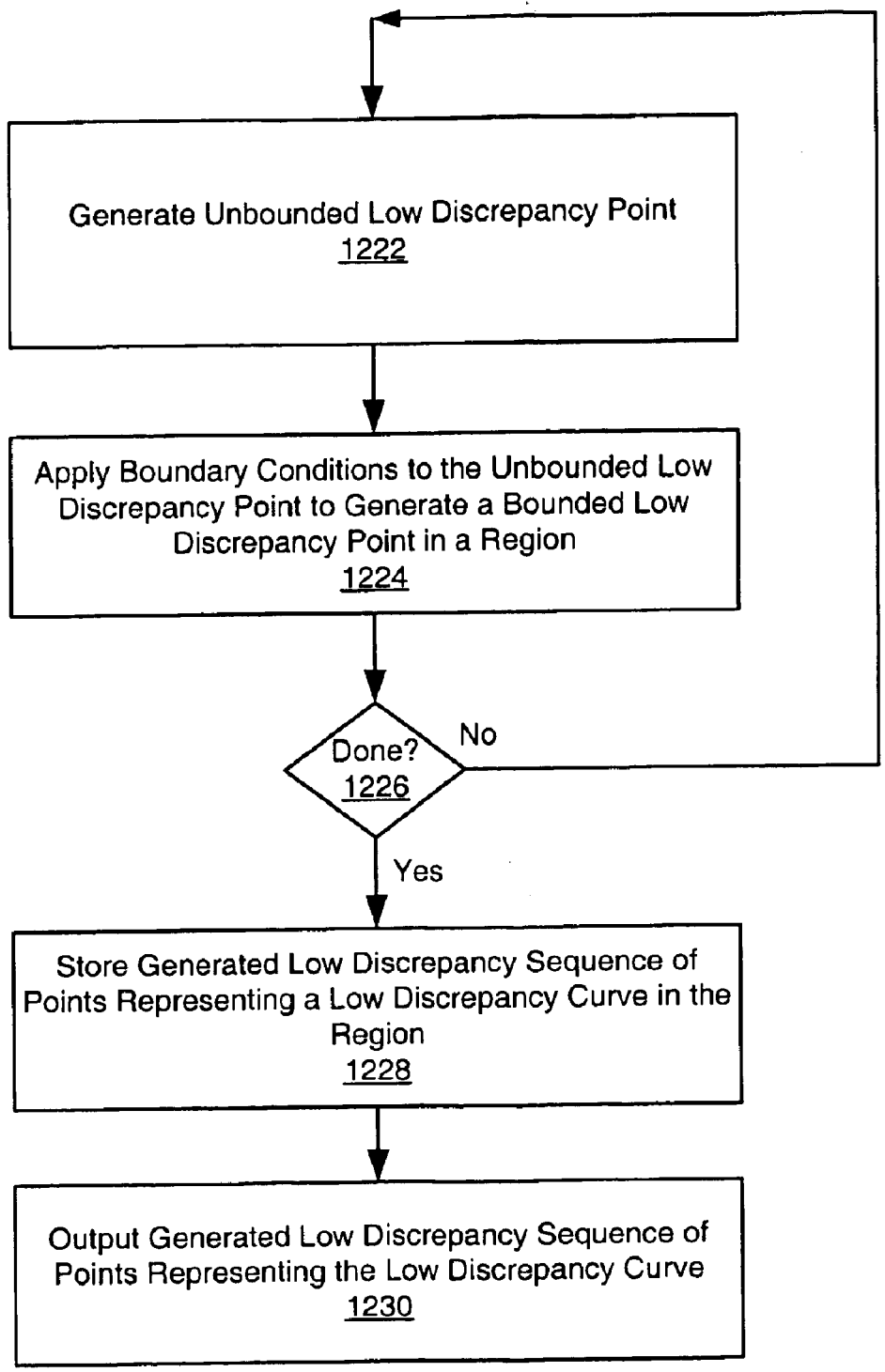
FIGS. 12A and 12B flowchart embodiments of a process for generating a Low Discrepancy Curve scan path in a region, according to one embodiment.
Figure 12B:
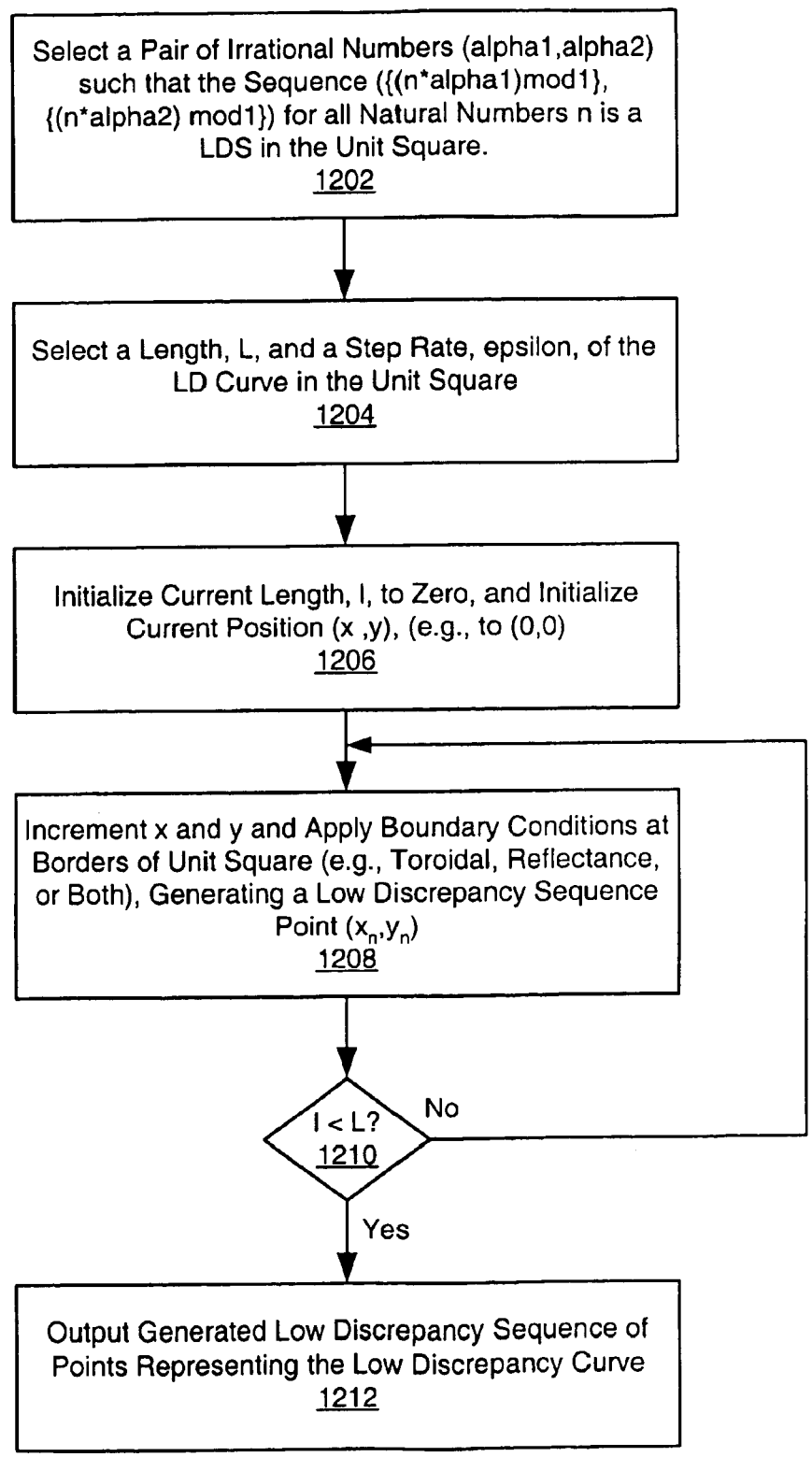

FIGS. 12A and 12B—Flowcharts of a Method for Generating a Low Discrepancy Curve in the Unit Square FIGS. 12A and 12B are flowcharts of a method for generating a curve in a region, such as a unit square, in accordance with the theory presented above, and in relation to the illustrations of FIGS. 11A–11C. FIG. 12A describes the method at a high level, and FIG. 12B flowcharts a detailed embodiment of the method. In one embodiment, the generated curve may be a Low Discrepancy Curve. It should be noted that in various embodiments, one or more of the steps may be performed in a different order than shown, or may be omitted as desired. Furthermore, additional steps may be performed as desired. It should also be noted that in the preferred embodiment, the unit square is used as described below, but that in other embodiments, other geometries may be used, including rectangles, and higher dimensional regions, such as n-dimensional unit cubes and rectangles, among others.

FIG. 12A—Flowcharts of a Method for Generating a Curve in a Region

FIG. 12A flowcharts one embodiment of a method for generating a curve in a region. As FIG. 12A shows, in 1222, an unbounded Low Discrepancy Point may be generated. Note that as used herein, the term "unbounded Low Discrepancy Point" refers to a generated Low Discrepancy Point which may or may not fall within the bounds of the region.

In 1224, one or more boundary conditions may be applied to the unbounded Low Discrepancy Point to generate a bounded Low Discrepancy Point, i.e., a Low Discrepancy Point which is located within the region. It should be noted that applying the one or more boundary conditions to the unbounded Low Discrepancy Point may be performed in various ways. For example, in one embodiment, the position of the unbounded Low Discrepancy Point may be checked for inclusion in the region, and, if found to be outside the region, the one or more boundary conditions may be applied to the point. Thus, from this perspective, the one or more boundary conditions may be applied only to unbounded Low Discrepancy Points which fall outside the region. In another embodiment, the application of the one or more boundary conditions may include checking the position of the unbounded Low Discrepancy Point, and modifying the position of the point if found to be outside the region. Thus, from this perspective, the boundary conditions may be considered to be applied to all the generated unbounded Low Discrepancy Points, although possibly on a subset of the points may be re-positioned, as the boundary conditions require.

As FIG. 12A indicates, in 1226 if the Low Discrepancy Points generation process is not complete, then the method repeats steps 1222 and 1224, i.e., repeating the generating and applying one or more boundary conditions, one or more times until a stopping condition is met, thereby generating a Low Discrepancy Sequence in the region.

If there are no more points to be generated, then in 1228 the Low Discrepancy Sequence may be stored. The generated Low Discrepancy Sequence may represent the curve in the region. In the preferred embodiment, the curve may comprise a Low Discrepancy Curve in the region. It should be noted that in various embodiments, the curve represented by the Low Discrepancy Sequence may pass through each point in the Low Discrepancy Sequence, may pass through or close to one or more of the points, or may pass substantially close to one or more of the points.

Finally, in 1230, output may be generated comprising the Low Discrepancy Sequence, wherein the Low Discrepancy Sequence defines the curve in the region. In one embodiment, generating the output may include displaying the output on a computer display. In other embodiments, generating the output may include printing the output, or transmitting the output to an external system.

FIG. 12B—Flowcharts of a Method for Generating a Low Discrepancy Curve in the Unit Square FIG. 12B flowcharts one embodiment of the method of 12A in detail. As FIG. 12A shows, in 1202 a pair of irrational numbers $(\alpha_1, \alpha_2)$ may be selected such that a sequence $(\{(n*\alpha_1) \bmod 1\}, \{(n*\alpha_2) \bmod 1\})$ is a Low Discrepancy Sequence (LDS) in the unit square, where n ranges over the natural numbers. In other words, integral multiples of irrational values $\alpha$ may provide successive coordinate values in the unit square. Note that the modulo operation prevents any of the coordinate values from leaving the square. In the preferred embodiment, $(\alpha_1, \alpha_2)$ are selected such that they are not integral multiples of one another. It should be noted that in other embodiments, the Low Discrepancy Sequence may be defined on higher dimensional surfaces and spaces, in which case, rather than a pair of irrational values, tuples of more than two values may be defined, e.g., $(\alpha_1, \alpha_2, \ldots, \alpha_n)$, which give rise to a higher dimensional LDS. It should also be noted that although the ability to generate the Low Discrepancy Sequence mentioned above may be a condition for selection of the pair of irrational numbers $(\alpha_1, \alpha_2)$, the actual generation of the LDS is not required.

In 1204, a maximum length L and a step rate $\epsilon$ (epsilon) may be selected for use in guiding the construction of a Low Discrepancy Curve (LDC) in the unit square from the pair of irrational numbers $(\alpha_1, \alpha_2)$ described in 1202. In effect, rather than using integral multiples of the values, $\alpha_i$, multiples of the product $\epsilon*\alpha_i$ may be used. Note that as $\epsilon$ approaches 0, the sequence of points generated approaches a line. This line is the generated LDC.

In 1206 one or more operational variables may be initialized. For example, a current length of the LDC, 1, may be initialized to zero. An initial position vector may be selected, and a current position vector (x, y) initialized to the initial position. For example, the current position vector (x, y) may be initialized to (0,0). In other embodiments, the initial position vector may be initialized to a random position in the unit square, or to any other determined position in the unit square, as desired.

In 1208, the current position vector (x, y) coordinate values may be incremented by $(\epsilon\alpha_1, \epsilon\alpha_2)$, respectively, and boundary conditions along each axis applied to keep the values inside the unit square. In one embodiment, the boundary conditions may include toroidal conditions at opposite borders of the square, such that a value which crosses a border 'wraps' around and 're-enters' the square from the opposite side. In another embodiment, the boundary conditions may include reflectance at the borders, such that when a value crosses a border, the value is 'reflected' back from the border into the square. In other embodiments, combinations of these boundary conditions may be applied to the various borders of the unit square. In further embodiments, other boundary conditions may be applied as desired. In one embodiment, after the coordinate values (x, y) are incremented, the current length, 1, may be determined by adding the distance from the previous current position to the incremented current position, using the standard distance calculation.

In 1210, a stopping condition may be checked to determine whether to stop iterating. In the preferred embodiment, the current length, 1, may be compared to the length L selected in 1204, and if 1 is determined to be less than L, then the iteration may continue, repeating step 1208 until the stopping condition is met. In other words, successive coordinate values (Low Discrepancy Sequence points) may be generated until the length of the generated curve meets or exceeds the maximum length L. It is also contemplated that other stopping conditions may be used as desired, e.g., when the number of points generated exceeds some threshold. In one embodiment, the incremented coordinate values (x, y) generated in an iteration may comprise a Low Discrepancy Sequence point, which, when used with other Low Discrepancy Sequence points generated in other iterations of the process, may be used to generate the Low Discrepancy Curve of 1204.

If the stopping condition is met, e.g., if 1 meets or exceeds L, then the iteration may be stopped, and in 1212 the generated Low Discrepancy Sequence representing the Low Discrepancy Curve may be output. In one embodiment, the generated output may be stored for later use. In one embodiment, the generated output may be displayed on a display device such as a computer monitor screen or a printer.

In one embodiment, the Low Discrepancy Curve represented by the generated Low Discrepancy Sequence may be used as a scan path in a scanning application.

Figure 13A:
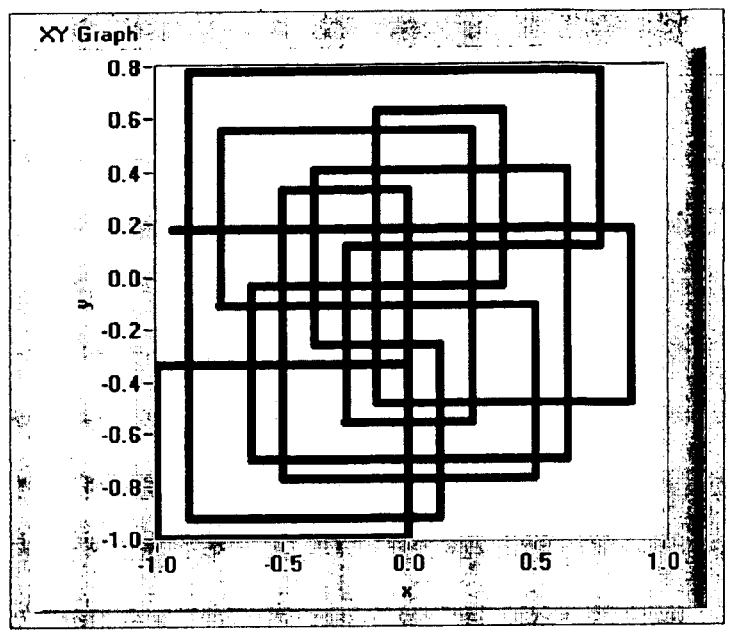
FIG. 13A illustrates a Low Discrepancy Curve, according to one embodiment.

FIG. 13A—Low Discrepancy Curves

Another approach to achieve the relationship (13) may be based on other Low Discrepancy Sequences. The sequence $\{(x_1, y_1), (x_2, y_1), (x_2, y_2), \ldots, (x_n, Y_n), (x_{n+1}, y_n), (x_{n+1}, y_{n+1}), \ldots\}$ can be regarded as the endpoints of lines that are concatenated. FIG. 13A illustrates a first part of a Low Discrepancy Curve based on a specific Halton sequence in 2d. More specifically, FIG. 13A shows the first part of the resulting curve where Halton sequences with prime numbers 2 and 3 are used. The curve fills the space in the sense that the curve comes arbitrarily close to any point infinitely often. It is important to note that other strategies based on the Halton set as well as other Low Discrepancy Sequences may exist.

Figure 13B:
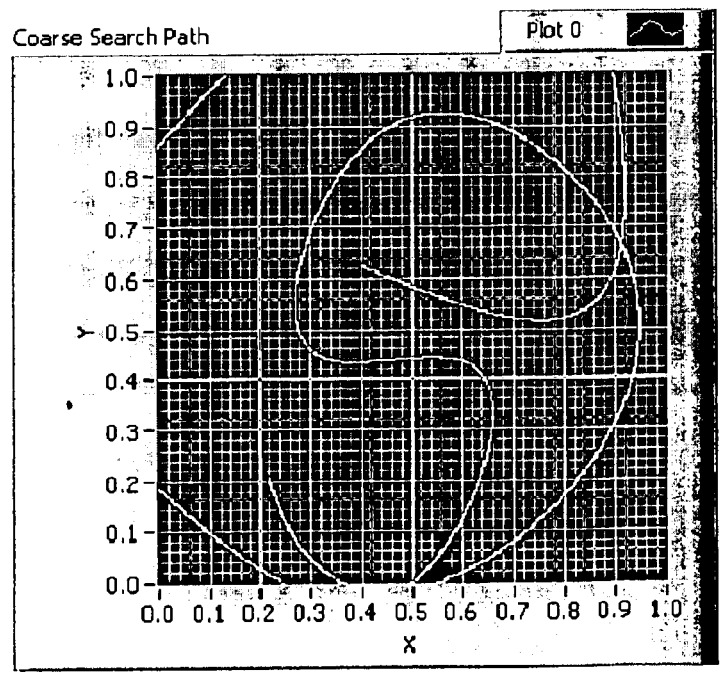
FIG. 13B illustrates a Splined Low Discrepancy Curve, according to one embodiment.

FIG. 13B—Splined Low Discrepancy Curves

FIG. 13B illustrates a scanning scheme based on a splined Low Discrepancy Curve. This scheme is based on the Low Discrepancy Curve scheme described above with reference to FIG. 13A, but splines the orthogonal segments together to substantially reduce the maximum curvature of the path. In other words, the ninety degree turns of the original Low Discrepancy Curve path may be replaced with smooth splines, resulting in an efficient low curvature path which substantially covers the space in its entirety. Further details of Splined Low Discrepancy Curve scanning schemes are presented below with reference to FIG. 18.

Figure 13C:
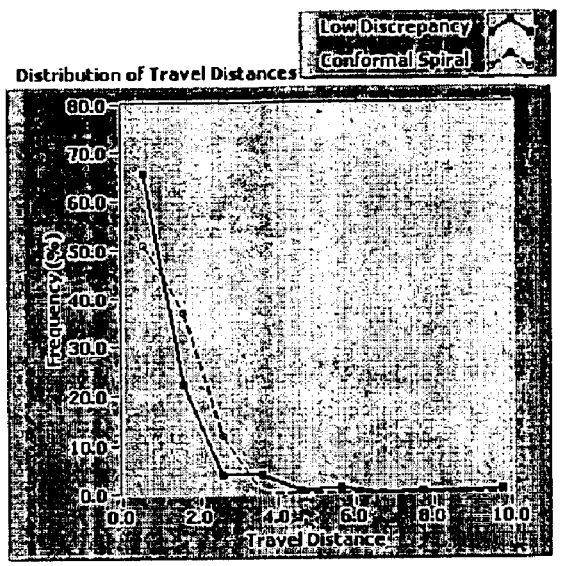
FIG. 13C illustrates a comparison of travel distances for a Conformal Spiral path and a Low Discrepancy Curve path, according to one embodiment.

FIG. 13C—Comparison of Conformal Spiral and Low Discrepancy Searching Travel Distances Structured systematic methods, such as the Archimedes spiral or the Boustrophedon path represent a class of search strategies. In such strategies, the search distance is predictable given a spot location, because of the systematic nature of the algorithms. Typically such trajectories start either at the center of the search area (Spiral searches) or at a corner (Boustrophedon), and thus the searching times increase the further along the curve from the starting point the spot is located.

On the other hand, unstructured but systematic searches, such as proposed by the Low Discrepancy strategy, perform arbitrary moves around the space, attempting to cover the whole search space in a uniform fashion. Such strategies form a second class of search methods.

Rather than comparing each of the many methods presented herein, the Conformal Spiral was chosen to represent the first class of approaches and the Low Discrepancy Curve based search to represent the second class. Comparisons among methods in the first class can be done simply in terms of the curve length (straightforward computation) required to arrive in a certain location in space. On the other hand, a comparison between classes requires a simulated environment.

To compare the performances of the different approaches, a search was run several times (1000) for each coarse search technique and the travel distance required to find the initial coarse location of the spot was recorded. The spot was placed randomly (uniform distribution) inside the square. FIG. 13C presents the distribution of such distances for the Low Discrepancy Curve based model, as well as for the Conformal Spiral curve based model. Note that the Low Discrepancy Curve method has a distribution with less variance but with a long tail as compared to the Conformal Spiral method.

Figure 13D:
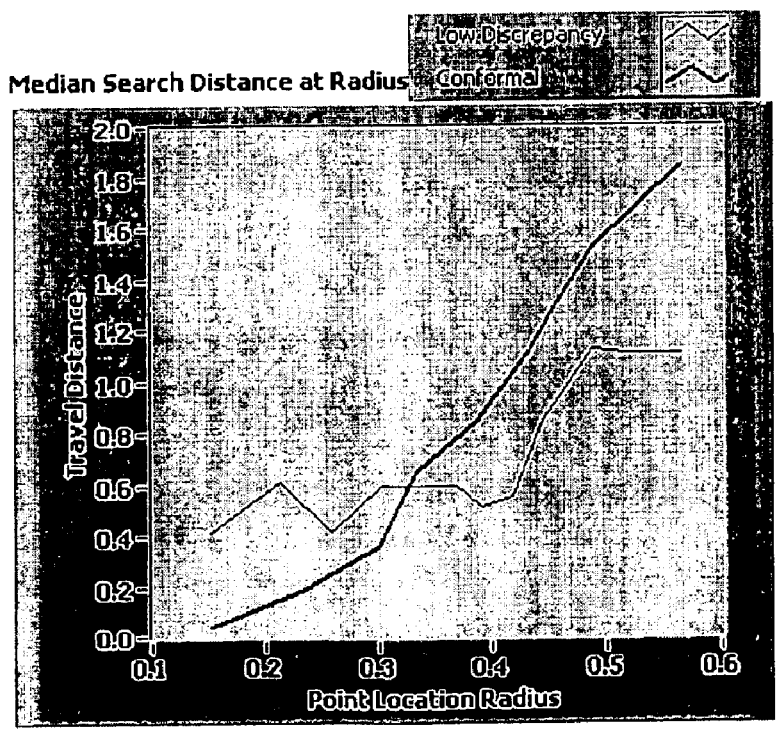
FIG. 13D illustrates a comparison of travel distance bias for a Conformal Spiral path and a Low Discrepancy Curve path, according to one embodiment.

FIG. 13D—Comparison of Conformal Spiral and Low Discrepancy Searching Position Bias FIG. 13D compares the search path length bias of the Conformal Spiral approach with the Low Discrepancy Curve based approach. The distance of the located spot from the center of the search area versus the search distance required to find the spot for a single run is plotted. The distance from the center was chosen because the Conformal Spiral starts its search in the center and progresses towards the search area boundaries. FIG. 13D shows a very interesting property of the low discrepancy search: regardless of the location of the point, the search distance traveled is approximately the same, and close to the average. This property makes the Low Discrepancy Curve based strategy very attractive for industrial applications where, ideally, the processing time for every task should be similar. On the other hand, the performance of the Conformal Spiral becomes progressively worse as the spot is located further from the center.

In applications where a rough estimate for the size of the spot is unavailable, the Low Discrepancy searching approach may be the only viable solution. A Conformal Spiral without enough turns could miss the spot completely, and a new search would have to be started. In the Low Discrepancy approach, such phenomena are avoided due to the balanced nature of the search path. The Low Discrepancy approach allows the searching distances to be almost the same regardless of the spot location.

The final stage of the search strategy and simulation results regarding the accuracy of the spot location are presented below.

Figure 14:
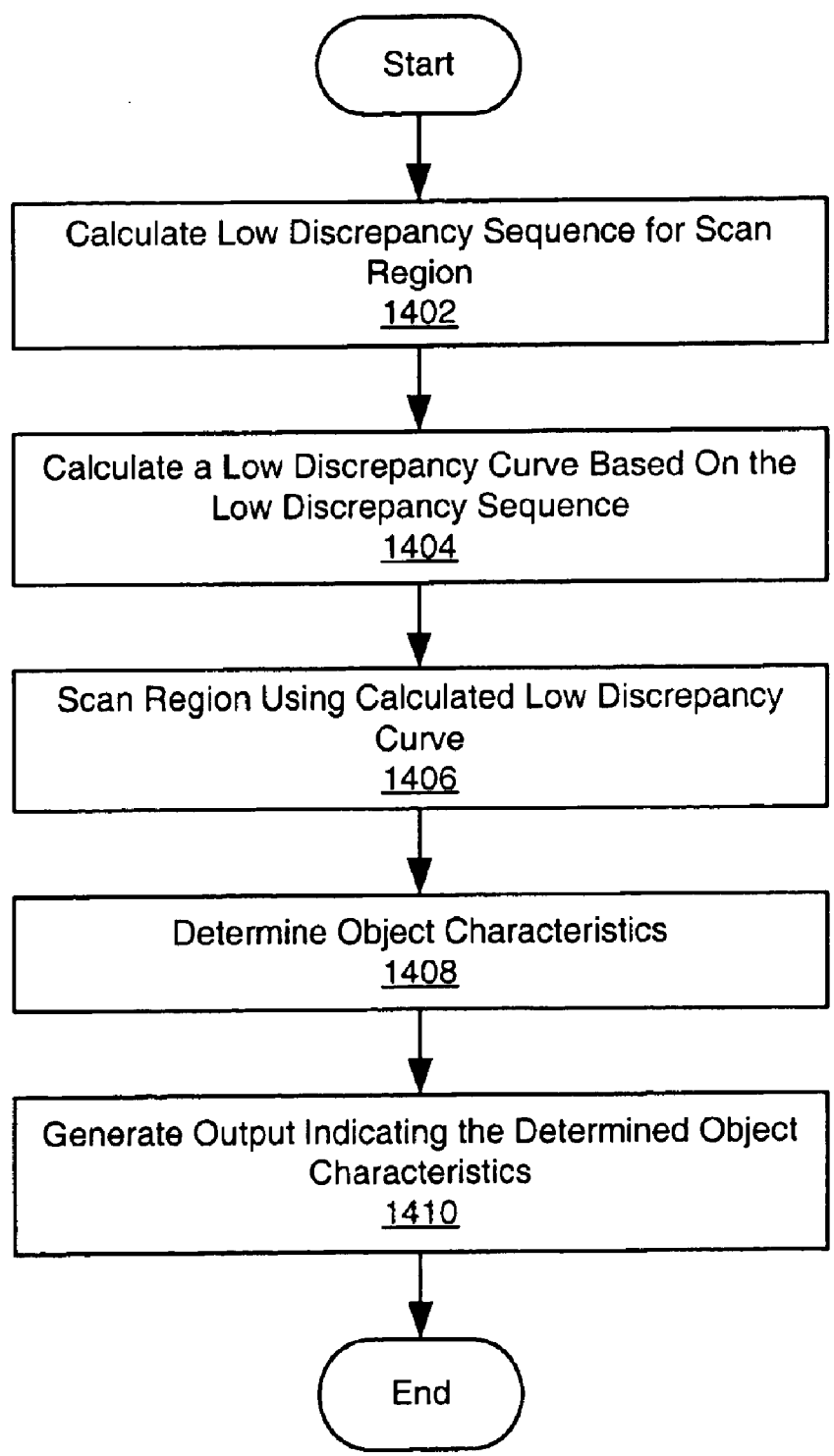
FIG. 14 is a flowchart of a Low Discrepancy Curve scanning process, according to one embodiment.

FIG. 14—Flowchart of Low Discrepancy Curve Scanning Process

FIG. 14 is a flowchart of a Low Discrepancy Curve scanning process. Low Discrepancy Sequences and Curves are described above with reference to FIGS. 8–13. It should be noted that in some embodiments some of the steps presented below may occur in a different order than shown, or may be omitted.

As FIG. 14 shows, in 1402, a Low Discrepancy Sequence may be calculated for the scan region. In one embodiment, calculating the Low Discrepancy Sequence in the region may comprise determining a plurality of points, wherein any location in the region is within a specified distance of at least one of the Low Discrepancy Sequence of points.

In 1404, a Low Discrepancy Curve may be generated based on the calculated Low Discrepancy Sequence of 1402. In one embodiment, generating the Low Discrepancy Curve may comprise using each successive pair of the Low Discrepancy Sequence of points to determine a plurality of orthogonal line segments which connect the pair of points, and re-sampling the plurality of orthogonal line segments to generate a Low Discrepancy Curve segment. A contiguous sequence of the Low Discrepancy Curve segments calculated from the successive pairs of the Low Discrepancy Sequence of points may then comprise the Low Discrepancy Curve, i.e., the Low Discrepancy Curve segments corresponding to the successive pairs of the Low Discrepancy Sequence of points may be sequentially connected to form the Low Discrepancy Curve.

In one embodiment, re-sampling the plurality of orthogonal line segments may include fitting a curve to a plurality of points comprised in the plurality of orthogonal line segments subject to one or more constraints, such as curvature limits, and generating a second plurality of points along the fit curve, wherein the second plurality of points define the Low Discrepancy Curve segment.

In one embodiment, the region may be defined by a coordinate space having a plurality of orthogonal axes, wherein each of the plurality of orthogonal axes corresponds respectively to a dimension of the region. Each of the pair of points may have a plurality of coordinates corresponding respectively to the plurality of orthogonal axes. Each of the plurality of orthogonal line segments is parallel to a respective one of the orthogonal axes, and has a first endpoint and a second endpoint, wherein the first endpoint has a first plurality of coordinates, wherein the second endpoint has a second plurality of coordinates, and wherein the first plurality of coordinates and the second plurality of coordinates differ only in value of a coordinate corresponding to a respective one of the plurality of orthogonal axes. In this manner, the plurality of orthogonal line segments which connect the pair of points comprises a contiguous sequence of said line segments corresponding to a specified order of the plurality of orthogonal axes. The re-sampling the plurality of orthogonal line segments to generate a Low Discrepancy Curve segment then comprises re-sampling the contiguous sequence of said line segments in the specified order to generate the Low Discrepancy Curve segment.

2D EXAMPLE

An example of the process described above for the 2-dimensional case follows:

In one embodiment, the plurality of orthogonal axes may comprise an x axis and a y axis, i.e., the region has a dimensionality of two, and the plurality of line segments comprises two orthogonal line segments including a first line segment and a second line segment. In this case, a first of the pair of points has two coordinates, (x0, y0), corresponding respectively to the x and y axes, and a second of the pair of points has two coordinates, (x1, y1), also corresponding respectively to the x and y axes. Each of the line segments may have a first endpoint and a second endpoint, where the second endpoint of the first line segment is equal to the first endpoint of the second line segment. The two orthogonal line segments which connect the pair of points may therefore comprise a contiguous sequence of said line segments in the specified order, and the two orthogonal line segments may be re-sampled to generate a Low Discrepancy Curve segment by re-sampling the contiguous sequence of said line segments in the specified order.

If the specified order of the plurality of orthogonal axes is (x, y), then the first endpoint of a first of the two line segments has coordinates (x0, y0), and the second endpoint of the first of the two line segments has coordinates (x1, y0); the first endpoint of a second of the two line segments has coordinates (x1, y0), and the second endpoint of the second of the two line segments has coordinates (x1, y1). Thus, the two line segments comprise a contiguous path between the pair of points.

If the specified order of the plurality of orthogonal axes is (y, x), then the first endpoint of a first of the two line segments has coordinates (x0, y0), and the second endpoint of the first of the two line segments has coordinates (x0, y1);

the first endpoint of a second of the two line segments has coordinates (x0, y1), and the second endpoint of the second of the two line segments has coordinates (x1, y1). Thus, the two line segments comprise another contiguous path between the pair of points.

3D EXAMPLE

An example of the process described above for the 3-dimensional case follows:

In one embodiment, the plurality of orthogonal axes comprises an x axis, a y axis, and a z axis, i.e., the region has a dimensionality of three, and the plurality of line segments comprises three orthogonal line segments including a first line segment, a second line segment, and a third line segment. In this case, a first of the pair of points has three coordinates, (x0, y0, z0), corresponding respectively to the x, y, and z axes, and a second of the pair of points has three coordinates, (x1, y1), also corresponding respectively to the x, y, and z axes.

Each of the line segments may have a first endpoint and a second endpoint, where the second endpoint of the first line segment is equal to the first endpoint of the second line segment, and where the second endpoint of the second line segment is equal to the first endpoint of the third line segment. Thus, said three orthogonal line segments which connect the pair of points may comprise a contiguous sequence of said line segments in the specified order, and the three orthogonal line segments may be re-sampled to generate a Low Discrepancy Curve segment by re-sampling the contiguous sequence of line segments in the specified order.

If the specified order of the plurality of orthogonal axes is (x, y, z), then the first endpoint of a first of the three line segments has coordinates (x0, y0, z0), and the second endpoint of the first of the three line segments has coordinates (x1, y0, z0);

the first endpoint of a second of the three line segments has coordinates (x1, y0, z0), and the second endpoint of the second of the three line segments has coordinates (x1, y1, z0); and the first endpoint of a third of the three line segments has coordinates (x1, y1, z0), and the second endpoint of the third of the three line segments has coordinates (x1, y1, z1). Thus, the three line segments comprise a contiguous path between the pair of points.

If the specified order of the plurality of orthogonal axes is (x, z, y), then the first endpoint of a first of the three line segments has coordinates (x0, y0, z0), and the second endpoint of the first of the three line segments has coordinates (x1, y0, z0);

wherein the first endpoint of a second of the three line segments has coordinates (x1, y0, z0), and the second endpoint of the second of the three line segments has coordinates (x1, y0, z1); and wherein the first endpoint of a third of the three line segments has coordinates (x1, y0, z1), and the second endpoint of the third of the three line segments has coordinates (x1, y1, z1). Thus, the three line segments comprise another contiguous path between the pair of points.

If the specified order of the plurality of orthogonal axes is (y, z, x), then the first endpoint of a first of the three line segments has coordinates (x0, y0, z0), and the second endpoint of the first of the three line segments has coordinates (x0, y1, z0);

the first endpoint of a second of the three line segments has coordinates (x0, y1, z0), and the second endpoint of the second of the three line segments has coordinates (x0, y1, z1); and the first endpoint of a third of the three line segments has coordinates (x0, y1, z1), and the second endpoint of the third of the three line segments has coordinates (x1, y1, z1). Thus, the three line segments comprise another contiguous path between the pair of points.

If the specified order of the plurality of orthogonal axes is (y, x, z), then the first endpoint of a first of the three line segments has coordinates (x0, y0, z0), and the second endpoint of the first of the three line segments has coordinates (x0, y1, z0);

the first endpoint of a second of the three line segments has coordinates (x0, y1, z0), and the second endpoint of the second of the three line segments has coordinates (x1, y1, z0); and the first endpoint of a third of the three line segments has coordinates (x1, y1, z0), and the second endpoint of the third of the three line segments has coordinates (x1, y1, z1). Thus, the three line segments comprise another contiguous path between the pair of points.

If the specified order of the plurality of orthogonal axes is (z, x, y), then the first endpoint of a first of the three line segments has coordinates (x0, y0, z0), and the second endpoint of the first of the three line segments has coordinates (x0, y0, z1);

the first endpoint of a second of the three line segments has coordinates (x0, y0, z1), and the second endpoint of the second of the three line segments has coordinates (x1, y0, z1); and the first endpoint of a third of the three line segments has coordinates (x1, y0, z1), and the second endpoint of the third of the three line segments has coordinates (x1, y1, z1). Thus, the three line segments comprise another contiguous path between the pair of points.

If the specified order of the plurality of orthogonal axes is (z, y, x), then the first endpoint of a first of the three line segments has coordinates (x0, y0, z0), and the second endpoint of the first of the three line segments has coordinates (x0, y0, z1);

the first endpoint of a second of the three line segments has coordinates (x0, y0, z1), and wherein the second endpoint of the second of the three line segments has coordinates (x0, y1, z1); and the first endpoint of a third of the three line segments has coordinates (x0, y1, z1), and the second endpoint of the third of the three line segments has coordinates (x1, y1, z1). Thus, the three line segments comprise another contiguous path between the pair of points.

In one embodiment, the generated plurality of orthogonal line segments comprises a first sequence of points which defines a first trajectory having a first maximum curvature. Re-sampling the orthogonal line segments comprises manipulating the first sequence of points to produce the sequence of motion control points defining a second trajectory (the Low Discrepancy Curve segment) having a second maximum curvature which is less than the first maximum curvature. Thus, the first sequence of points may be used to generate a scan curve segment (the Low Discrepancy Curve segment) with a lower maximum curvature than the first trajectory. In one embodiment, the sequence of motion control points may be a superset of the first sequence of points. In another embodiment, the sequence of motion control points may comprise a subset of the first sequence of points and one or more additional points.

In 1406, the region may be scanned using the calculated Low Discrepancy Curve. In one embodiment, scanning the region using the calculated Low Discrepancy Curve may comprise scanning the region along the Low Discrepancy Curve, i.e., measuring the region at a plurality of points along the calculated Low Discrepancy Curve.

In one embodiment, generating a Low Discrepancy Sequence of points on the object may be performed prior to the scanning. In one embodiment, the calculation of the Low Discrepancy Sequence and the Low Discrepancy Curve may be performed in a preprocessing phase, e.g., before an object is placed in the scan region. Said another way, in one embodiment, one or both of the generating the Low Discrepancy Sequence of points in the region, and the calculating the Low Discrepancy Curve in the region based on the Low Discrepancy Sequence of points may be performed offline as a preprocessing operation. The measuring the region at a plurality of points along the Low Discrepancy Curve may then be performed in a real time phase of the method.

In one embodiment, generating the Low Discrepancy Sequence of points on the object and calculating the Low Discrepancy Curve on the object based on the Low Discrepancy Sequence of points may be performed in real time. In another embodiment, the calculation of the Low Discrepancy Sequence and the Low Discrepancy Curve may be performed in a real time phase during the scanning process, where, if the scanning process is not complete, then an additional one or more Low Discrepancy Sequence points and a corresponding additional one or more Low Discrepancy Curve segments may be calculated in real time. The scan may then continue, measuring the region along the calculated additional one or more Low Discrepancy Curve segments. In other words, the Low Discrepancy Curve may be extended in the real time phase of the scanning process, and the scanning may continue, taking measurements along the extended Low Discrepancy Curve.

More specifically, in one embodiment, scanning the region using a Low Discrepancy Curve scanning scheme may comprise:

a) generating a first Low Discrepancy Sequence of points in the region;

b) calculating a first Low Discrepancy Curve segment in the region based on the first Low Discrepancy Sequence of points;

c) scanning a portion of the region along the first Low Discrepancy Curve segment to identify a characteristic of the object; and, if the characteristic of the object is not identified, then:

d) generating a second Low Discrepancy Sequence of points in the region based on previous Low Discrepancy Sequence points;

e) calculating a second Low Discrepancy Curve segment in the region based on the second Low Discrepancy Sequence of points;

f) scanning a portion of the region along the second Low Discrepancy Curve segment to identify a characteristic of the object;

g) repeating d)–f) one or more times until the characteristic of the object is identified or until said one or more times equals a threshold number of times.

In a preferred embodiment of the above method, a) and b) are performed offline in the preprocessing phase of the method, and c)–g) are performed in the real time phase of the method.

In one embodiment, the second Low Discrepancy Sequence of points may include a last point of an immediately previous Low Discrepancy Curve segment and one or more additional Low Discrepancy Sequence points.

In one embodiment, c) may comprise measuring the region at a plurality of points along the first Low Discrepancy Curve, and f) may comprise measuring the region at a plurality of points along the second Low Discrepancy Curve.

In one embodiment the object to be scanned may be placed in the scan region prior to said scanning, or, said another way, the object may enter the region prior to scanning the region. In one embodiment, the object may appear in the scan region automatically, such as in an inspection system where the object is moved on a conveyor past the scanning apparatus. The object may be paused in front of the scanner, or may simply be moved past slowly enough that the scanning operation may be performed without stopping the object's motion. In one embodiment, the presence of the object in the scan region may be undetermined, i.e., the region may be scanned to determine whether the object is there.

It should be noted that although the example given was for a two dimensional region and object, the method described above may be applied to regions and objects of one or two dimensions. In other embodiments, the method may be applied to regions and objects of dimensionality greater than two.

In 1408, one or more characteristics of the object may be determined in response to the scanning of 1406. Examples of such characteristics may include the object's precise location, shape, colors, identity, or any other detectable characteristic. In one embodiment, measuring the region at the plurality of points along the conformal scanning curve produces data which may be examined or analyzed to determine the one or more characteristics of the object.

Finally, in 1410, output indicating the one or more characteristics of the object may be generated. In one embodiment, the output may be displayed on a computer display. In another embodiment, the output may be transmitted to one or more internal or external systems. In another embodiment, the output may be stored in a computer memory for later analysis or use.

Abstract Surfaces and Riemannian Spaces

Given an abstract surface S with a Riemannian metric defined for (u,v) in $[0,1]^2$, e.g. Gray [1998].

$$ds^2 = E(u,v)du^2 + 2F(u,v)dudv + G(u,v)dv^2 \tag{18}$$

E(u,v), F(u,v), and G(u,v) are differentiable functions in u and v where $EG-F^2$ is non-negative. The area element dA is defined by:

$$dA = \sqrt{E(u,v)G(u,v) - F(u,v)^2} \, du \wedge dv \tag{19}$$

The function $$\Psi(u,v) = \sqrt{E(u,v)G(u,v) - F(u,v)^2} \tag{20}$$

is nonnegative in $[0,1]^2$ and $\Psi^2$ is differentiable.

Let $\alpha=(\alpha_1,\alpha_2)$ be a given vector (direction) in $R^2$. According to (11) and (12) line and area elements of S for a specific direction $(du,dv)=(\alpha_1 du,\alpha_2 du)$ are $$\frac{ds}{du} = \sqrt{(E(u,v)\alpha_1^2 + 2F(u,v)\alpha_1\alpha_2 + G(u,v)\alpha_2^2)} \quad (21)$$

$$\frac{dA}{du^2} = \sqrt{E(u,v)G(u,v) - F(u,v)^2}\,\alpha_1\alpha_2$$

It follows (22)

$$\frac{\frac{ds}{du}}{\frac{dA}{du^2}} = \frac{\sqrt{(E(u,v)\alpha_1^2 + 2F(u,v)\alpha_1\alpha_2 + G(u,v)\alpha_2^2)}}{\sqrt{E(u,v)G(u,v) - F(u,v)^2}\,\alpha_1\alpha_2}$$

It follows

Definition 1:

A piecewise smooth curve C. $R^+ \to S$ lying on an abstract surface S is called low-discrepancy curve based on a vector $\alpha=(\alpha_1,\alpha_2)$, if
(i) C is S-filling, i.e. C comes arbitrarily close to any point of S.
(ii) There is a parameterization of S where (15) is constant for all (u,v).
(iii) In any regular point of C the tangent vector is parallel to $\alpha=(\alpha_1,\alpha_2)$.

The following algorithm is based on Definition 1 and (22).

Algorithm I:
(I.1) Find a parameterization of S that satisfies (ii) and (iii). See also Remark 1.
(I.2) Generate a curve in S based on the image of a low-discrepancy curve in the unit square according to Theorem 5.

Remark 1:

The parameterization (ii) is not unique. In all examples an originally given natural parameterization is modified with the aid of u->h(u) or v->h(v) replacements where h is a smooth diffeomorphism.

An abstract d-dimensional metric is defined by $$ds^2 = \sum_{i,j=1}^{d} g_{ij}(u_1, \ldots, u_d)du_i^2 du_j^2 \quad (23)$$

where the matrix consisting of $g_{ij}$: $[0,1]^d \to R$ is always symmetric, differentiable, and positive semi-definite. An embedding of an abstract space (23) in an m-dimensional Euclidean space is a diffeomorphisms f of the cube $[0,1]^d$ with $f_1(u_1,\ldots,u_d)f_2(u_1,\ldots,u_d),\ldots,f_m(u_1,\ldots,u_d): R^d \to R^m$ where the Riemannian metric of this embedding is described by (16). Usually, this definition is too restrictive. Instead, local diffeomorphisms patches) should be used where these patches cover the whole space under consideration.

Let $\alpha=(\alpha_1,\alpha_2,\ldots,\alpha_d)$ be a given vector (direction) in $R^d$. According to (23) line and volume/content elements for a specific direction $(du_1,du_2,\ldots,du_d)=(\alpha_1 du,\alpha_2 du,\ldots,\alpha_d du)$ are $$\frac{ds}{du} = \sqrt{\sum_{i,j=1}^{d} g_{ij}(u_1,\ldots,u_d)\alpha_i\alpha_j} \quad (24)$$

$$\frac{dV}{du^n} = \sqrt{det(g_{ij}(u_1,\ldots,u_d))}\alpha_1\alpha_2\ldots\alpha_d$$

$$\frac{\frac{ds}{du}}{\frac{dV}{du^n}} = \frac{\sqrt{\sum_{i,j=1}^{d} g_{ij}(u_1,\ldots,u_d)\alpha_i\alpha_j}}{\sqrt{det(g_{ij}(u_1,\ldots,u_d))}\,\alpha_1\alpha_2\ldots\alpha_d} \quad (25)$$

Definition 2:

A piecewise smooth curve $C.R+ \to S$ in the given Riemannian space S is called low-discrepancy curve based on a vector $\alpha=(\alpha_1,\alpha_2,\ldots,a_d)$, iff
(i) C is S-filling, i.e. C comes arbitrarily close to any point of S.
(ii) There is a parameterization of S where (18) is constant for all $(u_1,u_2,\ldots,u_d)$.
(iii) In any regular point of C the tangent vector is parallel to $\alpha=(\alpha_1,\alpha_2,\ldots,a_d)$.

EXAMPLES

Figure 15B:
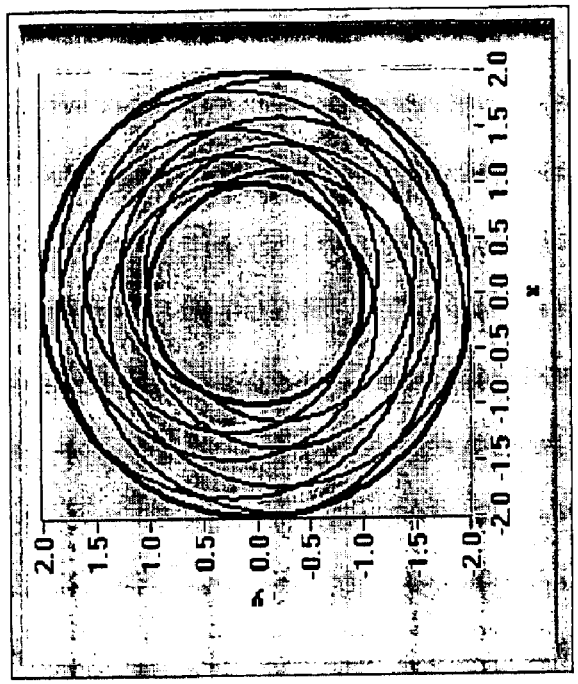
FIGS. 15A–15D illustrate scan paths for various surfaces.
Figure 15A:
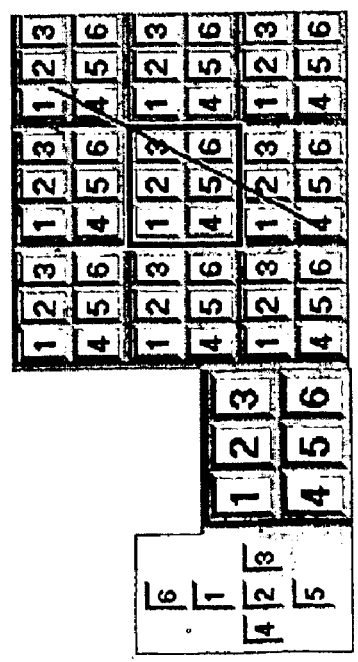
Figure 15D:
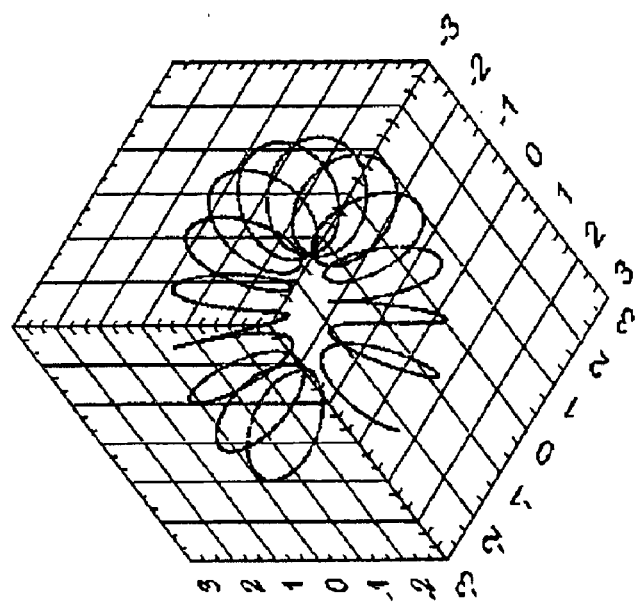
Figure 15C:
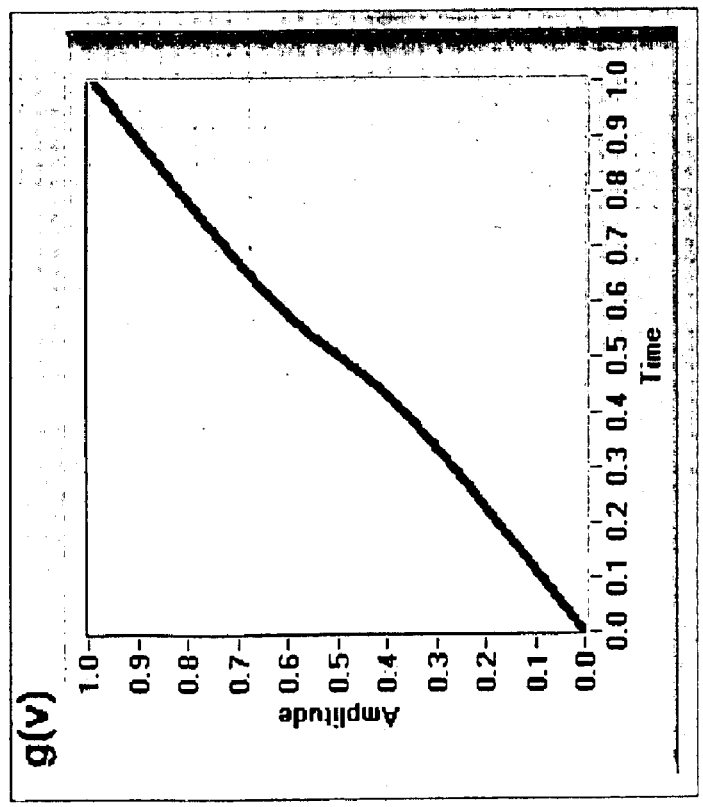

FIGS. 15A–15C—Surface Scans with Low Discrepancy Curves

Theorem 4 and Theorem 5 can be used to construct low-discrepancy curves lying on surfaces, various examples of which are given below.

Unit Cube

Given the surface of a unit cube, FIG. 15A shows a tiling of the whole plane with the following property. Whenever two elements of the tiling have an edge in common the same is true for the corresponding faces of the unit cube. The tiling follows the torus-scheme underlying Theorem 4. According to this theorem almost all $\alpha=(\alpha_1,\alpha_2)$ generate curves lying on the surface of the unit cube that are low-discrepancy in the sense of Definition 1:

Note that in the example shown in FIG. 15A, some paths possible on the cube are not possible (with a continuous straight curve) on the tiled surface. For example, faces 3 and 5 of the cube (left) are adjacent, while in the tiled version of the surface (right), they are not. More generally, it may be seen that on the tiled surface, each face has three unique neighbors (two of the four neighbors are always the same), while on the cube, each face has four neighbors. Thus, the tiled surface accommodates a subset of the possible paths on the unit cube. This constraint may be taken into account when using this approach to generate a scan path on the cube.

Rings

Given the following parameterization of a ring (re-parameterization of standard parameterization)

$x(u,v)=(g(u)\cos(v),g(u)\sin(v))$ where $0<u_0 \leq u \leq u_1$ and $0 \leq v \leq 2\pi$ Let g be sufficiently smooth, g maps $[_0,u_1]$ onto $[u_0,u_1]$. According to the method described above, g(u) must satisfy an ordinary differential equation $(\alpha_1,\alpha_2>0)$ $$g'(u) = \frac{\alpha_2 g(u)}{\sqrt{cg(u)^2\alpha_1\alpha_2 - \alpha_1^2}} \text{ where } g(u_0)=u_0 \text{ and } g(u_1)=u_1$$

FIG. 15B shows a resulting low-discrepancy curve filling the given ring for a specific case where $u_1=1$ and $u_2=2$. The parameters $\alpha_1$, $\alpha_2$, and c were chosen appropriately.

Surface of a Torus

The third example deals with the surface of a torus. Given the $R^3$ embedding of a torus (it is b<a)

$x(u,v)=((a+b\cos(2\pi g(v)))\cos(2\pi u),(a+b\cos(2\pi g(v)))\sin(2\pi u),b\sin(2\pi g(v)))$ $$ds^2 = 4\pi^2(a+b\cos(2\pi v))^2 du^2 + 4\pi^2 b^2 g'(v)^2 dv^2$$

$$dA^2 = 16\pi^4 b^2 (a+b\cos(2\pi v))^2 g'(v)^2$$

The function g maps [0,1] onto [0,1] and is sufficiently smooth. A constant ratio of ds and dA in α-direction can be achieved if the following equation holds true (c is a constant, $\alpha_1 > 0$):

$$\frac{(a+b\cos(2\pi g(v)))^2 \alpha_1^2 + b^2 g'(v)^2 \alpha_2^2}{4\pi^2 b^2 g'(v)^2 (a+b\cos(2\pi g(v)))^2 \alpha_1 \alpha_2} = c, \text{ i.e.} \quad (26)$$

$$g'(v) = \frac{(a+b\cos(2\pi g(v)))\alpha_1}{\sqrt{4c\pi^2(a+b\cos(2\pi g(v)))^2 \alpha_1 \alpha_2 - \alpha_2^2}}$$

The boundary conditions are g(0)=0 and g(1)=1. A solution of (26) guarantees g'(0)=g'(1). The parameter c can be chosen with the aid of a shooting method. FIG. 15C shows a valid function g when a=2, b=1. FIG. 15D depicts part of the resulting low-discrepancy curve lying on the surface of a torus. Because g'(0)=g'(1) the curve is smooth.

Figure 16:
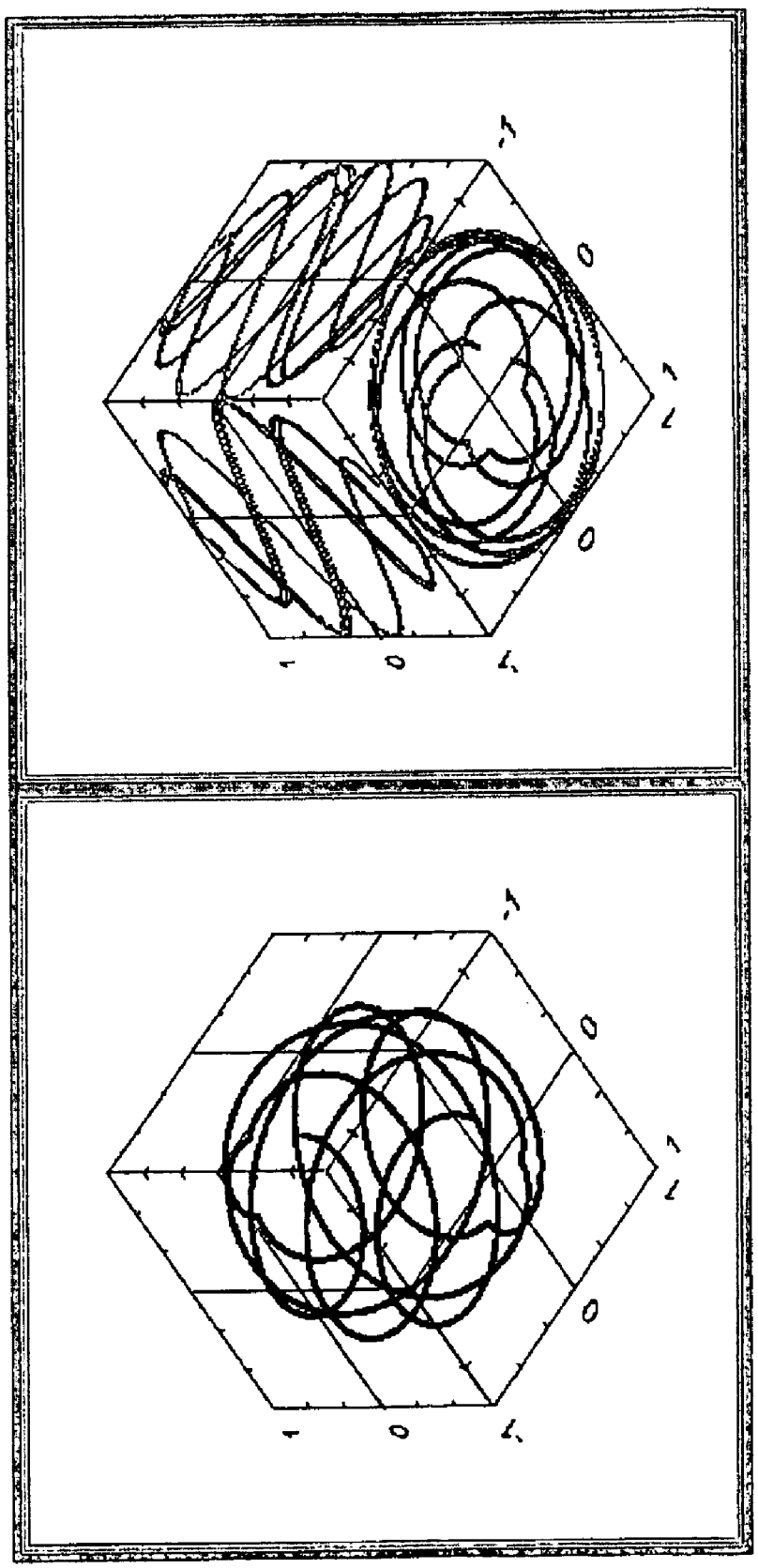
FIG. 16 illustrates a spherical spatial scan path, according to one embodiment.

FIG. 16—Scanning Part of a Sphere

A more sophisticated example is a part of a sphere given as an abstract surface by $$ds^2 = 4\pi^2 \sin^2(\pi g(v)) du^2 + \pi^2 dv^2 \text{ where } (u,v) \text{ is located in } [0,1] \times [v_0, v_1] \text{ with } v_0 < v_1 \text{ in } ]0,1[.$$

A Euclidean embedding of this surface is given by:

$$x(u,v) = (\sin(2\pi u)\sin(\pi g(v)), \cos(2\pi u)\sin(\pi g(v)), \cos(\pi g(v)))$$

The function g(v) is smooth and maps $[v_0, v_1]$ onto $[v_0, v_1]$. According to Definition 1 and (15):

$$g'(v) = \frac{2\sin(\pi g(v))}{\sqrt{4c\pi^2(\pi g(v)) - \alpha^2}}$$

The boundary conditions are $g(v_0) = v_0$ and $g(v_1) = v_1$. FIG. 16 depicts the resulting low-discrepancy curve.

Definition 2 can be used to construct low-discrepancy curves in parts of a sphere. Depending on the chosen re-parameterizations different space filling schemes can be generated. Appropriate re-pararneterizations of the radius generate low-discrepancy curves filling a shell. Those of angular components generate space filling curves according to the pattern demonstrated with reference to FIG. 16. Many more re-parameterizations are possible. The concrete choice depends on the problem to be solved.

Another generalization of 2d strategies deals with smooth curves that scan n-dimensional spheres completely where the appropriately defined (absolute) curvature is always below a certain number.

However, in higher dimensional spaces there are many more parameterizable structures than space curves. The most straightforward generalization is a surface in 3d that scans an open 3-dimensional region completely. If curvature constraints are an issue the specific meaning of this term must be defined more accurately. Smooth surfaces in 3d are characterized by principal curvatures at any point of the surface. These principal curvatures are orthogonal to each other. The Gaussian or mean curvatures are scalars that can be used as valid definitions of curvature constraints. In higher-dimensional spaces these concepts may be even more complicated.

Another direction of optimal scanning strategies is based on the additional assumption that crossings of paths are forbidden. An application for this class of problems is a layout-like scanning scheme where a visited point is marked by the moving system, e.g. by a real wire. Some scenarios in higher dimensional spaces where efficient scanning strategies offer a definite advantage are described below.

Figure 17:
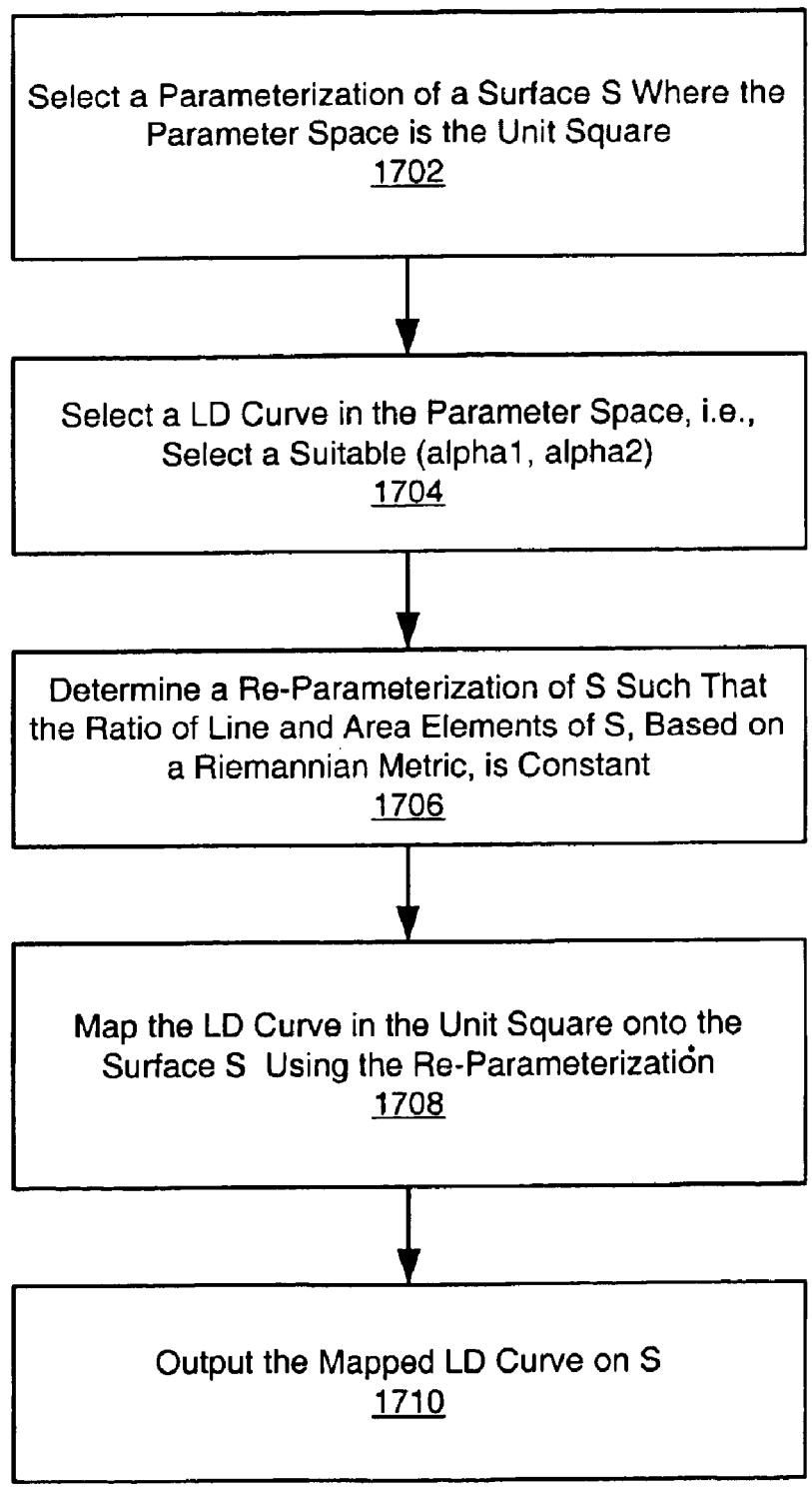
FIG. 17 is a flowchart of a method for mapping a Low Discrepancy Curve to an abstract surface, according to one embodiment.

FIG. 17—Flowchart of a Method For Generating a Low Discrepancy Curve on an Abstract Surface FIG. 17 flowcharts one embodiment of a method for generating a curve, such as a Low Discrepancy Curve, on an abstract surface S. Specifically, an embodiment of the method is described in which a Low Discrepancy Curve is generated on a unit square, then mapped to the surface S, although it is also contemplated that other curves or sequences of points may be mapped in a similar manner, and that regions other than the unit square may be used.

As FIG. 17 shows, in 1702 a parameterization of surface S may be selected. In the preferred embodiment, the parameter space for the parameterization is the unit square or a rectangle. Other suitable geometries for the parameter space are also contemplated, including higher dimensional unit cubes and rectangles, among others.

In 1704, a Low Discrepancy Curve in the parameter space may be selected, e.g., according to the method described with reference to FIG. 12. In one embodiment, selecting a Low Discrepancy Curve in the parameter space may comprise selecting or generating a vector or set of irrational values $(\alpha_1, \alpha_2)$ which may be used to generate the Low Discrepancy Curve. Note that in higher dimensional embodiments, the α vector may comprise more than two terms, e.g., $(\alpha_1, \alpha_2, \alpha_3, \ldots, \alpha_n)$.

Then, in 1706, a re-parameterization of S may be determined such that a ratio of line and area elements of S based on a Riemannian metric is constant. For example, as described above, if $\alpha = (\alpha_1, \alpha_2)$ is a given vector (direction) in $R^2$, then according to (11) and (12) line and area elements of S for a specific direction $(du, dv) = (\alpha_1 du, \alpha_2 du)$ are given by equation (21):

$$\frac{ds}{du} = \sqrt{E(u,v)\alpha_1^2 + 2F(u,v)\alpha_1\alpha_2 + G(u,v)\alpha_2^2}$$

$$\frac{dA}{du^2} = \sqrt{E(u,v)G(u,v) - (F(u,v))^2}\, \alpha_1\alpha_2$$

and so, the relation of equation (22) follows:

$$\frac{\frac{ds}{du}}{\frac{dA}{du^2}} = \frac{\sqrt{E(u,v)\alpha_1^2 + 2F(u,v)\alpha_1\alpha_2 + G(u,v)\alpha_2^2}}{\sqrt{E(u,v)G(u,v) - (F(u,v))^2}\, \alpha_1\alpha_2}$$

It is this ratio which may be held constant to generate the re-parameterization of S.

In 1708, the generated Low Discrepancy Curve in the unit square generated in 1704 may be mapped onto the surface S using the re-parameterization of 1706.

Finally, as indicated in 1710, the mapped Low Discrepancy Curve of 1708 may be output. In one embodiment, outputting the mapped Low Discrepancy Curve may comprise storing the curve for later use. In another embodiment, outputting the mapped Low Discrepancy Curve may comprise displaying the curve on a display device.

Thus, by using the above-described method, a Low Discrepancy Curve generated on a unit square (or other suitable geometry) may be mapped to an abstract surface. It should be noted that any LDS or LDC generated on the unit square (or other suitable geometry) may be mapped in this way. In other words, it is not required that the sequence or curve be generated in the manner described in reference to FIG. 12.

In one embodiment, the above embodiment may be used to generate a scan path for a six degree of freedom alignment problem, as described below in the section titled Applications.

Induced Paths in Large Point Sets

Given a large set of discrete points in a manifold. Assume a well-balanced path connecting points of this manifold has to be determined. Such a path should treat all parts of the point set equally well. More importantly, the path should be well distributed in the sense that the same amount of path length covers approximately the same number of points of the underlying set. The following algorithm can be applied:

Algorithm II:

(II.1) Apply Theorem 4–6 to generate a low-discrepancy curve in this manifold.

(II.2) Determine nodes and edges of the graph that minimize the distance to this path of the manifold. To this end, appropriate thresholds must be given.

If the length of the path is unknown in advance the algorithm can stop whenever a certain goal is achieved, e.g. any point of the underlying point set is in a neighborhood of the path constructed so far.

Thus, many of the definitions and results described above can be generalized to higher dimensional spaces. Smooth curves that scan open regions in n-dimensional spaces with and without curvature restrictions can be defined as before. As mentioned, the term "curvature" must be defined appropriately, e.g. space curves are characterized by "classical" curvature and torsion. It is also clear that low-discrepancy curves in n-dimensional spaces can be constructed where Halton sequences based on different prime numbers are used for the different axes. Such schemes scan n-cubes in an efficient manner, i.e. on average they find small objects in the cube faster than other classical strategies.

One sophisticated scenario uses a robot arm with six degrees of freedom, such as shown in FIG. 3B, where the goal is to scan the given surface and to guarantee a perpendicular scanning behavior, i.e. the sensor points in a normal direction of the surface. There are many possible reasons for such a goal, e.g. the robot arm moves an ultrasonic or eddy-current probe that must be applied in an orthogonal manner to produce valid results. The robot arm has six degrees of freedom, and therefore acts in a 6-dimensional space, and must be moved smoothly to explore a given situation in 3d.

The latter example gives rise to the notion of an induced scanning scheme. Via inverse kinematics the optimal scanning strategy of the surface can be translated into an induced version acting on a complicated 2d manifold in the 6-dimensional phase space of the robot arm. The induced efficient curve on this 2d manifold can be computed, recorded, and played back to implement the desired highly efficient scanning scheme of a given surface.

The same principle is applicable to phased array systems (e.g. ultrasonic equipment), as described above with reference to FIG. 3C, or other synchronized equipment such as arrays of telescopes. Some phased-array systems, e.g. those used in ultrasonic testing, can involve dimensions of very high order in scanning the interior of 3d objects. The original search space might be 2- or 3-dimensional. The induced trajectories act in higher or even extremely high dimensional spaces. One can regard these induced curves as optimal with respect to the given object to be inspected.

Exploration of an Unknown Higher Dimensional Space

In some cases the geometry of an underlying space may be unknown. An example is given by a car seat which has six degrees of freedom. In this example, some combinations of movement are valid and others are invalid. The goal is a description of this space in terms of valid combinations (6 coordinates each). An efficient scanning strategy such as those described above allows a characterization of this space, while prior art methods are generally too time-consuming.

Direction Dependent Sensing in 3d

A typical scanning problem arises when electromagnetic, acoustic, or other fields must be explored where the sensor works in a direction-selective manner and can be moved freely, e.g. the point of maximal strength of an acoustic field in a given room must be determined and the microphone must be directed to take a measurement. From a purely scanning standpoint, a 6-dimensional space must be scanned efficiently. Low-discrepancy curves in 6d will detect this point faster on average than other methods. Moreover, standard techniques such as grid-like scanning methods are almost unrealizable because of the unbalanced structure of these curves.

Applications:

Testing and Exploration

A typical scenario in nondestructive testing or in search routines is based on well-chosen continuous paths where measurements are taken on the fly. Usually, the search space is large, and so efficient scanning strategies are necessary.

It is assumed that efficient continuous search strategies in the sense of Theorems 4–6 for a d-dimensional cube are available. As demonstrated above, continuous scanning strategies in other spaces can be derived.

Figure 18:
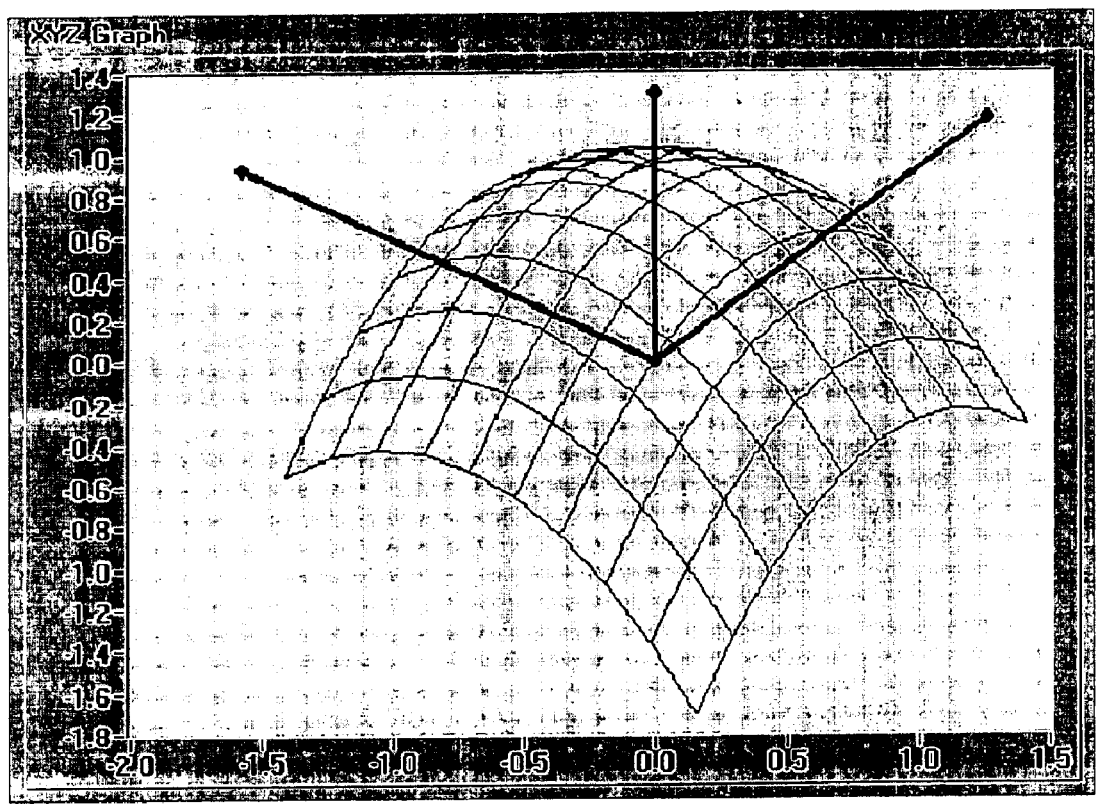
FIG. 18 illustrates a 3d surface to be scanned, according to one embodiment.

FIG. 18—Scanning of Surfaces in 3d

FIG. 18 illustrates a surface scan in 3d. Assume a surface in 3d, as shown in FIG. 18. Furthermore, assume definitions of Low Discrepancy Sequences and/or Low Discrepancy Curves, e.g. based on a Riemannian metric of the surface. In practical applications the surface structure might represent a fuselage of a car or other smooth objects (even non-smooth objects can be regarded as valid surfaces, e.g. surface of a cube). An x-y-z stage can scan the surface where a constant height over the surface is guaranteed. In other words, the x-y scan may be based on an efficient Low Discrepancy Curve defined on the surface, with z dependent on the curve such that constant height is maintained. As FIG. 18 shows, the surface has well-defined normals at each point on the surface. The scanning system may be operable to measure at each point on the surface such that the scanning sensor is aligned with the normal at that point.

Optical Fiber Alignment

As mentioned previously, scanning strategies form an essential part of many practical applications. The scanning schemes presented above are particularly suitable for a specific alignment problem in fiber optics. Specifically, two arrays of optical fibers must be aligned accurately. Typically, lasers are applied and the intensity of these beams can be measured to align the arrays. If the first array is regarded as fixed with unknown position and orientation, the second array can be moved to establish the alignment. A simple model of this scenario consists of 3 position degrees of freedom (x, y, and z) in combination with 3 orientation degrees of freedom (pitch $\alpha$, roll $\beta$, and yaw angle $\gamma$). This results in a 6-dimensional search space where further constraints add complexity to this space. For example, $$\max(|x|,|y|,|z|) \leq P \text{ and } \max(|\alpha-\alpha_0|,|\beta-\beta_0|,|\gamma-\gamma_0|) \leq O \quad (27)$$

where P(osition), O(rientation), $\alpha_0$, $\beta_0$, and $\gamma_0$ are known parameters. The generated space (27) may (after normalization) be interpreted as a unit cube in 6d. Theorem 6 allows the construction of low-discrepancy curves in 6-dimensional space. The resulting trajectory scans (27) in an efficient manner. Note that the trajectories are composed of straight lines which minimizes motion control related problems.

A slightly different approach may also be applied to the alignment problem. Referring again to FIG. 3D, the goal is a fast procedure for alignment of the two fibers 320 where the intensity of an a laser beam 312 is constantly measured. The second fiber 320B can be moved by a motion control stage to find the position where the intensity of the measured laser beam 312 is maximal. The beam 312 has a Gaussian-like intensity shape and its dimensions are often very small compared to the original scanning region. In these cases the alignment procedure can be divided into two phases, a coarse search for the first appearance of measured intensities beyond a given noise level and the final determination of real peaks of this intensity profile.

As part of the fiber optics alignment task, efficient scanning and optimization algorithms are required. As mentioned above, the second fiber 320B can be moved by a motion control stage 330 to find the position where the intensity of the measured laser beam 312 is maximal. The problem can be reformulated as a scanning task, where a small object in a given 2d region must be identified. Usually, the underlying space is rather simple. Squares, rectangles, and circles form the majority of valid regions in practical applications.

In the first phase an efficient scanning strategy minimizes the expected search time to locate the approximate position of the beam 312. The second phase consists of a finer scanning strategy capable of locating the beam 312 precisely.

In one embodiment, this procedure may be performed as follows:

In the first phase, the fiber 320B which is connected to the stage 330 is moved according to a first scanning path, and the intensity of the laser beam 312 is read (e.g., using a data acquisition card). The position of the stage 330 at the different measured beam intensities is also recorded. The stage 330 is then moved to align the second fiber 320B with the point of maximum beam intensity.

In the second phase, the fiber 320B (via the movement stage 330) is moved according to a second scanning path, and the intensity of the laser beam 312 is read and positions recorded. Again, the position of maximum beam intensity is determined, and the second fiber 320B is positioned accordingly, thereby aligning the two fibers 320.

It should be noted that the first scanning path covers substantially the entire region, and is intended to provide an initial, coarse solution, while the second scanning path covers a sub-region (i.e., has a smaller window) with higher resolution coverage. Thus, the first phase of the procedure narrows the scope of the search to a region of interest, and the second phase implements a high resolution final approach to the target, i.e., the beam center.

Typically, the search for the first appearance of valid intensity values is based on grid-like or spiral-like scanning strategies. Better procedures are desirable to further reduce the time to find the object under consideration. The standard method for the final approach is the hill-climbing algorithm, which is well known in the art. During the execution of the hill-climbing algorithm the motion control stage moves in specific directions and looks for the maximum intensity on lines. Based on this maximum new lines are determined and the search starts again. The algorithm stops when the current maximum cannot be improved.

The approaches presented above were used to implement novel scanning strategies for both the first search and the final approach. In particular, the following routines were implemented:

1) Coarse search based on standard schemes (Archimedes spiral and boustrophedon path);
2) Coarse search based on conformal spirals;
3) Coarse search based on Low Discrepancy Sequences in conjunction with TSP;
4) Coarse search based on Low Discrepancy Curves; and
5) Coarse and final search based on curves depicted in FIG. 18 below, in connection with fitting strategies to compute the expected position of peaks.

The concept behind the implementation is that a coarse search can roughly determine the location of the maximum intensity spot. A coarse search should be smooth (minimizing curvature) and space filling. Once a region with a spot is hit, a region of interest (based on the Gaussian nature of the spot) can be defined and a fine search based on specific suitable curves performed. A fitting procedure can then be applied to the resulting (X,Y,Intensity) triplets from the fine final search. Based on the fitting procedure an analytical location for the peak can be determined.

The main advantage of the proposed approach is that it presents a systematic procedure to define the peak of the spot. The empirical approach can suffer if enough noise is present to disturb the hill climbing procedure or if the peak of the spot is a flat region, due to sensor reading errors. Another express advantage is that the search times are minimized. Further details of the proposed approach are presented below with reference to FIGS. 18–22.

Figure 19:
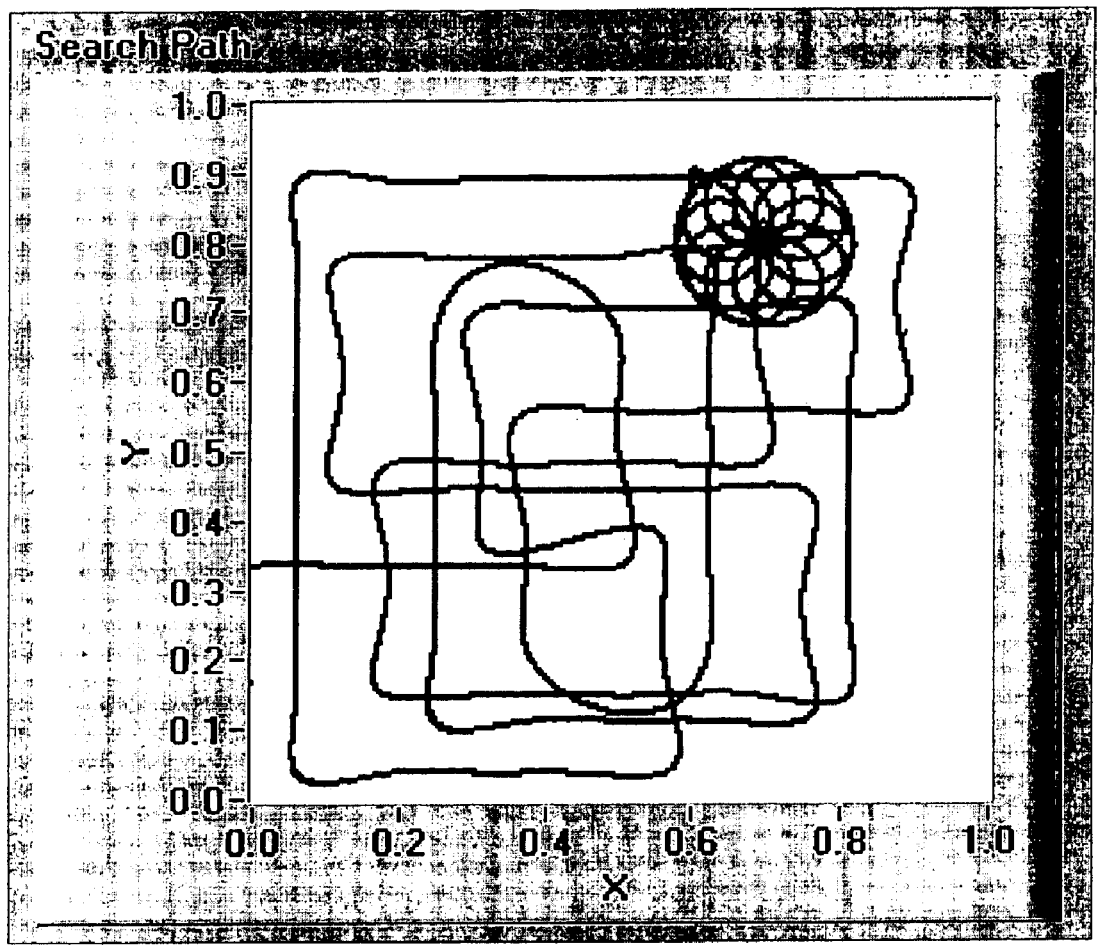
FIG. 19 illustrates an initial Splined Low Discrepancy Curve based coarse search followed by a refined final approach, according to one embodiment.

FIG. 19—Splined Low Discrepancy Curve Coarse Search With Refined Final Approach

FIG. 19 illustrates a scanning scheme based on an initial coarse search, followed by a refined final approach search based on the scanning schemes of FIGS. 10B and 5A, respectively. As FIG. 19 shows, the coarse search may be performed using a Splined Low Discrepancy Curve scan path. In one embodiment, once the coarse search locates an approximate location of an area of interest, a refined search, or final approach, may be performed using a continuous circle based scanning scheme (flower curve), as shown.

Figure 20:
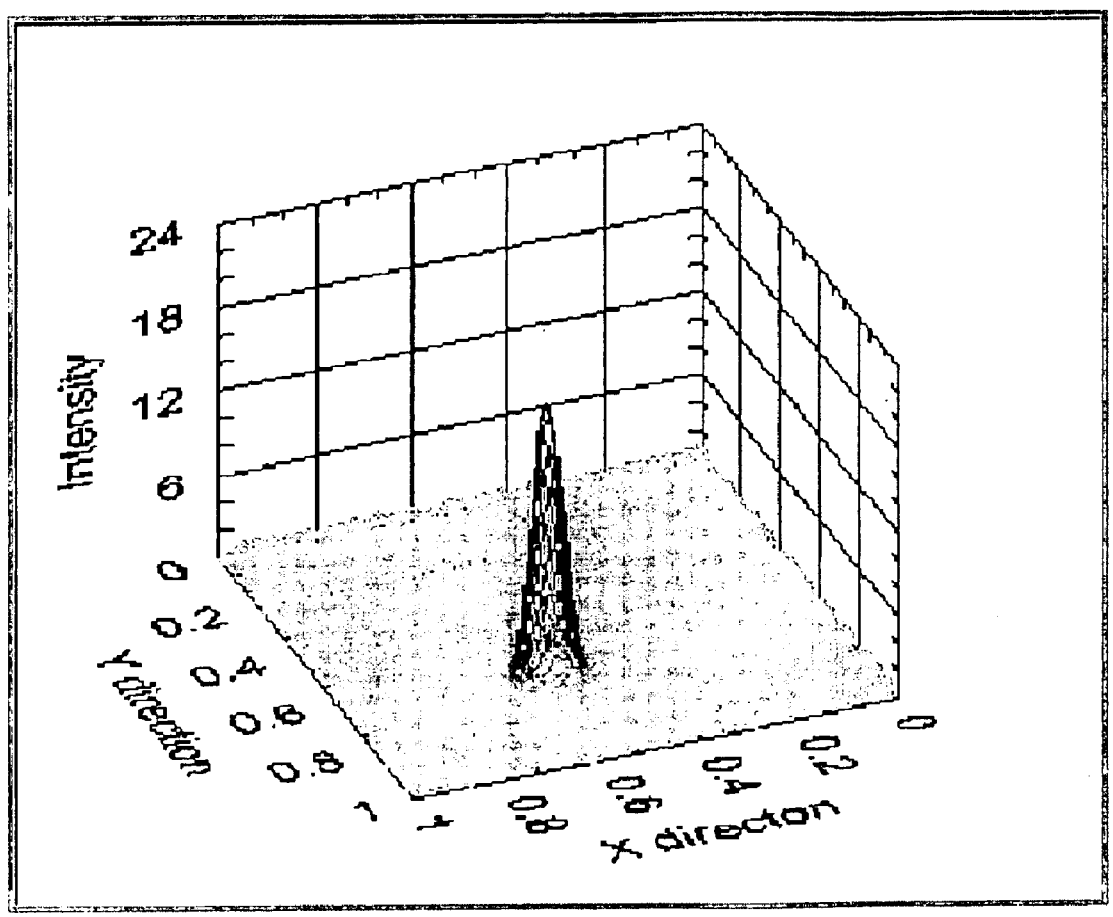
FIG. 20 illustrates a Gaussian-like intensity field distribution, according to one embodiment.

FIG. 20—Beam Intensity Distribution in Search Area

FIG. 20 illustrates a beam intensity field distribution in a search area, as related to the beam location process described above. As FIG. 20 shows, the field has a Gaussian-like distribution. To test and illustrate the scanning approach described above, an environment to simulate the proposed continuous searching strategies was implemented using National Instrument's software tool LabVIEW. Some assumptions were made in the simulation: the scanning device moves at constant speed, the light intensity is sampled at a constant frequency and the light beam has a skewed Gaussian intensity profile in space. Furthermore, it was assumed that the search area consisted of a unit area square, and all the simulation variables were adjusted adequately. All the assumptions are valid for the real world implementation of the solution. Moreover, some of the constraints such as constant speed search are desired in practical situations. As FIG. 20 shows, for the simulation the beam radius was assumed to be 0.02, much smaller than the search area. The noise power was $\frac{1}{20}$ of the beam power.

Figure 21A:
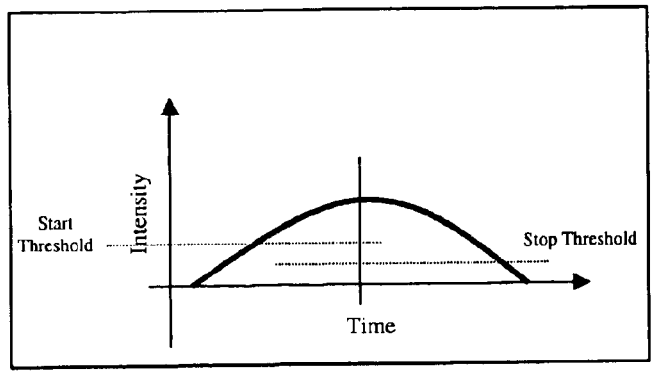
FIGS. 21A and 21B illustrate a final approach strategy, according to one embodiment.
Figure 21B:
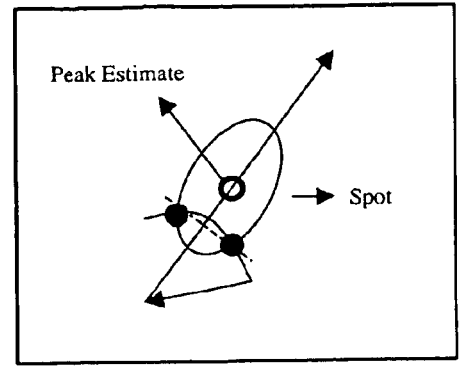

FIGS. 21A and 21B—Location of the Peak

FIGS. 21A and 21B illustrate the location of the peak in the final approach search. Once a given level of light intensity is observed in the coarse search, the system can be set to execute the final approach and estimation of the beam center. Based on the initial estimate of the beam location, more data about the shape of the beam may be collected in the final approach. Ideally, such data collection should allow one to record the intensity at the exact peak. However, in practice the beam may not be an exact Gaussian, and noise may actually mask the exact location of the peak. Thus, a more systematic approach for the peak location estimation may be used, as described below.

During the coarse search, once the desired intensity threshold is observed, the search should stop, i.e., after a lower threshold of intensity is crossed. The local intensity profile along the curve in this situation is represented in FIG. 21A. The (X,Y) point corresponding to the peak of the intensity profile could be taken as an initial estimate for the peak location. However, a quick line search considerably improves the estimate. FIG. 21B illustrates one example of such a line search. Note that the (X,Y) location corresponding to the peak of the measured intensity on the line search is a better estimate of the peak location than the original estimate.

Based on the initial estimate of the peak location and an upper bound on the expected beam width (spot size), a data collection move can be performed. Ideally, the move should be as smooth as possible in order to allow an accurate tracking of the (X,Y) positions being visited by the search. Theorem 3 and FIG. 5A present such a search path. The "flower" shaped curve composed of the union of a finite number of circles possesses almost constant curvature, and evenly scans the desired area (a multiple of the upper bound on the expected beam width).

The data points collected in the final approach can then be fitted using a multidimensional polynomial in order to compute an accurate location for the intensity peak. Such an operation has the advantage of compensating the noise present in the intensity measurements. The location of the peak can be computed as a function of the estimated polynomial coefficients. A move towards the located peak can be done to measure the peak intensity and check the validity of the estimate.

Figure 21C:
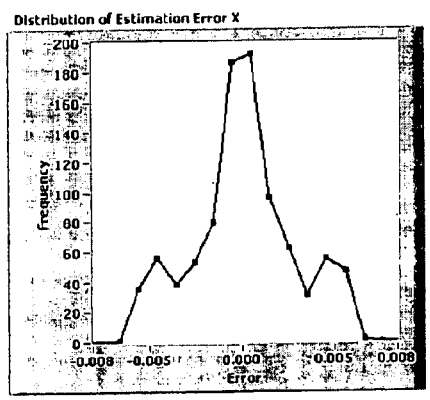
FIG. 21C illustrates error distributions of the estimated peak X and Y coordinate errors, according to one embodiment.
Figure 21C:
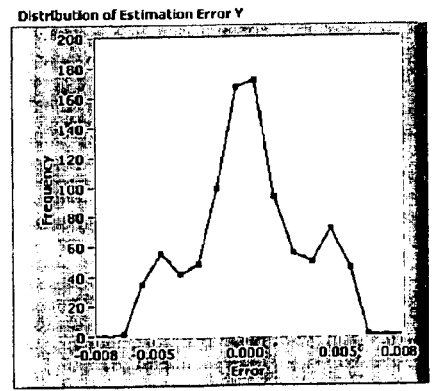

FIG. 21C—Error Distribution of the Estimated Peak

FIG. 21C presents a distribution of the errors in the location of the peak for a series of 1000 experiments. As FIG. 21C shows, the errors are distributed as a normal distribution. The main advantage of the proposed final approach is that a systematic approach for locating the peak is developed. Moreover the approach is very robust with regard to measurement noise.

Figure 22:
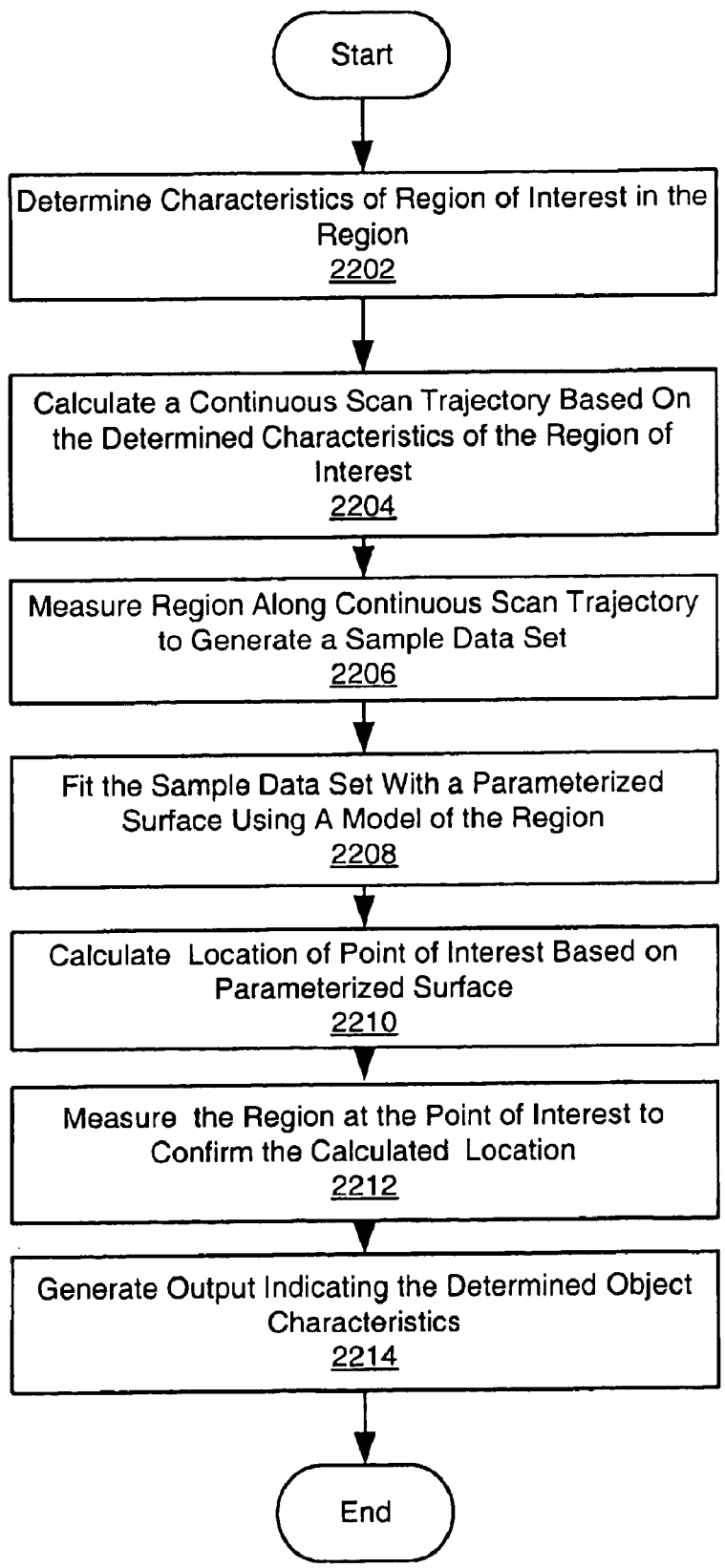
FIG. 22 is a flowchart of a final approach of a scanning process, according to one embodiment.

FIG. 22—Locating a Point of Interest in a Region

FIG. 22 is a flowchart of one embodiment of a method for locating a point of interest in a region, where an approximate model of the region is known. An exemplary application of this method is the optical fiber alignment task described above with reference to FIG. 3D and under the above section titled "Applications".

As FIG. 22 indicates, in 1402, one or more characteristics of a region of interest within the region may be determined, where the region of interest includes the point of interest. In one embodiment, the determined characteristics of the region of interest may include the radius or boundary of the region of interest. In another embodiment, the one or more characteristics of the region of interest may comprise an approximate location of the point of interest, e.g., a center of the region of interest. In one embodiment, the determined characteristics of the region of interest may include a general topology of the region of interest. For example, the region of interest may comprise a data distribution, such as a Gaussian or Gaussian-like distribution or surface, and the point of interest may comprise an extremum (peak or low-point) of the data distribution. In one embodiment, determining the one or more characteristics of the region of interest may comprise locating the region of interest in the region. One embodiment of a method for locating the region of interest in the region is described with reference to FIG. 23, below.

In 1404, a continuous trajectory based on the one or more characteristics of the region of interest may be determined. In the preferred embodiment, the continuous trajectory may allow measurement of the region of interest. An example of such a continuous trajectory is illustrated in FIG. 5A, described above. In one embodiment, the continuous trajectory may comprises a plurality of circular scan curve segments connected by smooth transition curves, as shown in FIG. 5A. In one embodiment, each scan curve circle may have a diameter equal to some multiple of a determined radius of the region of interest, determined in 1402 above. Thus, in one embodiment, determining the continuous trajectory which allows sampling of the area of interest may comprise determining a scan path such as that described with reference to FIG. 5A, above.

In 1406, the region of interest may be measured at a plurality of points along the continuous trajectory to generate a sample data set.

In 1408, a surface fit of the sample data set may be performed using the approximate model to generate a parameterized surface. For example, in the case that the sample data set comprises a Gaussian distribution, the data set may be fit using a Gaussian model to generate a parameterized Gaussian surface.

In 1410, a location of the point of interest based on the parameterized surface may be calculated. For example, in the case that the parameterized surface comprises a parameterized Gaussian surface, a Gaussian peak of the surface may be calculated using the parameterized Gaussian surface.

In 1412, the region of interest may optionally be measured at the calculated point of interest to confirm correctness of the calculated location. In other words, in one embodiment, the system may move to the calculated location of the point of interest and make one or measurements to verify that the calculated location of the point of interest is within some specified error of the actual point of interest.

It should be noted that although the example given was for a two dimensional region and object, the method described above may be applied to regions and objects of one or two dimensions. In other embodiments, the method may be applied to regions and objects of dimensionality greater than two.

Figure 23:
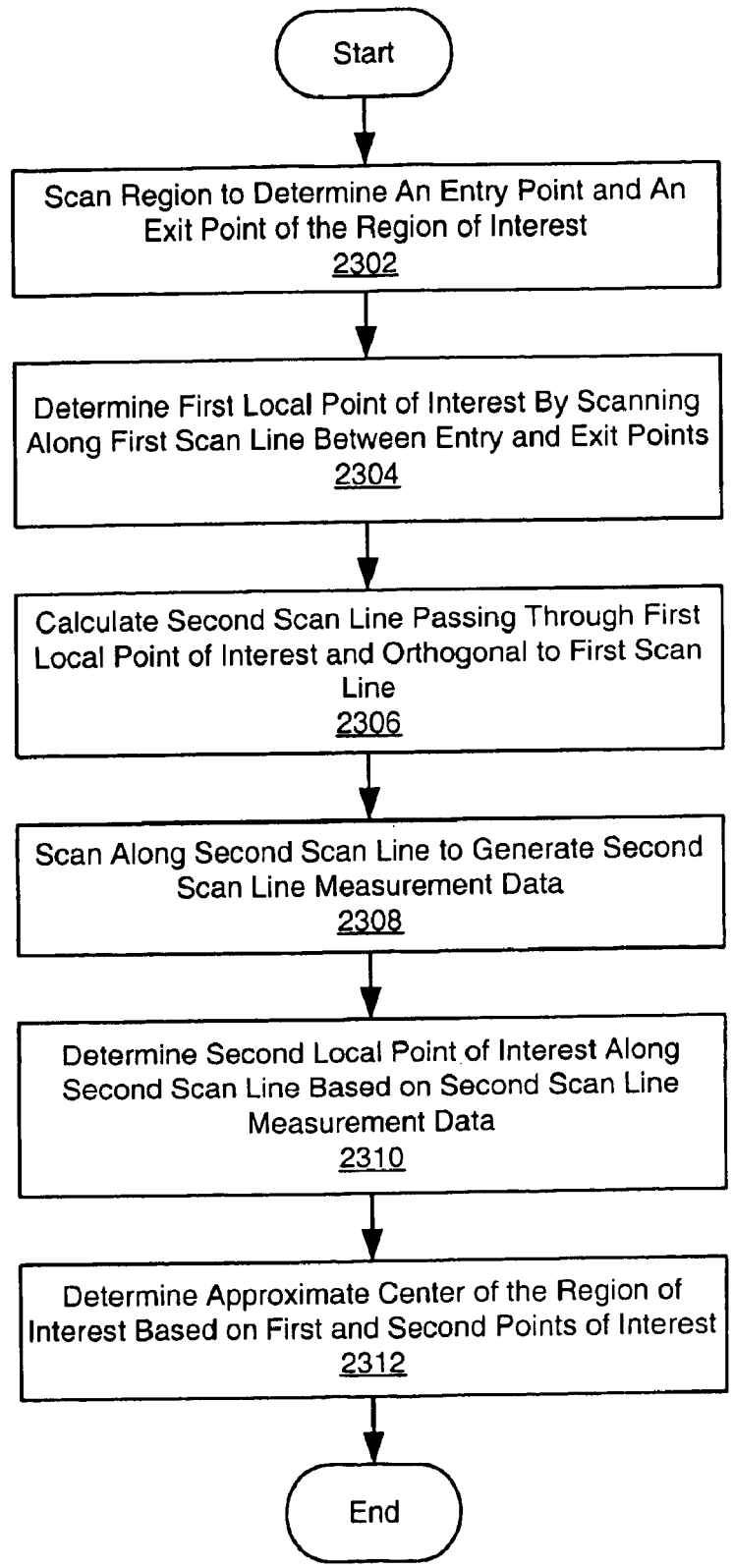
FIG. 23 is a flowchart process for locating a region of interest in a scan region, according to one embodiment.

FIG. 23—Locating the Region of Interest in the Region

FIG. 23 is a flowchart of one embodiment of a method for locating the region of interest in the region, mentioned in 1402 of FIG. 22, and described with reference to FIGS. 21A and 21B, above. In one embodiment, locating the region of interest in the region may comprise locating an approximate center of the region of interest.

As FIG. 22 indicates, in 1502, the region may be scanned to locate two or more points of the region of interest, where each of the two or more points has associated measured data. In one embodiment, the two or more points of the region of interest may comprise an entry point and an exit point of the region of interest.

In 1504, a first local point of interest in the region of interest proximate to the two or more points of the region of interest may be determined. In one embodiment, the first local point of interest in the region of interest may be determined by scanning along a first scan line between the two or more points of the region of interest, e.g., the entry point and the exit point. For example, the first local point of interest may comprise a local peak (or low-point) of a data distribution located along the first scan line.

In 1506, a second scan line may be calculated, where the second scan line passes through the first local point of interest, and where the second scan line is orthogonal to the first scan line.

In 1508, the region may be measured (scanned) along the second scan line to generate second scan line associated measured data.

In 1510, a second local point of interest may be determined along the second scan line based upon the second scan line associated measured data. For example, the second local point of interest may comprise a local peak (or low-point) of the data distribution along the second scan line.

In 1512, the approximate center of the region of interest may be determined based upon one or more of the second local point of interest and the first local point of interest. In one embodiment, if the second local point of interest is determined to be "less interesting" than the first local point of interest, e.g., if the second local point of interest is a lower peak than the first local point of interest, the first local point of interest may be selected as the determined center of the region of interest. Alternately, if the first local point of interest is a lower peak than the second local point of interest, the second local point of interest may be selected as the determined center of the region of interest. In one embodiment, the first and second local points of interest may be used to calculate a third local point of interest comprising the determined center of the region of interest.

In one embodiment, the method may include providing a radius, wherein the region of interest comprises an area of the region within the radius of the determined center. Thus, the method described above may locate a region of interest by locating an approximate center of the region of interest. In one embodiment, the located approximate center and the provided radius may be used to specify the region of interest described above with reference to FIG. 22.

The scanning methodologies presented above provide efficient methods for scanning a wide variety of geometries, including very high dimensionality spaces. In applications where object detection is under enormous real-time pressure, the methods described herein will on average find objects faster than other strategies necessitating a continuous scan.

Memory and Carrier Medium

The computer system 102 preferably includes a memory medium on which software according to an embodiment of the present invention may be stored. The memory medium may store one or more programs to control and execute a scanning operation. The memory medium may also store a software program for preprocessing scan data, such as to generate a Low Discrepancy Sequence, described above. In one embodiment, the memory medium may also store a software program for analyzing results of a scan operation.

The term "memory medium" is intended to include an installation medium, e.g., a CD-ROM, floppy disks, or tape device; a computer system memory or random access memory (RAM) such as DRAM, SRAM, EDO RAM, RRAM, etc.; or a non-volatile memory such as a magnetic media, e.g., a hard drive, or optical storage. The memory medium may comprise other types of memory as well, or combinations thereof.

In addition, the memory medium may be located in a first computer in which the software program is stored or executed, or may be located in a second different computer which connects to the first computer over a network, such as the Internet. In the latter instance, the second computer provides the program instructions to the first computer for execution. Also, the computer system 102 may take various forms, including a personal computer system, mainframe computer system, workstation, network appliance, Internet appliance, personal digital assistant (PDA), television set-top box, or other device. In general, the term "computer system" can be broadly defined to encompass any device having at least one processor which executes instructions from a memory medium, or any device which includes programmable logic that is configurable to perform a method or algorithm.

Various embodiments further include receiving or storing instructions and/or data implemented in accordance with the foregoing description upon a carrier medium. Suitable carrier media include a memory medium as described above, as well as signals such as electrical, electromagnetic, or digital signals, conveyed via a communication medium such as networks and/or a wireless link.

However, it is noted that the present invention can be used for a plethora of applications and is not limited to the applications shown herein. In other words, the applications described herein are exemplary only, and the methods described herein may be used for any of various purposes and may be stored in and execute on any of various types of systems to perform any of various applications.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A method for generating a curve on a surface, comprising:

selecting a parameterization of the surface, wherein the parameterization corresponds to a parameter space;

selecting a first curve in the parameter space, wherein the first curve is a Low Discrepancy Curve in the parameter space;

determining a re-parameterization of the surface based on a metric of the surface; and mapping the first curve in the parameter space onto the surface based on the re-parameterization, to generate the curve, wherein the generated curve is a Low Discrepancy Curve on the surface;

wherein the curve is useable in analyzing the surface.

2. The method of claim 1, further comprising:

generating output comprising the generated curve on the surface.

3. The method of claim 1, wherein the parameter space comprises a 2D rectangle.

4. The method of claim 1, wherein the parameter space comprises a unit n-dimensional cube, wherein the dimensionality n is greater than 4.

5. The method of claim 1, wherein the parameter space comprises one of a unit square, a unit cube, or a unit hyper-cube.

6. The method of claim 1, wherein the metric of the surface is a Riemannian metric.

7. The method of claim 1, wherein the surface comprises a space with dimensionality greater than two.

8. The method of claim 1, wherein the surface comprises a six-dimensional space comprising three position degrees of freedom and three orientation degrees of freedom for an object; and wherein the generated curve comprises a scan path useable in scanning the space.

9. The method of claim 8, further comprising:

scanning the space, wherein said scanning the space is performed to determine an optimum position and orientation for the object.

10. The method of claim 1, wherein the parameter space comprises a 2D rectangle.

11. The method of claim 1, wherein the parameter space comprises one of a unit square, a unit cube, or a unit hyper-cube.

12. The method of claim 1, wherein the parameter space comprises a unit n-dimensional cube, wherein the dimensionality n is greater than 4.

13. The method of claim 1, wherein the metric of the surface is a Riemannian metric.

14. The method of claim 1, wherein the surface comprises a space with dimensionality greater than two.

15. A method for generating a curve on a surface of an object, comprising:

selecting a parameterization of the surface, wherein the parameterization corresponds to a parameter space;

selecting a first curve in the parameter space, wherein the first curve is a Low Discrepancy Curve in the parameter space;

determining a re-parameterization of the surface based on a metric of the surface; and mapping the first curve in the parameter space onto the surface based on the re-parameterization, to generate the curve, wherein the generated curve is a Low Discrepancy Curve on the surface;

wherein the curve is useable in analyzing the object.

16. The method of claim 15, further comprising:

generating output comprising the generated curve on the surface.

17. The method of claim 15, further comprising:

analyzing the object using the curve.

18. The method of claim 11, further comprising:

determining a property of the object using the curve.

19. A memory medium which is operable to store program instructions for generating a curve on a surface, wherein said program instructions are executable to perform:

storing a parameterization of the surface, wherein the parameterization corresponds to a parameter space;

storing a first curve in the parameter space, wherein the first curve is a Low Discrepancy Curve in the parameter space;

determining a re-parameterization of the surface based on a metric of the surface; and mapping the first curve in the parameter space onto the surface based on the re-parameterization, to generate the curve, wherein the generated curve is a Low Discrepacy Curve on the surface;

wherein the curve is useable in analyzing the surface.

20. The memory medium of claim 19, wherein the program instructions are further executable to perform:

generating output comprising the generated curve on the surface.

21. The memory medium of claim 19, wherein the parameter space comprises one of a 2D rectangle, a unit square, a unit cube, or a unit hyper-cube.

22. The memory medium of claim 19, wherein the parameter space comprises a unit n-dimensional cube, wherein the dimensionality n is greater than 4.

23. The memory medium of claim 19, wherein the metric of the surface is a Riemannian metric.

24. The memory medium of claim 19, wherein the surface comprises a space with dimensionality greater than two.

25. The memory medium of claim 19, wherein the surface comprises a surface of an object;

wherein the curve comprises a scan path useable to scan the object;

wherein the program instructions are further executable to perform:

scanning the object to determine one or more properties of the object.

26. The memory medium of claim 19, wherein the surface comprises a six-dimensional space comprising three position degrees of freedom and three orientation degrees of freedom for an object;

wherein the generated curve comprises a scan path useable in scanning the six-dimensional space;

wherein the program instructions are further executable to perform:

scanning the six-dimensional space to determine an optimum position and orientation of the object.

27. A system for generating a curve on a surface, comprising:

a CPU; and a memory medium which is operable to store one or more software programs;

wherein said CPU is operable to execute said one or more software programs to perform:

selecting a parameterization of the surface, wherein the parameterization corresponds to a parameter space;

selecting a first curve in the parameter space, wherein the first curve is a Low Discrepancy Curve in the parameter space;

determining a re-parameterization of the surface based on a metric of the surface; and mapping the first curve in the parameter space onto the surface based on the re-parameterization, to generate the curve, wherein the generated curve is a Low Discrepancy Curve on the surface;

wherein the curve is useable in analyzing the surface.

28. The system of claim 27, wherein the CPU is further operable to execute said one or more software programs to perform:

generating output comprising the generated curve on the surface.

29. The system of claim 27, wherein the parameter space comprises one of a 2D rectangle, a unit square, a unit cube, a unit hyper-cube, or a unit n-dimensional cube, wherein the dimensionality n is greater than 4.

30. The system of claim 27, wherein the metric of the surface is a Riemannian metric.

31. The system of claim 27, wherein the surface comprises a space with dimensionality greater than two.

32. A method for generating a curve on a surface, comprising:

selecting a parameterization of the surface, wherein the surface comprises a space with dimensionality greater than two, and wherein the parameterization corresponds to a parameter space;

selecting a first curve in the parameter space;

determining a re-parameterization of the surface based on a metric of the surface; and mapping the first curve in the parameter space onto the surface based on the re-parameterization, to generate the curve;

wherein the curve is useable in analyzing the surface.

33. A method for generating a curve on a surface of an object, comprising:

selecting a parameterization of the surface, wherein the surface comprises a space with dimensionality greater than two, wherein the parameterization corresponds to a parameter space;

selecting a first curve in the parameter space;

determining a re-parameterization of the surface based on a metric of the surface; and mapping the first curve in the parameter space onto the surface based on the re-parameterization, to generate the curve;

wherein the curve is useable in analyzing the object.

34. A memory medium which is operable to store program instructions for generating a curve on a surface, wherein said program instructions are executable to perform:

storing a parameterization of the surface, wherein the surface comprises a space with dimensionality greater than two, wherein the parameterization corresponds to a parameter space;

storing a first curve in the parameter space;

determining a re-parameterization of the surface based on a metric of the surface; and mapping the first curve in the parameter space onto the surface based on the re-parameterization, to generate the curve;

wherein the curve is useable in analyzing the surface.

35. A system for generating a curve on a surface, comprising:

a CPU; and a memory medium which is operable to store one or more software programs;

wherein said CPU is operable to execute said one or more software programs to perform:

selecting a parameterization of the surface, wherein the surface comprises a space with dimensionality greater than two, wherein the parameterization corresponds to a parameter space;

selecting a first curve in the parameter space;

determining a re-parameterization of the surface based on a metric of the surface; and mapping the first curve in the parameter space onto the surface based on the re-parameterization, to generate the curve;

wherein the curve is useable in analyzing the surface.

* * * * *